US008265479B2

(12) United States Patent
Imai et al.

(10) Patent No.: US 8,265,479 B2
(45) Date of Patent: Sep. 11, 2012

(54) CAMERA MODULE

(75) Inventors: Satoshi Imai, Kanagawa (JP); Mitsuru Ichikawa, Saitama (JP); Fujio Kanai, Kanagawa (JP); Atsushi Horidan, Kanagawa (JP); Takahiro Okabe, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/312,223

(22) PCT Filed: Oct. 24, 2007

(86) PCT No.: PCT/JP2007/070744
§ 371 (c)(1),
(2), (4) Date: Jan. 14, 2010

(87) PCT Pub. No.: WO2008/050805
PCT Pub. Date: May 2, 2008

(65) Prior Publication Data
US 2010/0150545 A1    Jun. 17, 2010

(30) Foreign Application Priority Data

Oct. 27, 2006  (JP) ................ P2006-293066

(51) Int. Cl.
*G03B 17/02* (2006.01)
(52) U.S. Cl. ..................... 396/535; 348/373
(58) Field of Classification Search .......... 396/535; 348/373
See application file for complete search history.

(56) References Cited

U.S. PATENT DOCUMENTS
7,288,003 B2 * 10/2007 Ono et al. ............ 439/607.01
(Continued)

FOREIGN PATENT DOCUMENTS
DE        10339373 A1    3/2004
(Continued)

OTHER PUBLICATIONS

Supplementary European Search Report EP 07830478, dated May 12, 2011.

*Primary Examiner* — Rochelle-Ann J Blackman
*Assistant Examiner* — Linda B Smith
(74) *Attorney, Agent, or Firm* — Lerner, David, Littenberg, Krumholz & Mentlik, LLP

(57) ABSTRACT

A camera module advantageous in simplifying an assembly process is provided. A camera module 22 includes a barrel unit 66 having a housing space S; a lens holding unit 68 which holds an imaging optical system 34, which is housed in the housing space S, and which is supported such that the lens holding unit 68 is movable along an optical axis of the imaging optical system 34; an image pickup element 29 which is disposed in the barrel unit 66 and which picks up an object image guided by the imaging optical system 34; and a driving unit 72 which moves the lens holding unit 68 along the optical axis of the imaging optical system 34. The barrel unit 66 includes an inner barrel 80 in which the housing space S is formed and an outer barrel 78 disposed outside the inner barrel 80. A retaining plate 86 includes a front plate portion 86A and two side plate portions 86B. The retaining plate 86 clamps the inner barrel 80 and the outer barrel 78 in the optical axis direction in the state in which the front plate portion 86A retains a front end of the outer barrel 78 and distal ends of the two side plate portions 86B retain the rear endface wall 8002.

11 Claims, 49 Drawing Sheets

U.S. PATENT DOCUMENTS

| | | | |
|---|---|---|---|
| 7,450,834 B2* | 11/2008 | Makii et al. | 396/55 |
| 7,505,215 B2* | 3/2009 | Sanou et al. | 359/694 |
| 7,734,171 B2* | 6/2010 | Leonelli, Jr. | 396/535 |
| 2003/0003626 A1* | 1/2003 | Crane et al. | 438/121 |
| 2003/0194188 A1* | 10/2003 | Shiino et al. | 385/53 |
| 2005/0048829 A1* | 3/2005 | Nishio et al. | 439/331 |
| 2006/0079742 A1* | 4/2006 | Cho et al. | 600/365 |
| 2006/0164538 A1 | 7/2006 | Kawasaki et al. | |
| 2006/0181632 A1* | 8/2006 | Makii et al. | 348/335 |
| 2006/0181633 A1* | 8/2006 | Seo | 348/340 |
| 2006/0181748 A1 | 8/2006 | Makii et al. | |
| 2006/0279386 A1* | 12/2006 | Lammers | 335/205 |
| 2007/0090716 A1* | 4/2007 | Oki et al. | 310/216 |
| 2007/0115565 A1* | 5/2007 | Shyu et al. | 359/811 |
| 2007/0172227 A1* | 7/2007 | Droege et al. | 396/419 |
| 2010/0091179 A1* | 4/2010 | Murakami et al. | 348/374 |

FOREIGN PATENT DOCUMENTS

| | | |
|---|---|---|
| JP | 2005-107084 A | 4/2005 |
| JP | 2006-227103 A | 8/2006 |
| JP | 2006-235583 A | 9/2006 |
| JP | 2006-284628 A | 10/2006 |
| JP | 2006-284652 A | 10/2006 |
| JP | 2008-111867 A | 5/2008 |
| WO | WO-2008/050805 A1 | 5/2008 |

\* cited by examiner

CAMERA MODULE

CROSS-REFERENCES TO RELATED APPLICATIONS

The present application is a national phase entry under 35 U.S.C. §371 of International Application No. PCT/JP2007/070744 filed Oct. 24, 2007, published on May 2, 2008 as WO 2008/050805 A1, which claims priority from Japanese Patent Application No. JP 2006-293066 filed in the Japanese Patent Office on Oct. 27, 2006.

BACKGROUND OF THE INVENTION

1. Technical Field

The present invention relates to, for example, a camera module installed in a portable electronic apparatus or the like.

2. Background Art

Recently, electronic apparatuses, such as portable phones or PDA (Personal Digital Assistants), in which camera modules are installed have been provided.

A camera module includes a lens holding unit which holds an imaging optical system, a barrel unit which houses the lens holding unit, an image pickup element which picks up an object image guided by the imaging optical system, and a driving unit which causes the lens holding unit to move along an optical axis.

As an example of such a camera module, a camera module in which the barrel unit includes two front and rear barrel members and in which the front and rear barrel members are fixed to each other with an adhesive has been proposed (Japanese Unexamined Patent Application Publication No. 2006-227103).

In the camera module according to the related art, since the two front and rear barrel members are adhered to each other with an adhesive, a cumbersome process of adjusting and managing the amount of adhesive and curing conditions is necessary. In addition, a curing time for the adhesive is required. Therefore, the assembly process is cumbersome and it is disadvantageous in reducing costs.

The present invention has been made in view of the above-described situation, and an object of the present invention is to provide a camera module that is advantageous in simplifying the assembly process and reducing costs.

SUMMARY OF THE INVENTION

In order to achieve the above-described object, a camera module according to the present invention is characterized by comprising a barrel unit having a housing space; a lens holding unit holding an imaging optical system, the lens holding unit being housed in the housing space and supported such that the lens holding unit is movable along an optical axis of the imaging optical system; an image pickup element disposed in the barrel unit, the image pickup element picking up an object image guided by the imaging optical system; and a driving unit which moves the lens holding unit along the optical axis of the imaging optical system. The barrel unit includes an inner barrel in which the housing space is formed and an outer barrel disposed outside the inner barrel. The inner barrel includes a rear end-face wall which extends along a plane perpendicular to the optical axis, which closes a rear end of the outer barrel in the optical axis direction, and in which an opening for housing the image pickup element is formed. A retaining plate is provided, the retaining plate including a front plate portion which retains a front end of the outer barrel in the optical axis direction and closes the front end, two side plate portions bent along both sides of the front plate portion and having distal ends which retain the rear end-face wall, and an opening formed in the front plate portion for providing an optical path of the imaging optical system. In the state in which the front plate portion retains the front end of the outer barrel and the distal ends of the two side plate portions retain the rear end-face wall, the inner barrel and the outer barrel are clamped by the retaining plate in the optical axis direction.

Thus, according to the present invention, the inner barrel and the outer barrel are clamped in the optical-axis direction by using the retaining plate. Therefore, it is not necessary to adjust and manage the amount of adhesive and curing conditions. In addition, the curing time for the adhesive is also not necessary. Therefore, the assembly process can be considerably simplified and it is advantageous in reducing costs.

BEST MODES FOR CARRYING OUT THE INVENTION

First, a first reference example will be described before describing an embodiment of the present invention.

Figure 1:
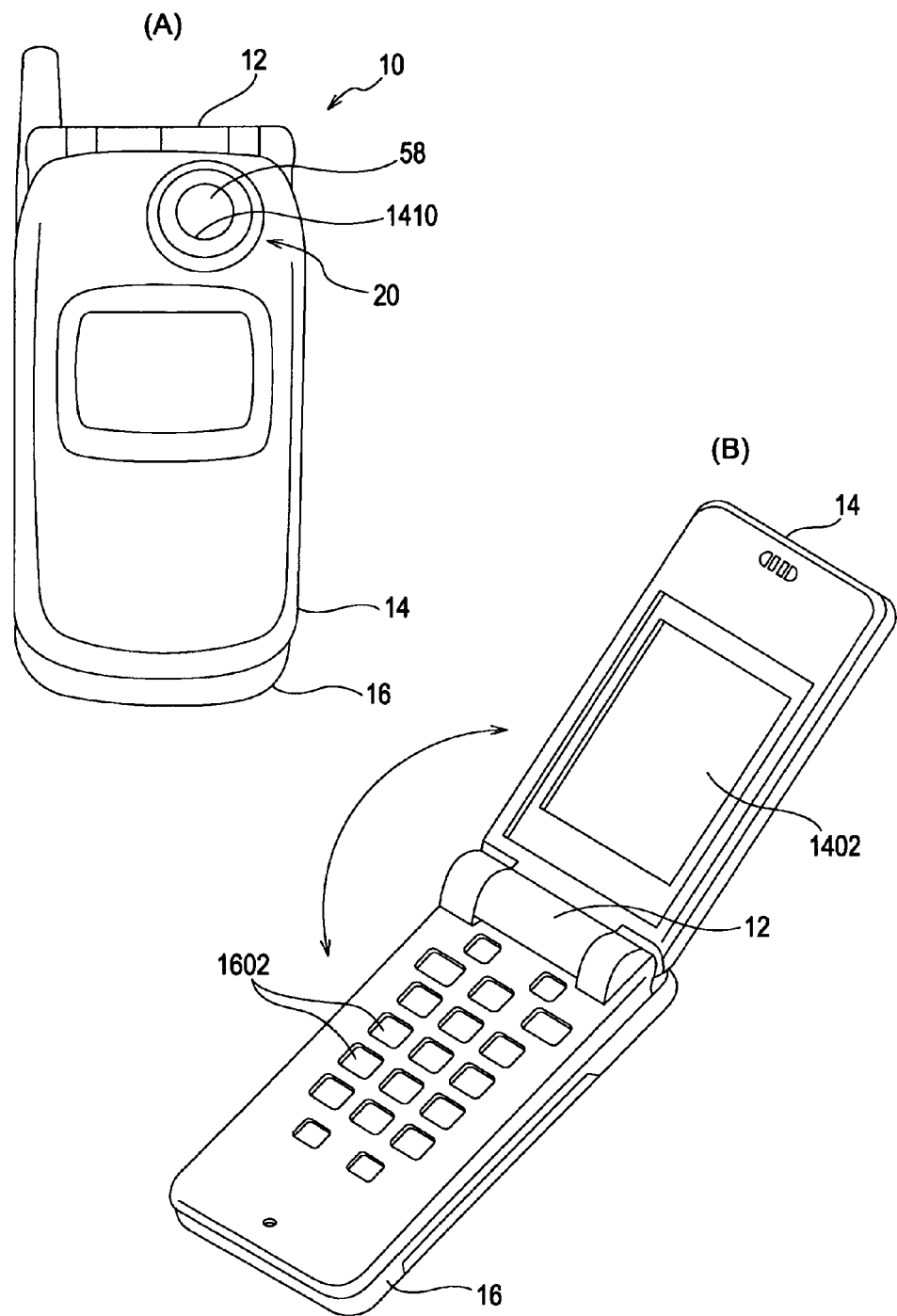
In FIG. 1, (A) and (B) are external views illustrating an example of an electronic apparatus in which an image pickup device 20 is installed.

In FIG. 1, (A) and (B) are external views illustrating an example of an electronic apparatus in which an image pickup device 20 having a camera module 22 according to the first reference example is installed.

As shown in FIG. 1, an electronic apparatus 10 is a portable phone and includes first and second housings 14 and 16 which are pivotally connected to each other with a hinge unit 12.

A liquid crystal display panel 1402 is provided on the inner surface of the first housing 14, and operation switches 1602, such as numeric keys and function keys, are provided on the inner surface of the second housing 16.

The image pickup device 20 is installed in a base-end section of the first housing 14 and is structured such that an image picked up by the image pickup device 20 is displayed on the liquid crystal display panel 1402.

Figure 2:
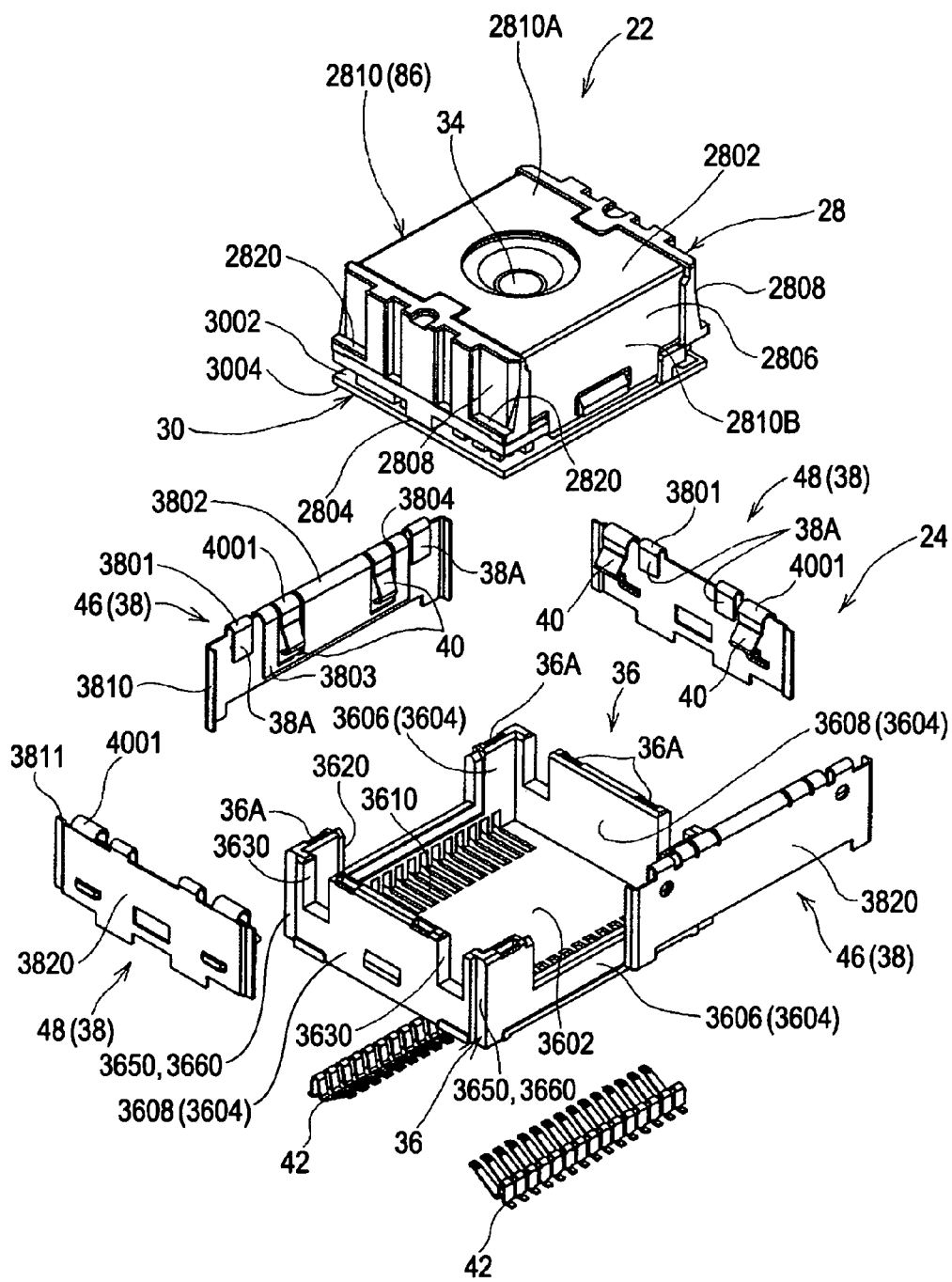
FIG. 2 is an exploded perspective view of a camera module 22 and a socket 24 included in the image pickup device 20.
Figure 3:
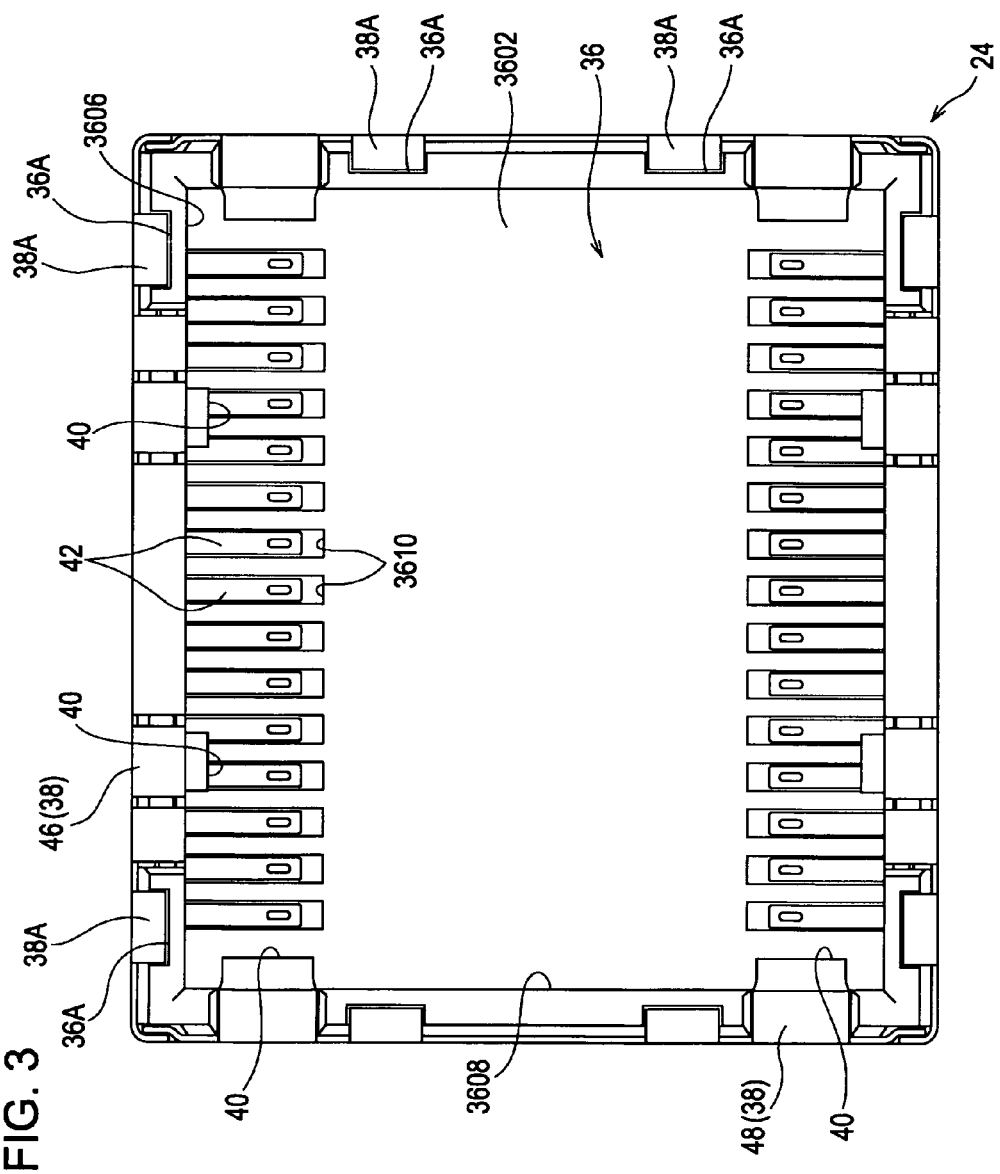
FIG. 3 is a plan view of the socket 24.
Figure 4:
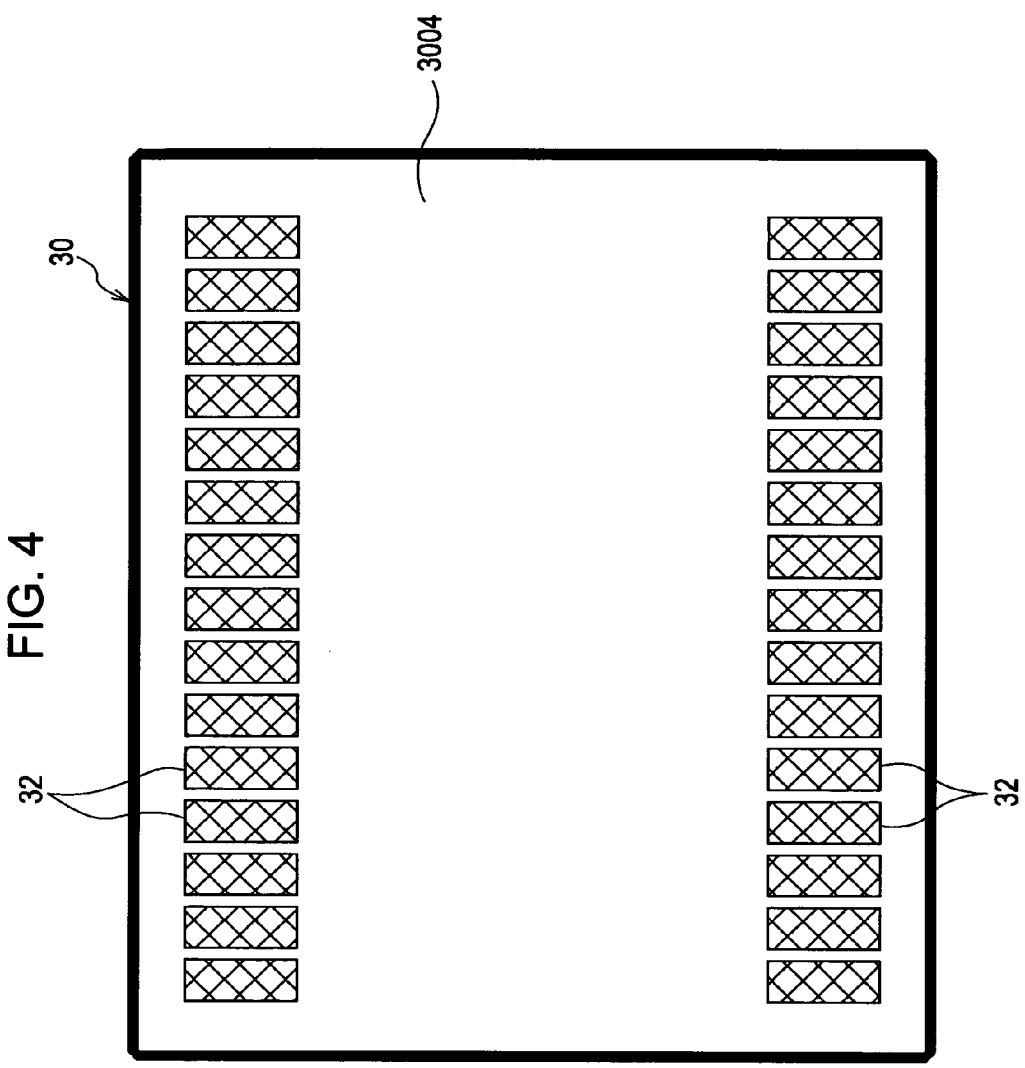
FIG. 4 is a plan view of a substrate 30.
Figure 5:
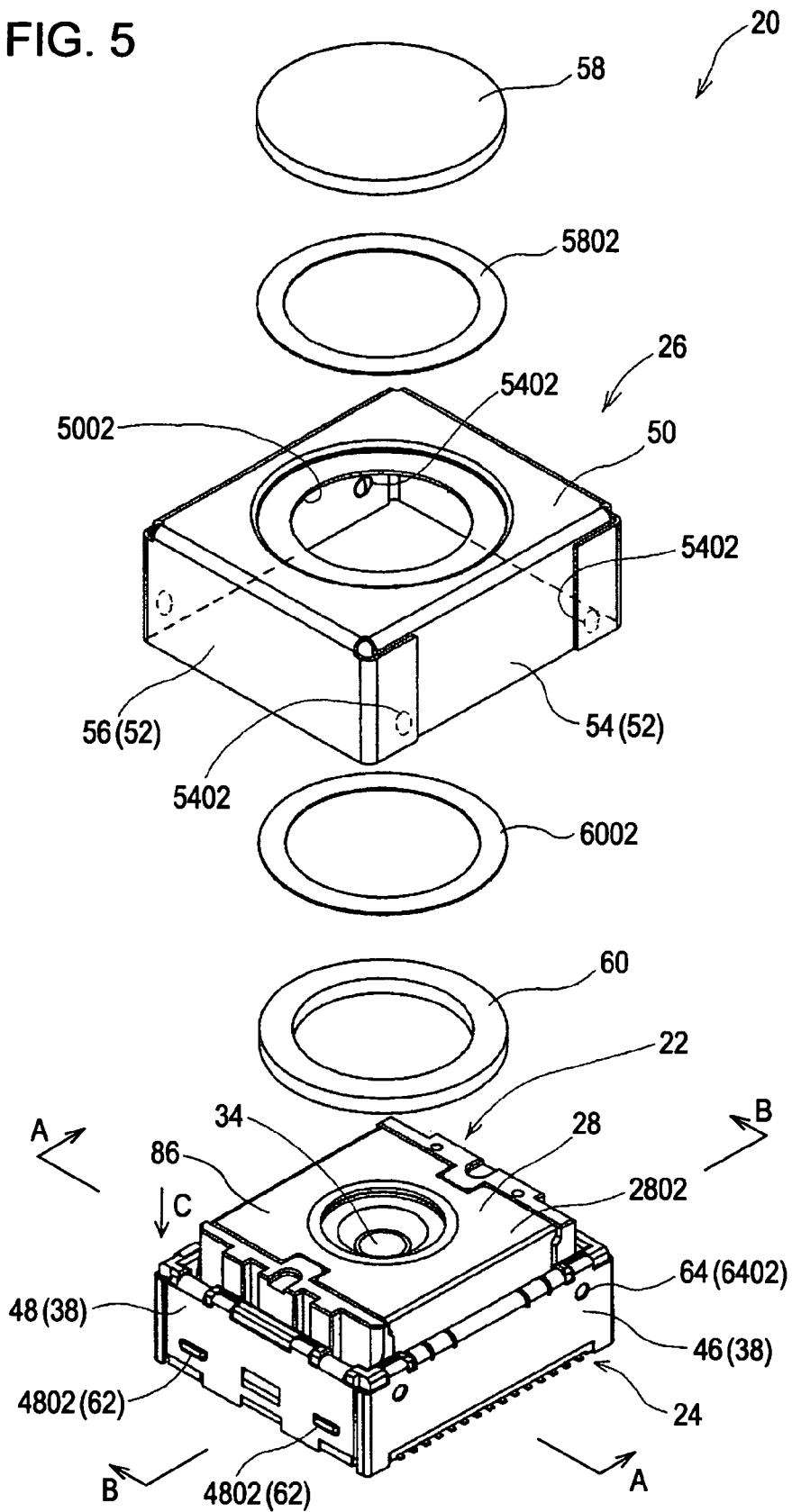
FIG. 5 is an exploded perspective view of the camera module 22, the socket 24, and a cover 26.
Figure 6:
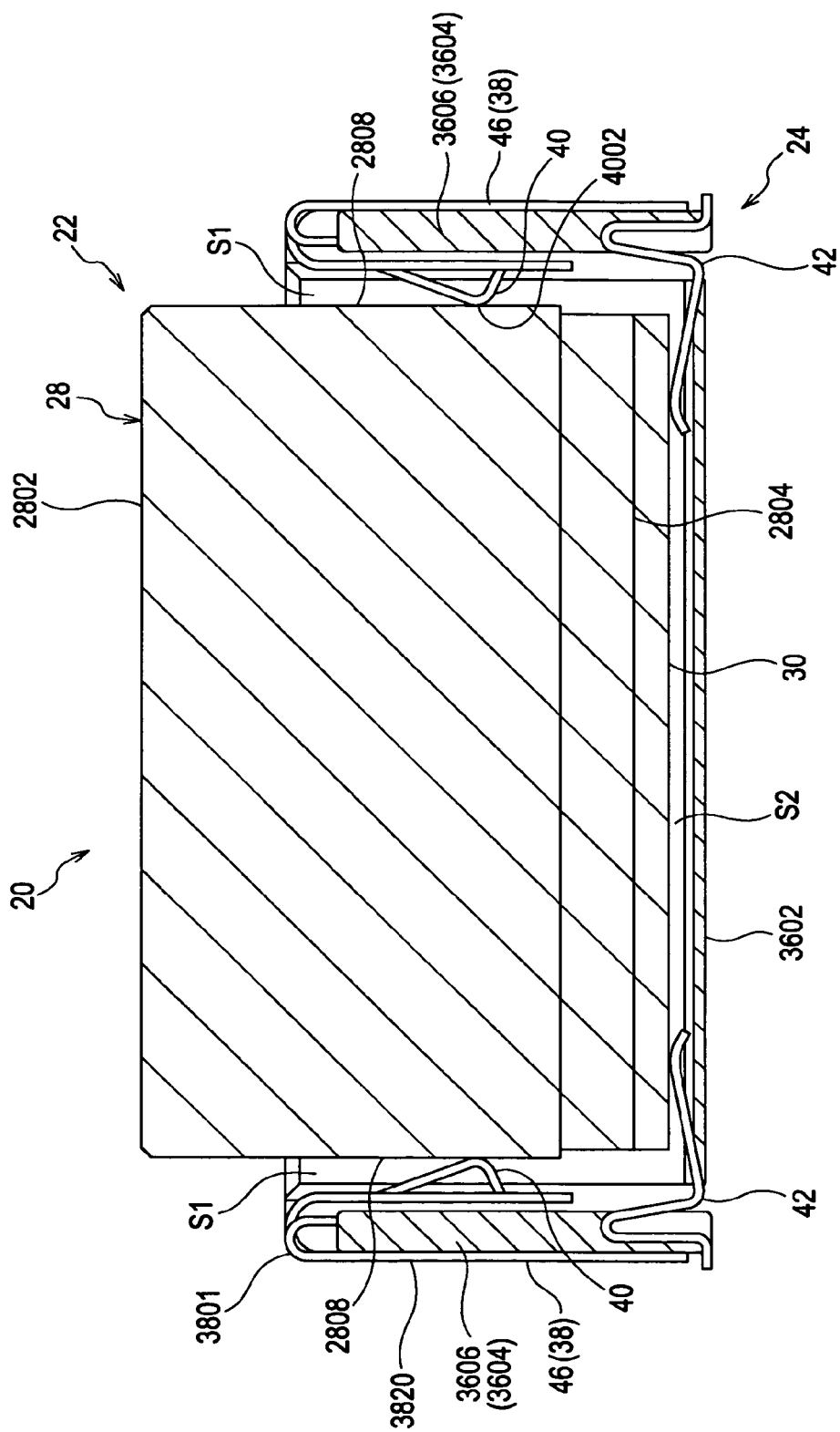
FIG. 6 is a sectional view of FIG. 5 taken along line A-A.
Figure 7:
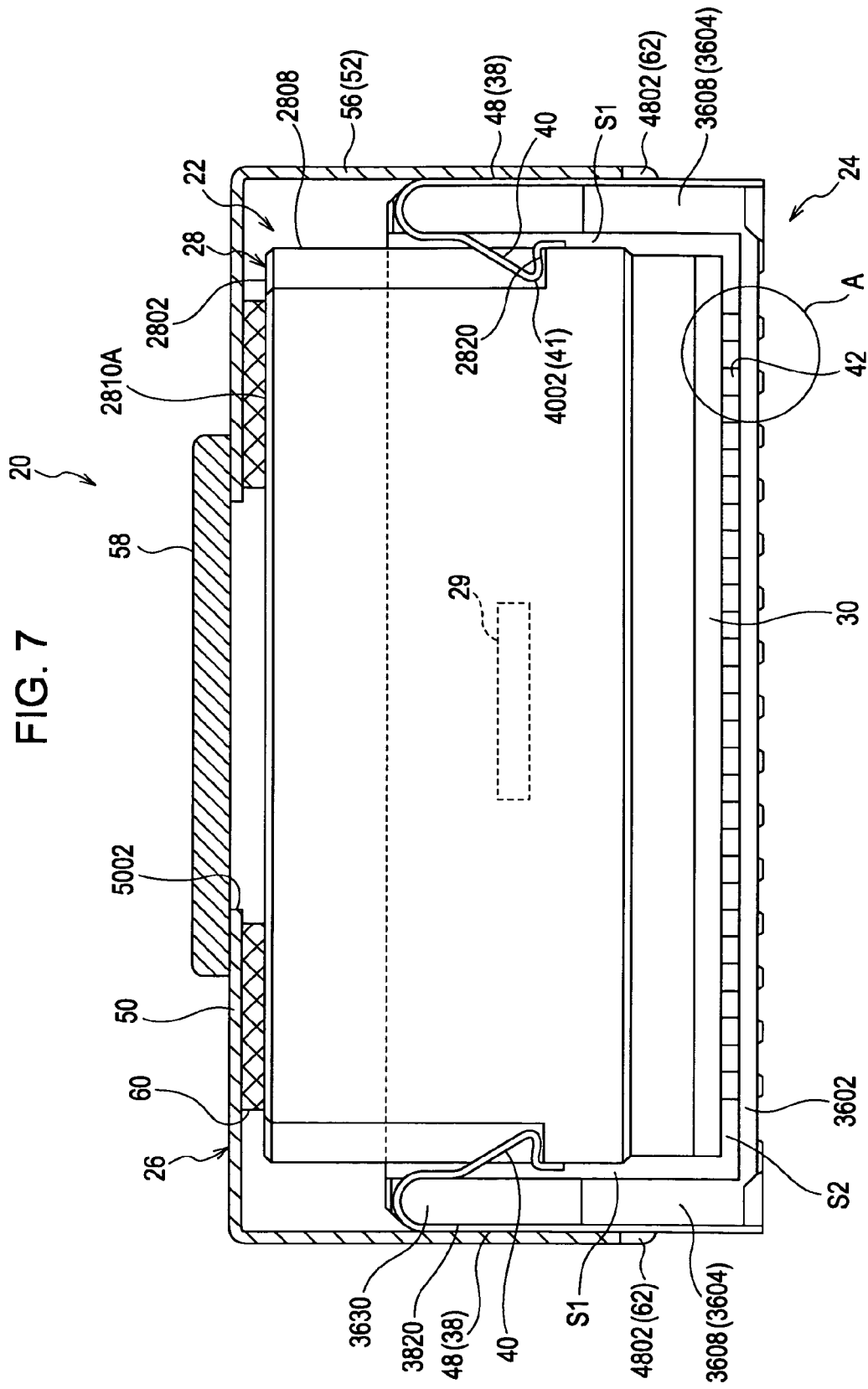
FIG. 7 is a sectional view of FIG. 5 taken along line B-B.
Figure 8:
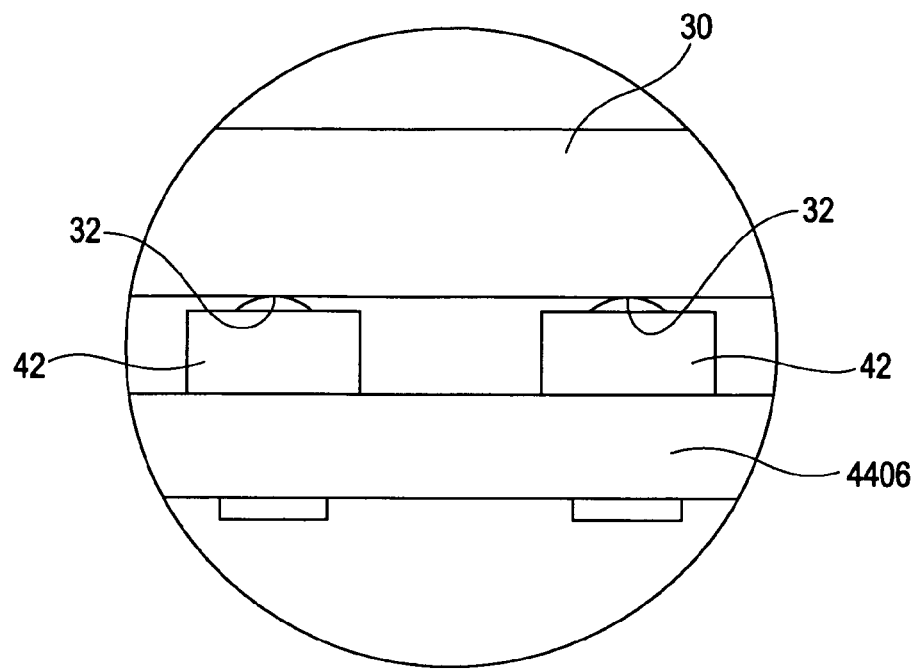
FIG. 8 is an enlarged view of part A in FIG. 7.

FIG. 2 is an exploded perspective view of a camera module 22 and a socket 24 included in the image pickup device 20, FIG. 3 is a plan view of the socket 24, FIG. 4 is a plan view of a substrate 30, FIG. 5 is an exploded perspective view of the camera module 22, the socket 24, and a cover 26, FIG. 6 is a sectional view of FIG. 5 taken along line A-A, FIG. 7 is a sectional view of FIG. 5 taken along line B-B, and FIG. 8 is an enlarged view of part A in FIG. 7.

As shown in FIGS. 2 and 5, the image pickup device 20 includes the camera module 22, the socket 24 to which the camera module 22 is attached, and the cover 26 attached to the socket 24.

As shown in FIG. 2, the camera module 22 includes a casing 28, an image pickup element 29 (see FIG. 7), a signal processing unit, the substrate 30, and contact pieces 32 (see FIG. 4).

The casing 28 includes a top surface 2802 having an oblong square plate shape (rectangular plate shape) and positioned at one end of the casing 28 in a thickness direction, a bottom surface 2804 positioned at the other end in the thickness direction, two long-side side surfaces 2806 positioned along two long sides, and two short-side side surfaces 2808 positioned along two short sides.

An imaging optical system 34 for guiding an object image to the image pickup element is installed in the casing 28. The imaging optical system 34 is disposed so as to face the top surface 2802 of the casing 28.

According to the first reference example, the casing 28 is made of synthetic resin. As shown in FIG. 2, a camera-body shielding plate 2810 is provided so as to cover the top surface 2802 and the two long-side side surfaces 2806.

Thus, according to the first reference example, the casing 28 includes the camera-body shielding plate 2810, which is conductive.

The image pickup element 29 picks up the object image guided by the imaging optical system 34, and is installed in the casing 28 at a position behind (on the image-pickup side of) the imaging optical system 34.

The signal processing unit receives an image-pickup signal output from the image pickup element 29 and performs a predetermined signal process.

As shown in FIG. 2, the substrate 30 is attached to the bottom surface 2804 of the casing 28 and has an oblong square shape (rectangular shape).

A top surface 3002 of the substrate 30 faces the casing 28, and the image pickup element 29 and a plurality of electronic components included in the signal processing unit are mounted on the top surface 3002.

As shown in FIG. 4, a plurality of contact pieces 32 (connection pads) are arranged along two long sides of a bottom surface 3004 of the substrate 30 at the side opposite to the casing 28.

As shown in FIG. 2, the socket 24 includes a socket body 36, socket shielding plates 38, elastic pieces 40, a plurality of connection terminals 42, and engaging units 41 (see FIG. 7).

The socket body 36 is made of a material having insulating characteristics. In this example, the socket body 36 is made of a synthetic resin having insulating characteristics.

The socket body 36 includes a bottom wall 3602 that has an oblong square shape (rectangular plate shape) whose contour is larger than the substrate 30 of the camera module 22 and four side walls 3604 which stand upright from four sides of the bottom wall 3602. The socket body 36 is formed to have enough size to house the camera module 22 inside the four side walls 3604 on the bottom wall 3602.

In this example, the four side walls 3604 include two long-side side walls 3606 which stand upright from two long sides of the bottom wall 3602 and two short-side side walls 3608 which stand upright from two short sides of the bottom wall 3602.

As shown in FIGS. 2 and 3, at the two long sides of the bottom wall 3602 which face each other, a plurality of cut sections 3610 for arranging the plurality of connection terminals 42 are formed such that they are arranged along the long sides.

As shown in FIGS. 3, 6, and 7, the plurality of connection terminals 42 are disposed in the cut sections 3610 formed in the bottom wall 3602 such that the connection terminals 42 are connectable to the contact pieces 32 on the substrate 30 and are elastically deformable in the thickness direction of the bottom wall 3602.

Here, the socket 24 is mounted on a substrate (not shown) provided in the electronic apparatus 10, and base ends of the plurality of connection terminals 42 are electrically connected to connection pads on the substrate by being soldered thereon.

In addition, as shown in FIG. 2, a cut section 3620 for receiving the elastic pieces 40 is formed in each long-side side wall 3606 so as to extend along the longitudinal direction of the long-side side wall 3606, and two cut sections 3630 for receiving the elastic pieces 40 are formed in each short-side side wall 3608 with an interval therebetween in the longitudinal direction of the short-side side wall 3608.

Four socket shielding plates 38 are provided and are assembled to the four side walls 3604 of the socket body 36.

In this example, the socket body 36 includes the socket shielding plates 38.

The four side walls 3604 include inner surfaces which face one another and outer surfaces positioned opposite to the inner surfaces. The socket shielding plates 38 are provided so as to cover the outer surfaces of the respective side walls 3604.

In this example, the socket shielding plates 38 include two long-side shielding plates 46 assembled to the two long-side side walls 3606 and two short-side shielding plates 48 assembled to the short-side side walls 3608.

The socket shielding plates 38 are made of a material having electromagnetic shielding characteristics and elasticity. The socket shielding plates 38 cover the outer surfaces of the four side walls 3604 of the socket body 36, and thereby cover the four side surfaces (long-side side surfaces 2806 and short-side side surfaces 2808) of the casing 28. Thus, the four side surfaces of the casing 28 are electromagnetically shielded. The material having electromagnetic shielding characteristics and elasticity used for forming the socket shielding plates 38 may be phosphor bronze, nickel silver, tin, copper, a material obtained by plating copper alloy, such as phosphoric bronze, with nickel or the like, or a material like stainless steel (for example, SUS304) which is conductive but does not have magnetism. Here, if a magnetic body is used as the above-described material having electromagnetic shielding characteristics, a magnetic-flux shielding effect can be obtained in addition to the electromagnetic shielding effect.

To explain more specifically, each of the socket shielding plates 38 (long-side shielding plates 46 and short-side shielding plates 48) has attachment pieces 38A formed in a bent shape with an interval therebetween in the extending direction of the socket shielding plate 38 at the top edge thereof. The attachment pieces 38A are inserted into attachment grooves 36A formed in end faces of the side walls 3604 (long-side side walls 3606 and short-side side walls 3608) of the socket body 36. Thus, the socket shielding plates 38 are attached to the outer surfaces of the respective side walls 3604 (long-side side walls 3606 and short-side side walls 3608).

In addition, the socket shielding plates 38 are grounded by being connected to a reference potential (ground level) of the electronic apparatus 10. For example, portions of the socket shielding plates 38 are grounded by being connected, by soldering or the like, to connection pads at the reference potential (ground level) which are provided on the substrate of the electronic apparatus 10 on which the socket 24 is mounted.

The elastic pieces 40 are formed integrally with the respective socket shielding plates 38. Each socket shielding plate 38 has two elastic pieces 40 with an interval provided therebetween in the extending direction of the socket shielding plate 38.

As shown in FIG. 2, the elastic pieces 40 are formed integrally with the respective socket shielding plates 38, and extend from the top edges of the socket shielding plates 38, which are separated from the bottom wall 3602, toward the bottom wall 3602 along the inner-surface sides of the side walls 3604 through bent portions 4001.

The elastic pieces 40 are disposed to be positioned inside the inner surfaces of the respective side walls 3606 and 3608 in the state in which each socket shielding plate 38 is attached to the corresponding side wall 3606 or 3608 of the socket body 36 with the attachment pieces 38A.

More specifically, in each long-side side wall 3606, the elastic pieces 40 are provided so as to face the cut section 3620. In each short-side side wall 3608, the elastic pieces 40 are provided so as to face the cut sections 3630. The elastic pieces 40 are elastically deformable in the thickness direction of the respective side walls 3606 and 3608. More specifically, elastic deformations of the elastic pieces 40 toward the outer surfaces of the respective side walls 3606 and 3608 are performed in the cut sections 3620 and 3630.

As shown in FIGS. 6 and 7, bent portions 4002 which project toward the inside of the socket body 36 are provided at intermediate sections of the elastic pieces 40. In the state in which the camera module 22 is housed in the socket body 36, the bent portions 4002 are in contact with the long-side side surfaces 2806 and the short-side side surfaces 2808 of the casing 28. Thus, the camera module 22 is elastically supported such that gaps S1 are provided between inner surfaces of the side surfaces 2806 and 2808 and inner surfaces of the respective side walls 3606 and 3608.

More specifically, the camera-body shielding plate 2810 is attached to the casing 28, and side-surface sections 2810B of the camera-body shielding plate 2810 are positioned at the long-side side surfaces 2806 of the casing 28. Therefore, in this example, the bent portions 4002 are not directly in contact with the long-side side surfaces 2806 of the casing 28 but are in contact with the side-surface sections 2810B of the camera-body shielding plate 2810. In other words, the bent portions 4002 are indirectly in contact with the long-side side surfaces 2806 of the casing 28 with the side-surface sections 2810B of the camera-body shielding plate 2810 interposed therebetween. Therefore, in this example, the camera-body shielding plate 2810 is grounded through the long-side shielding plates 46 by bringing the elastic pieces 40 of the long-side shielding plates 46 into contact with the side-surface sections 2810B of the camera-body shielding plate 2810.

Figure 9:
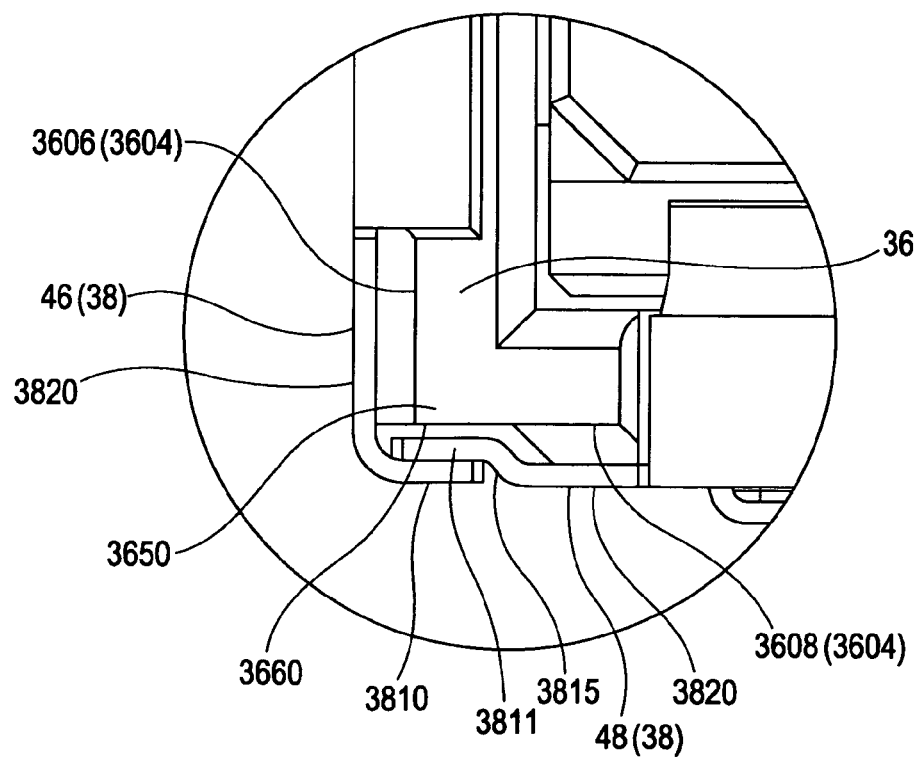
FIG. 9 is a fragmentary view taken in the direction of arrow C in FIG. 5.

In addition, as shown in FIG. 9, which is a fragmentary view taken in the direction of arrow C in FIG. 5, the socket shielding plates 38 overlap each other and are electrically connected to each other at the ends of each socket shielding plate 38 in the longitudinal direction thereof at four corner sections of the socket body 36. Thus, the entire peripheral area of the side surfaces of the socket body 36 is electromagnetically shielded by the four socket shielding plates 38. To explain more specifically, a bent-plate section 3810, for example, is formed at an end section of one of the socket shielding plates 38 that are adjacent to each other. The bent-plate section 3810 is placed on an end section 3811 of the other one of the socket shielding plates 38 that are adjacent to each other. The bent-plate section 3810 and the end section 3811 are constantly urged in a direction in which they come into contact with each other due to the elasticity of the socket shielding plates 38.

As shown in FIG. 7, when the camera module 22 is disposed on the bottom wall 3602 inside the four side walls 3604, the engaging units 41 engage with portions of the camera module 22 and serve to prevent the camera module 22 from moving in a direction away from the bottom wall 3602 of the socket 24. When the camera module 22 is disposed on the bottom wall 3602 inside the four side walls 3604 and the engaging units 41 engage with the portions of the camera module 22, a state in which the camera module 22 is attached to the socket 24 is established.

In the state in which the camera module 22 is attached, the plurality of connection terminals 42 are elastically deformed and are electrically connected to the plurality of contact pieces 32 on the substrate 30. In addition, the connection terminals 42 urge the camera module 22 in a direction toward the top surface 2802 of the casing 28. Accordingly, the contact pieces 32 on the substrate 30 are constantly and reliably in contact with the connection terminals 42 while a gap S2 is provided between the substrate 30 of the camera module 22 and the bottom wall 3602 of the socket 24.

The engaging units 41 are provided on the socket body 36. In this example, the engaging units 41 are formed of the bent portions 4002 of the elastic pieces 40 on the socket shielding plates 38 attached to the short-side side walls 3608. When the camera module 22 is inserted into the socket 24, the bent portions 4002 retain projecting portions 2820 of the short-side side surfaces 2808 of the casing 28. Thus, the camera module 22 is prevented from moving in a direction away from the bottom wall 3602 of the socket 24.

DETAILED DESCRIPTION

In addition, as shown in FIGS. 5 and 7, stoppers 62 which come into contact with portions of the cover 26 and prevent the cover 26 from moving in a direction toward the top surface 2802 of the casing 28 are provided on the short-side side walls 3608 of the socket body 36.

In this example, the stoppers 62 are formed of two retaining projections 4802 which project from the outer surface of each short-side shielding plate 48 with an interval therebetween in the extending direction of the short-side shielding plate 48.

In addition, in this example, as shown in FIG. 5, positioning engagement portions 64 for positioning the cover 26 with respect to the socket 24 in the thickness direction of the casing 28 by detachably engaging with the cover 26 are provided on the long-side side walls 3606 of the socket body 36.

In addition, in this example, the positioning engagement portions 64 are formed of two engagement recesses 6402 formed in the outer surfaces of the two long-side shielding plates 46 with intervals therebetween in the extending direction of the long-side shielding plates 46.

The cover 26 is made of a material having electromagnetic shielding characteristics and elasticity. The material having electromagnetic shielding characteristics and elasticity may be phosphor bronze, nickel silver, tin, copper, a material obtained by plating copper alloy, such as phosphoric bronze, with nickel or the like, or a material like stainless steel (for example, SUS304) which is conductive but does not have magnetism. Here, if a magnetic body is used as the above-described material having electromagnetic shielding characteristics, a magnetic-flux shielding effect can be obtained in addition to the electromagnetic shielding effect.

As shown in FIGS. 5 and 7, the cover 26 includes a top surface portion 50 and side surface portions 52.

The top surface portion 50 covers the top surface 2802 of the casing 28, and the side surface portions 52 covers the four socket shielding plates 38.

The top surface portion 50 has an opening 5002 at a position where the top surface portion 50 faces the imaging optical system 34. A transparent lens cover 58 is provided on the opening 5002.

To explain more specifically, the lens cover 58 has a circular plate shape and is attached to the outer surface of the top surface portion 50 with an annular piece of double-sided adhesive tape 5802.

In addition, an annular dustproof member 60 made of an elastic material is provided on the inner surface of the top surface portion 50 so as to extend along the periphery of the opening 5002. The dustproof member 60 is attached to the inner surface of the top surface portion 50 with an annular piece of double-sided adhesive tape 6002. The elastic material used for forming the dustproof member 60 may be a sponge-like material such as foamed polyurethane.

As shown in FIG. 5, the side surface portions 52 include long-side side surface portions 54 which cover the two long-side shielding plates 46 of the socket 24 and short-side side surface portions 56 which cover the two short-side shielding plates 48 of the socket 24.

Here, bottom edges of the short-side side surface portions 56 of the cover 26 are retained by the retaining projections 4802 on the shielding plates 38, so that the cover 26 is prevented from moving in a direction toward the top surface 2802 of the casing 28.

In addition, engagement projections 5402 which detachably engage with the engagement recesses 6402 are provided on the inner surfaces of the long-side side surface portions 54 of the cover 26 at positions corresponding to the engagement recesses 6402 in the socket 24. When the engagement projections 5402 engage with the engagement recesses 6402, the cover 26 is positioned in the thickness direction of the casing 28.

Thus, the side surface portions 52 of the cover 26 and the side walls 3604 of the socket body 36 are provided with the engagement recesses 6402 and the engagement projections 5402 which detachably engage with each other so as to position the cover 26 with respect to the socket 24 in the thickness direction of the casing 28. This is advantageous in preventing the cover 26 from being removed from the socket 24 and increasing the work efficiency when the image pickup device 20 is carried by itself or when the image pickup device 20 is assembled into the electronic apparatus 10.

In this example, the engagement projections 5402 and the engagement recesses 6402 engage with each other in the state in which the cover 26 is attached to the socket 24 to which the camera module 22 is attached. At the same time, the bottom edges of the short-side side surface portions 56 of the cover 26 are retained by the retaining projections 4802.

In the process of assembling the image pickup device 20, the camera module 22 is attached to the socket 24 mounted on the substrate of the electronic apparatus 10, and then the cover 26 is attached to the socket 24 from above. Thus, the image pickup device 20 is completed.

Then, the thus-structured image pickup device 20 is installed into the first housing 14 of the electronic apparatus 10 such that the lens cover 58 faces an opening 1410 formed in the first housing 14, as shown in (A) in FIG. 1.

Next, a modification of the socket 24 will be described.

In this modification, the structure of the stoppers 62 is different from that of the above-described socket 24 and other structures are similar to those of the above-described socket 24.

Figure 10:
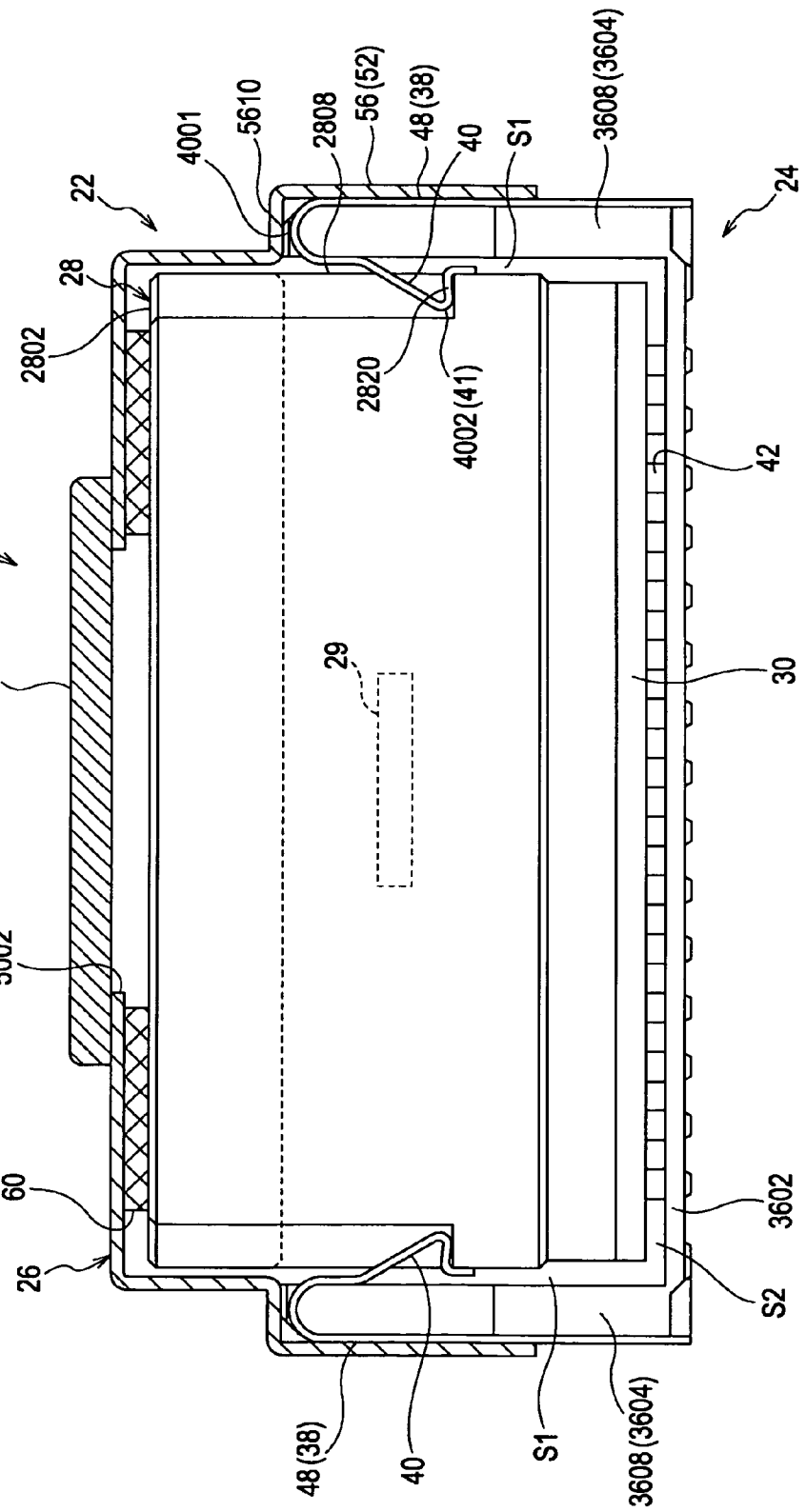
FIG. 10 is a sectional view of an image pickup device 20 according to a modification.

FIG. 10 is a sectional view of an image pickup device 20. In the following description, parts and components similar to those shown in FIGS. 1 to 9 are denoted by the same reference numerals.

In the above-described structure, the stoppers 62 are formed of the two retaining projections 4802 which project from the outer surface of each short-side shielding plate 48 with an interval therebetween in the extending direction of the short-side shielding plate 48. This modification differs from the above-described structure in that the stoppers 62 are formed of the bent portions 4001 at the top edge of each short-side shielding plate 48. Other structures are similar to the above-described structures.

In this modification, as shown in FIG. 10, retained portions 5610 which are retained by the bent portions 4001 are formed on the short-side side surface portions 56 of the cover 26, and the bent portions 4001 retain the retained portions 5610 so that the cover 26 is prevented from moving in a direction toward the top surface 2802 of the casing 28.

Next, a support structure of the camera module will be described.

As shown in FIG. 2, in the image pickup device 20, as described above, the elastic pieces 40 are provided on each of the side walls 3604. The elastic pieces 40 come into elastic contact with the four side surfaces (long-side side surfaces 2806 and short-side side surface 2808) of the casing 28 and elastically support the camera module 22 on the bottom wall 3602 inside the four side walls 3604 while the gaps S1 are provided between the camera module 22 and the four side walls 3604 in the state in which the plurality of contact pieces 32 are connected to the plurality of connection terminals 42.

The elastic pieces 40 are arranged to be elastically deformable in the thickness direction of the side walls 3604 on which the elastic pieces 40 are provided.

In addition, the elastic-deformation cut sections 3620 and 3630 for allowing the elastic pieces 40 to be elastically deformed are formed in the respective side walls 3604 at positions corresponding to the elastic pieces 40.

The elastic-deformation cut sections 3620 and 3630 are formed so as to extend through the side walls 3604 in the thickness direction thereof.

In addition, as shown in FIG. 2, two elastic pieces 40 are provided for each side wall 3604 so as to be in elastic contact therewith at two positions with an interval therebetween in the extending direction of the side wall 3604.

Also, each short-side side wall 3608 is provided with the elastic-deformation cut sections 3630 at two positions in the side wall 3604 which correspond to the two elastic pieces 40.

Also, each long-side side wall 3606 is provided with the elastic-deformation cut section 3620 which is formed as a single cut section that is large enough to allow the elastic deformation of the two elastic pieces 40.

The elastic-deformation cut sections 3620 and 3630 are formed so as to extend through the side walls 3604 in the thickness direction thereof and so as to be open at the top edges of the side walls 3604 which are separated from the bottom wall 3602.

In the image pickup device 20, as described above, the socket shielding plates 38 made of a material having electromagnetic shielding characteristics and elasticity are provided so as to cover the four side walls 3604, and the socket shielding plates 38 are arranged to be attached to the respective side walls 3604. The elastic pieces 40 are formed integrally with the socket shielding plates 38.

The four side walls 3604 have inner surfaces that face one another and outer surfaces positioned opposite to the inner surfaces. As shown in FIG. 2, the socket shielding plates 38 include main plate portions 3820 which are attached to the respective side walls 3604 so as to cover the outer surfaces of the respective side walls 3604.

The elastic pieces 40 are formed integrally with the main plate portions 3820.

As shown in FIG. 2, the elastic pieces 40 extend from the top edges of the main plate portions 3820, which are separated from the bottom wall 3602, toward the bottom wall 3602 through the first bent portions 4001 at positions separated from the main plate portions 3820 toward the inner surfaces of the side walls 3604.

In addition, the attachment pieces 38A are formed integrally with the main plate portions 3820.

The attachment pieces 38A are provided at positions separated from the first bent portions 4001 so as to extend from the top edges of the main plate portions 3820, which are separated from the bottom wall 3602, toward the bottom wall 3602 through second bent portions 3801 at positions separated from the main plate portions 3820 toward the inner surfaces of the side walls 3604.

The socket shielding plates 38 are attached to the side walls 3604 by inserting the attachment pieces 38A into the attachment grooves 36A, which open at the top edges of the side walls 3604 and extend in the height direction of the side walls 3604, and clamping the portions of the side walls 3604 forming the attachment grooves 36A between the attachment pieces 38A and the main plate portions 3820.

In addition, at a position corresponding to each elastic-deformation cut section 3620 formed as a single cut section in each long-side side wall 3606, a bent piece 3803 is provided so as to cover the elastic-deformation cut section 3620 (single cut section). The bent pieces 3803 extend from the top edges of the main plate portions 3820, which are separated from the bottom wall 3602, toward the bottom wall 3602 through third bent portions 3802 at positions separated from the main plate portions 3820 toward the inner surfaces of the side walls 3604. The electromagnetic shielding characteristics are enhanced by the bent pieces 3803 and the main plate portions 3820.

Here, the two elastic pieces 40 provided on each long-side side wall 3606 are formed together with the two first bent portions 4001 by forming cut sections 3804 in the bent piece 3803.

Next, the structure of the socket shielding plates will be described.

As described above, in the image pickup device 20, as shown in FIG. 2, the four side walls 3604 have the inner surfaces that face one another and the outer surfaces positioned opposite to the inner surfaces. The plurality of socket shielding plates 38 made of a material having electromagnetic shielding characteristics and elasticity are attached to the respective side walls 3604 so as to cover the outer surfaces of the four side walls 3604. The socket shielding plates 38 are arranged to be attached to the side walls 3604 by inserting the attachment pieces 38A into the attachment grooves 36A.

In addition, as shown in FIG. 9, the bent-plate sections 3810 and 3811 of the respective socket shielding plates 38 which are adjacent to each other overlap each other at corner sections 3650 between the adjacent side walls 3604 of the socket body 36, and are urged in a direction in which they come into contact with each other due to the elasticity of the respective socket shielding plates 38.

Four socket shielding plates 38 are provided for the four side walls 3604. The bent-plate sections 3810 and 3811 of the respective socket shielding plates 38 which are adjacent to each other overlap each other at the four corner sections 3650, and are urged in a direction in which they come into contact with each other due to the elasticity of the respective socket shielding plates 38.

Figure 11:
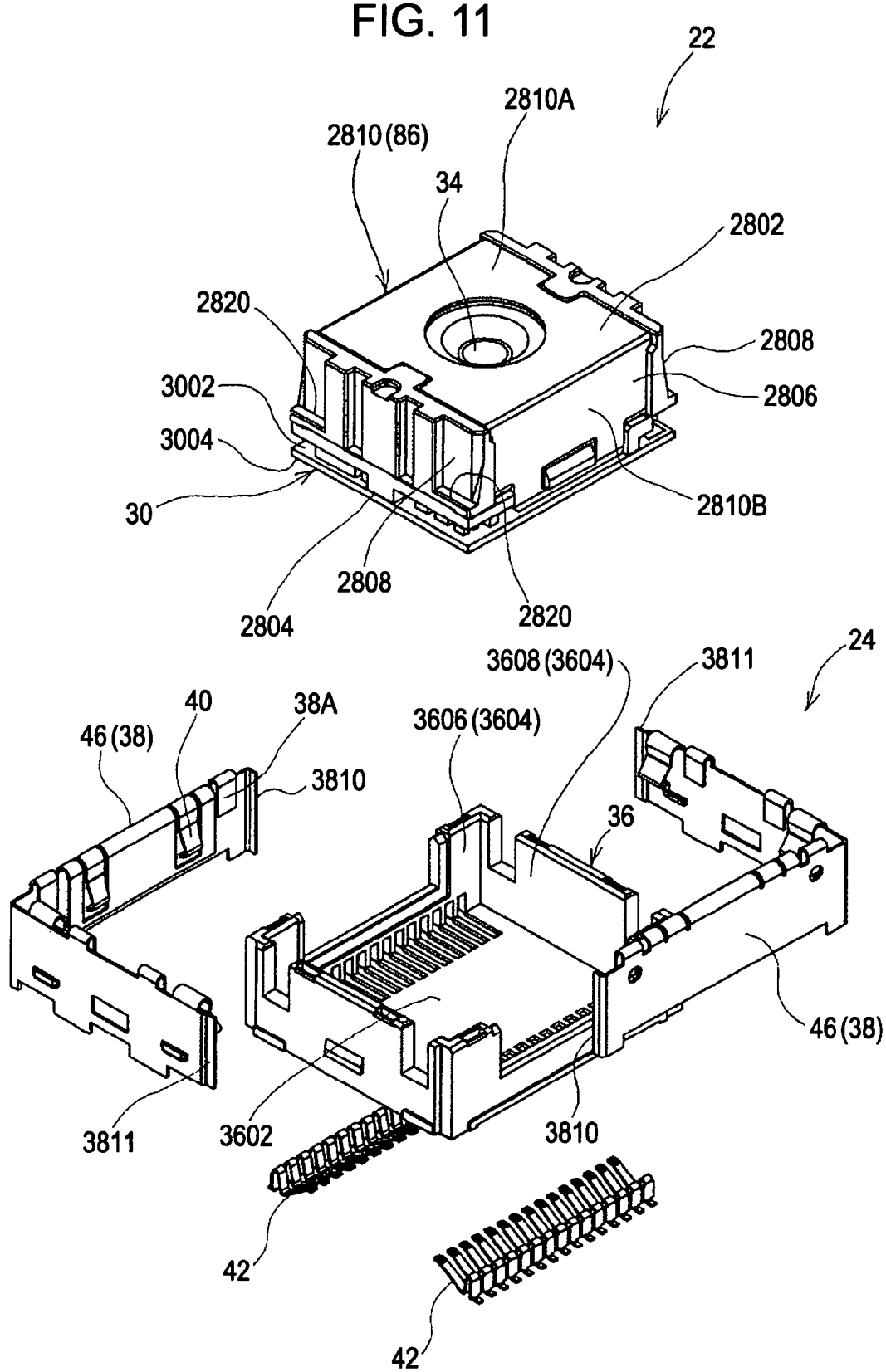
FIG. 11 is an exploded perspective view of a camera module 22 and a socket 24 included in the image pickup device 20 according to the modification.

More specifically, as shown in FIG. 11, two socket shielding plates 38 are provided so as to cover two adjacent side walls 3604 of the four side walls 3604. The bent-plate section 3810 and 3811 of the respective socket shielding plates 38 that are adjacent to each other overlap each other at two corner sections 3650, and are urged in a direction in which they come into contact with each other due to the elasticity of the respective socket shielding plates 38.

The bent-plate sections 3810 and 3811 of the respective socket shielding plates 38 that are adjacent to each other have the same height as that of the side walls 3604.

As shown in FIGS. 2, 9, and 11, recessed sections 3660 which extend along the entire length of the side walls 3604 in the height direction thereof are formed in the corner sections 3650.

The bent-plate sections 3810 and 3811 of the respective socket shielding plates 38 that are adjacent to each other overlap each other along the entire length of the recessed sections 3660 in the height direction thereof, and are urged in a direction in which they come into contact with each other.

The bent-plate sections 3810 and 3811 of the respective socket shielding plates 38 that are adjacent to each other will be described in detail. As shown in FIG. 9, the bent-plate section 3810 of one of the socket shielding plates 38 is formed as a first contact plate section 3810 which is bent at a right angle at an end section of the main plate portion 3820, which is disposed parallel to the side wall 3604 so as to cover the side wall 3604. The first contact plate section 3810 has the same height as the side walls 3604.

The end section 3811 of the other one is formed as a second contact plate section 3811 which extends continuously from the end section of the main plate portion 3820 through a bent section 3815 and extends parallel to the main plate portions 3820 at a position shifted toward the inner surface of the side wall 3604 by a distance corresponding to the thickness of the socket shielding plates 38. The second contact plate section 3811 has the same height as the side walls 3604.

The thus-structured first contact plate section 3810 and the second contact plate section 3811 of the respective socket shielding plates 38 that are adjacent to each other overlap each other and are urged in a direction in which they come into contact with each other over the entire length thereof in the height direction.

Next, the structure of the camera module 22 will be described in detail.

Figure 12:
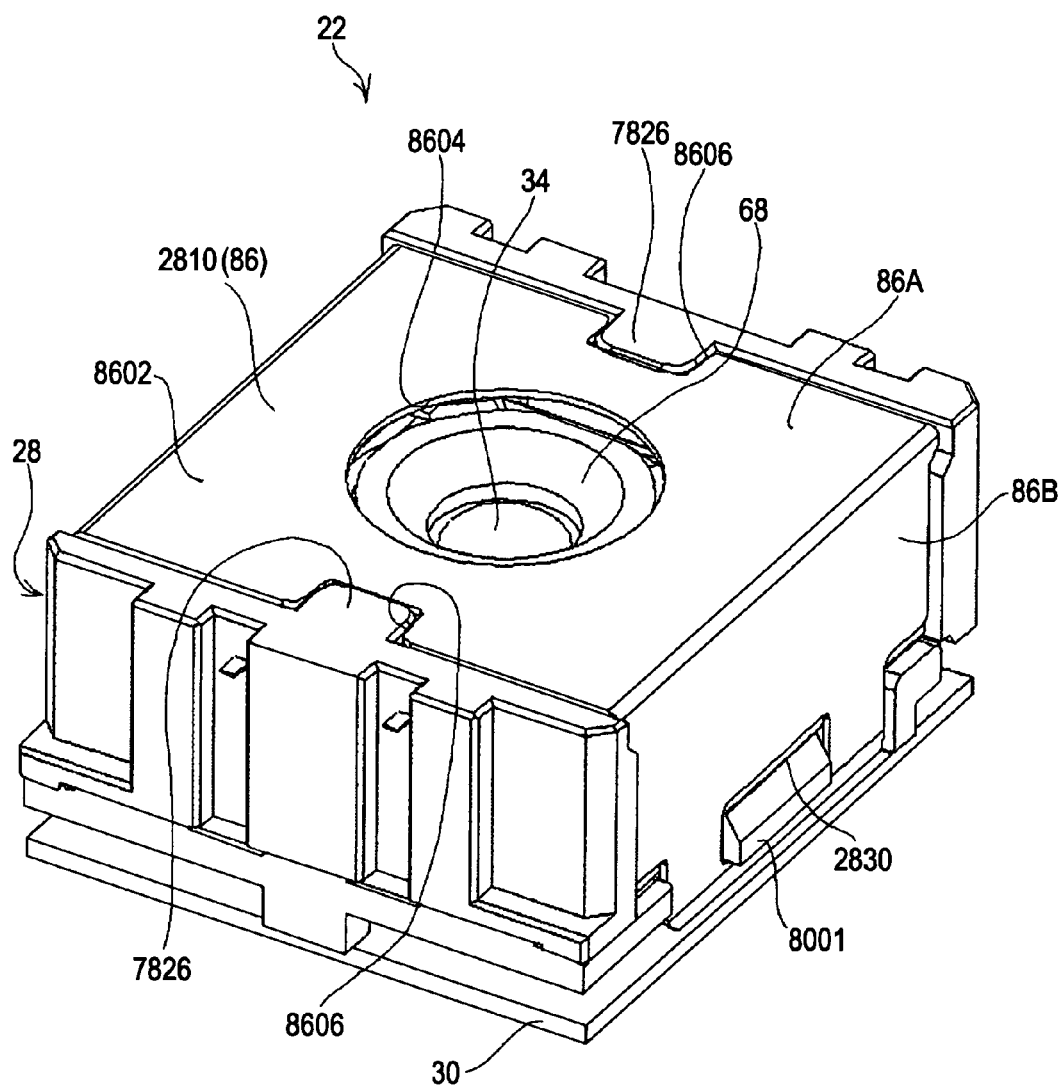
FIG. 12 is a perspective view of the camera module 22.
Figure 13:
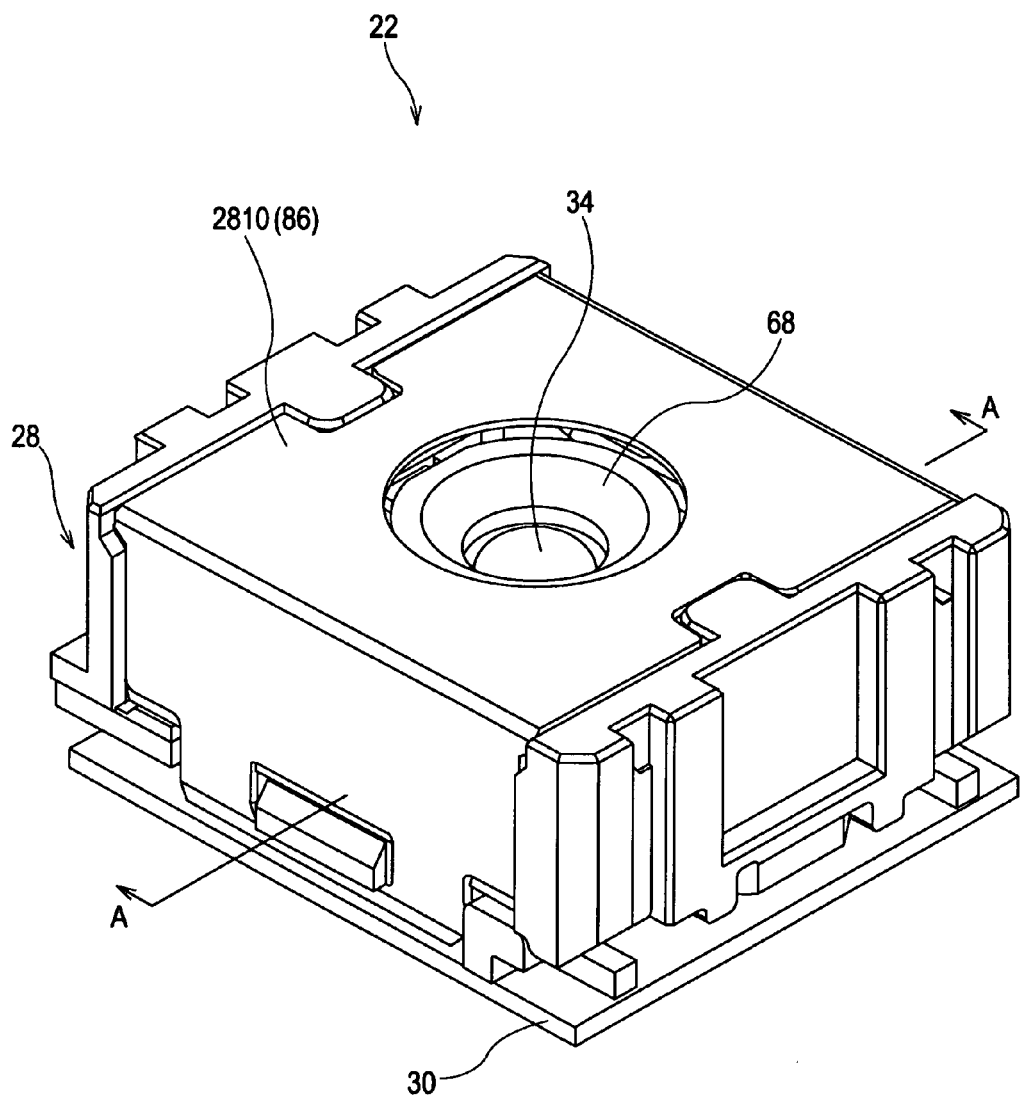
FIG. 13 is a perspective view of the camera module 22.
Figure 14:
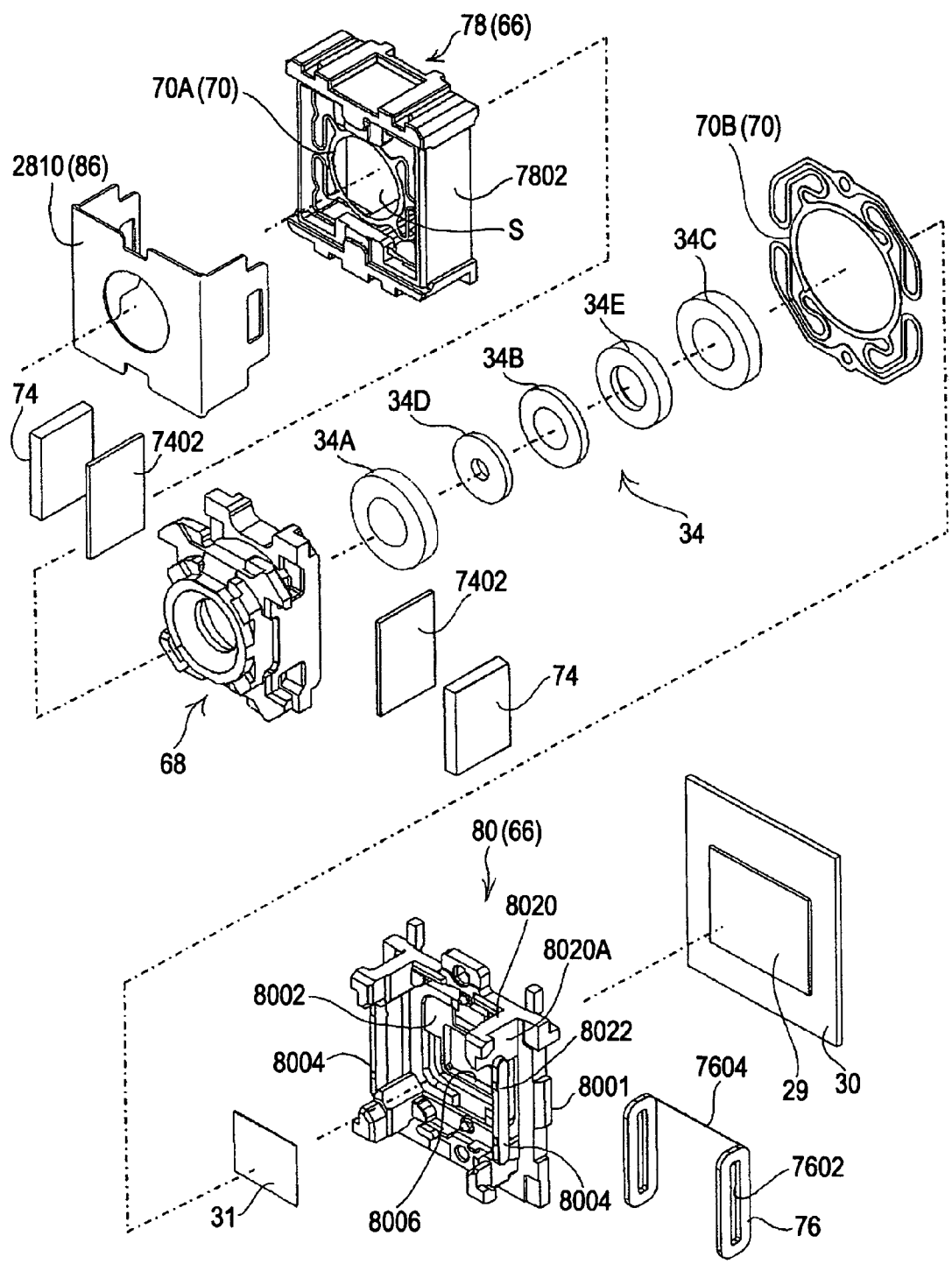
FIG. 14 is an exploded perspective view of the camera module 22.
Figure 15:
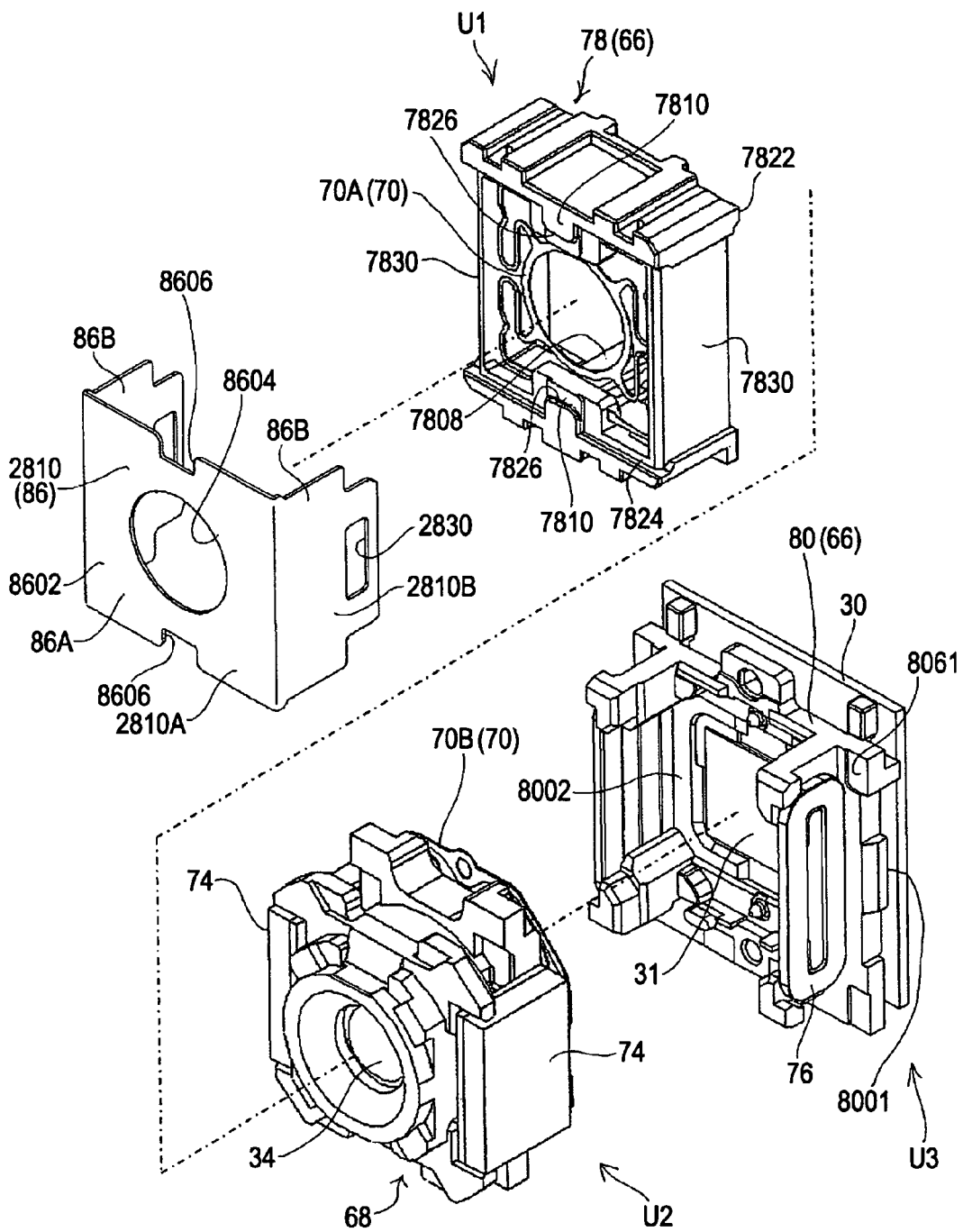
FIG. 15 is a diagram illustrating the assembly of the camera module 22.
Figure 16:
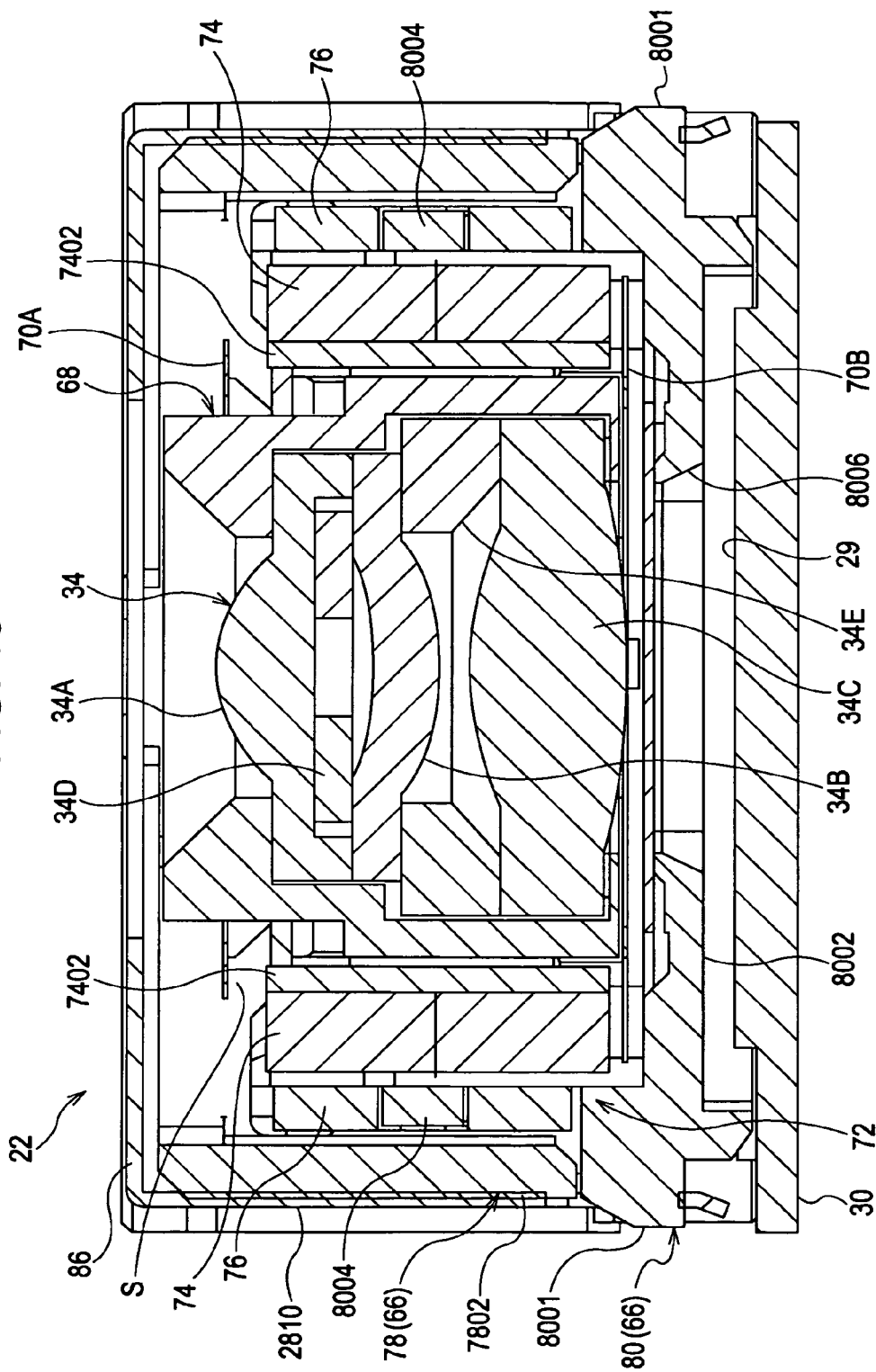
FIG. 16 is a sectional view of FIG. 13 taken along line A-A.

FIGS. 12 and 13 are perspective views of the camera module 22, FIG. 14 is an exploded perspective view of the camera module 22, FIG. 15 is a diagram illustrating the assembly of the camera module 22, and FIG. 16 is a sectional view of FIG. 13 taken along line A-A.

As described above, the camera module 22 includes the casing 28, the image pickup element 29, the signal processing unit, the substrate 30, and the contact pieces 32. In addition, the camera module 22 also includes the lens holding unit 68, springs 70, a driving unit 72, etc., as shown in FIGS. 14 to 16.

In the first reference example, the casing 28 is formed of a barrel unit 66, and the barrel unit 66 includes a front barrel 78 and a rear barrel 80.

Figure 17:
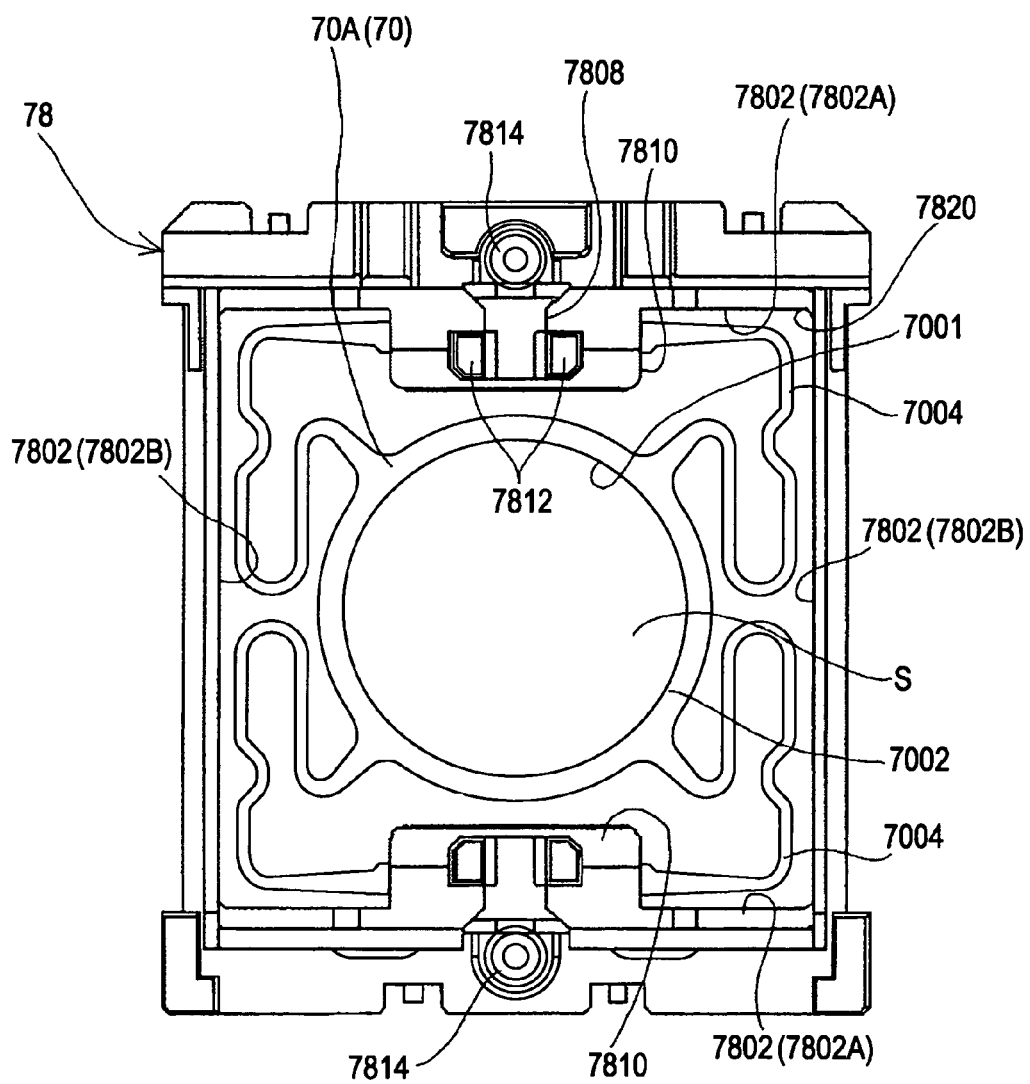
FIG. 17 is a rear view illustrating the structure in which a front spring 70A is attached to a front barrel 78.

FIG. 17 is a rear view of the front barrel 78 to which a front spring 70A is attached.

As shown in FIG. 16, the barrel unit 66 has a housing space S for housing the lens holding unit 68.

The barrel unit 66 is formed by combining the front barrel 78 and the rear barrel 80 together. As shown in FIGS. 14, 16, and 17, the front barrel 78 includes a peripheral wall 7802 which is positioned around an optical axis of the imaging optical system 34 and which partitions a side surface of the housing space S.

The front barrel 78 is formed by molding a synthetic resin material using a mold, and the peripheral wall 7802 has a rectangular frame shape having four side walls.

More specifically, as shown in FIG. 17, the peripheral wall 7802 includes a pair of first side walls 7802A which face each other and a remaining pair, which is a pair of second side walls 7802B which face each other.

The side walls 7802A and 7802B have a height in the optical axis direction and a width in a direction perpendicular to the height. In the first reference example, as shown in FIGS. 15 and 17, protruding walls 7808 are formed on the inner surfaces of the two first side walls 7802A at the centers thereof in the width direction so as to extend in the height direction.

Projections 7810 are formed at the front ends of the protruding walls 7808 so as to project from the edges of the protruding walls 7808 in the width direction thereof. In addition, as shown in FIG. 17, forked spring-pressing pieces 7812 are formed so as to project at the rear ends of the protruding walls 7808.

In addition, engaging pins 7814 for fixing the two first side walls 7802A to the rear barrel 80 are formed so as to project from the rear ends of the two first side walls 7802A.

Figure 18:
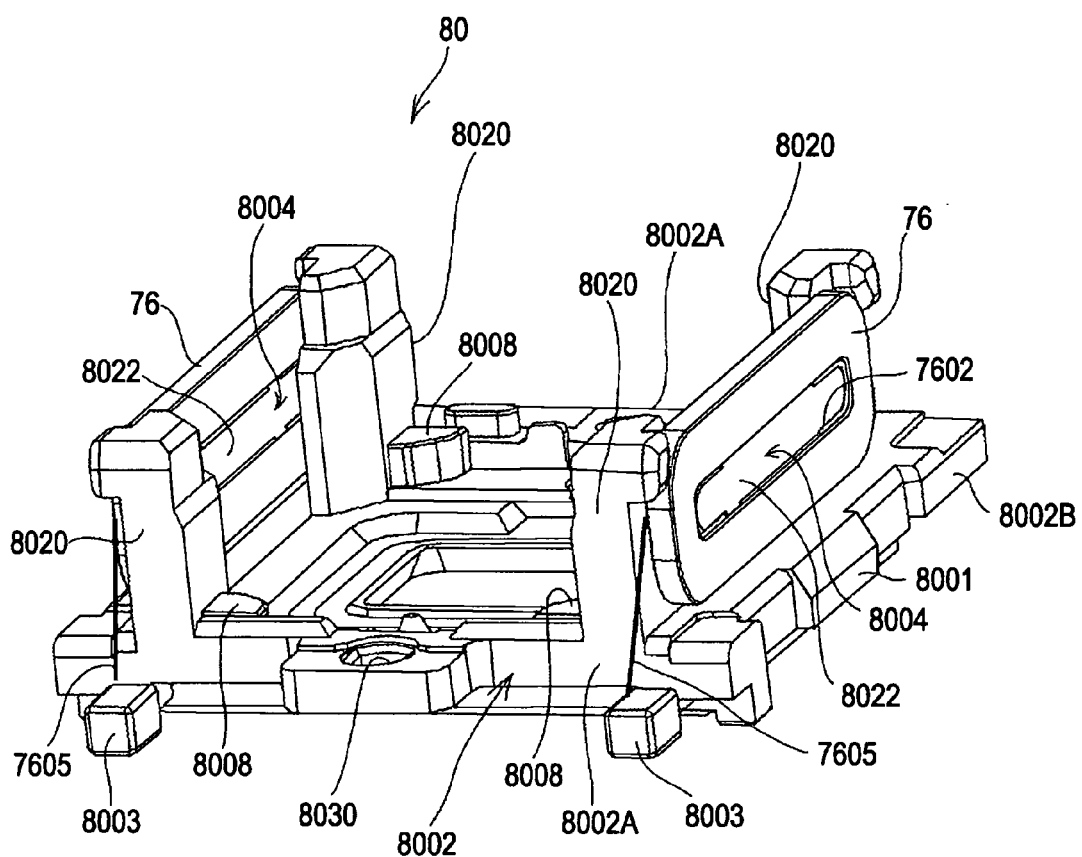
FIG. 18 is a perspective view of a rear barrel 80 to which coils 76 are attached.
Figure 19:
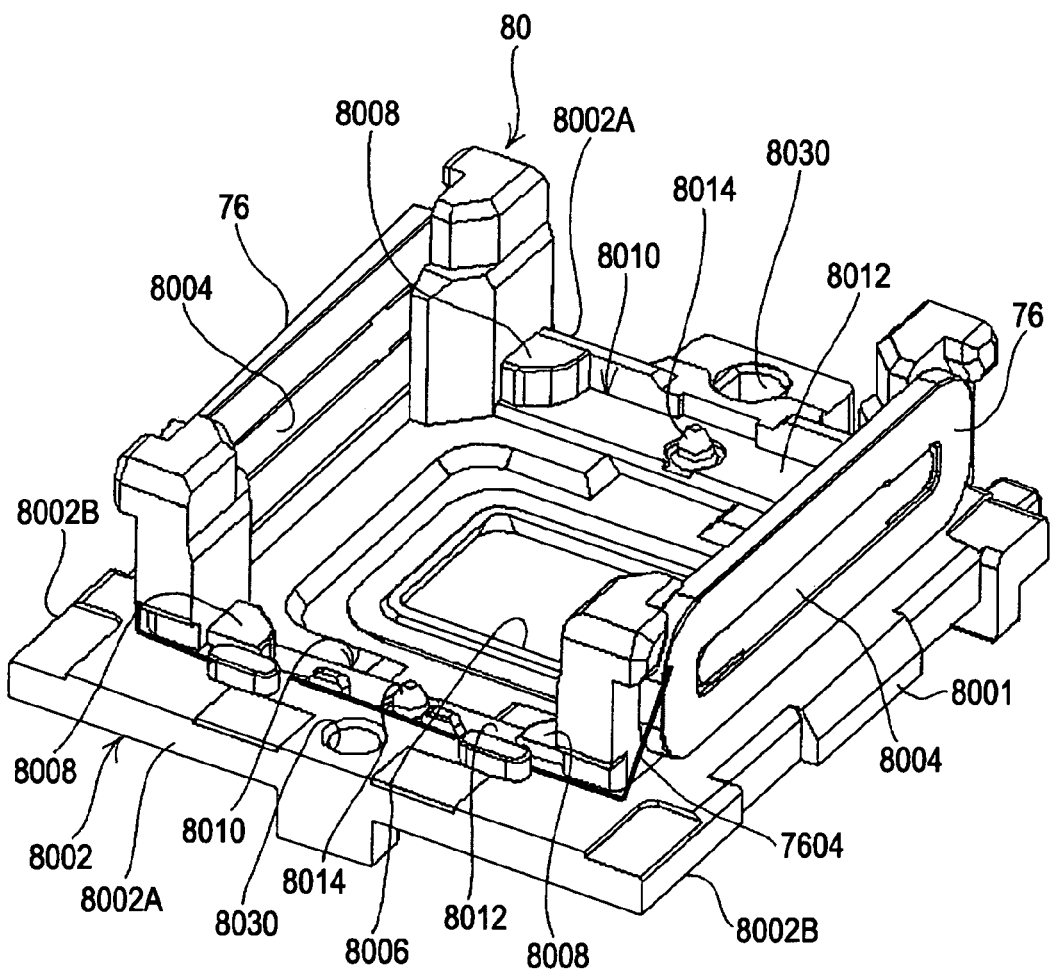
FIG. 19 is a perspective view of the rear barrel 80 to which the coils 76 are attached.
Figure 20:
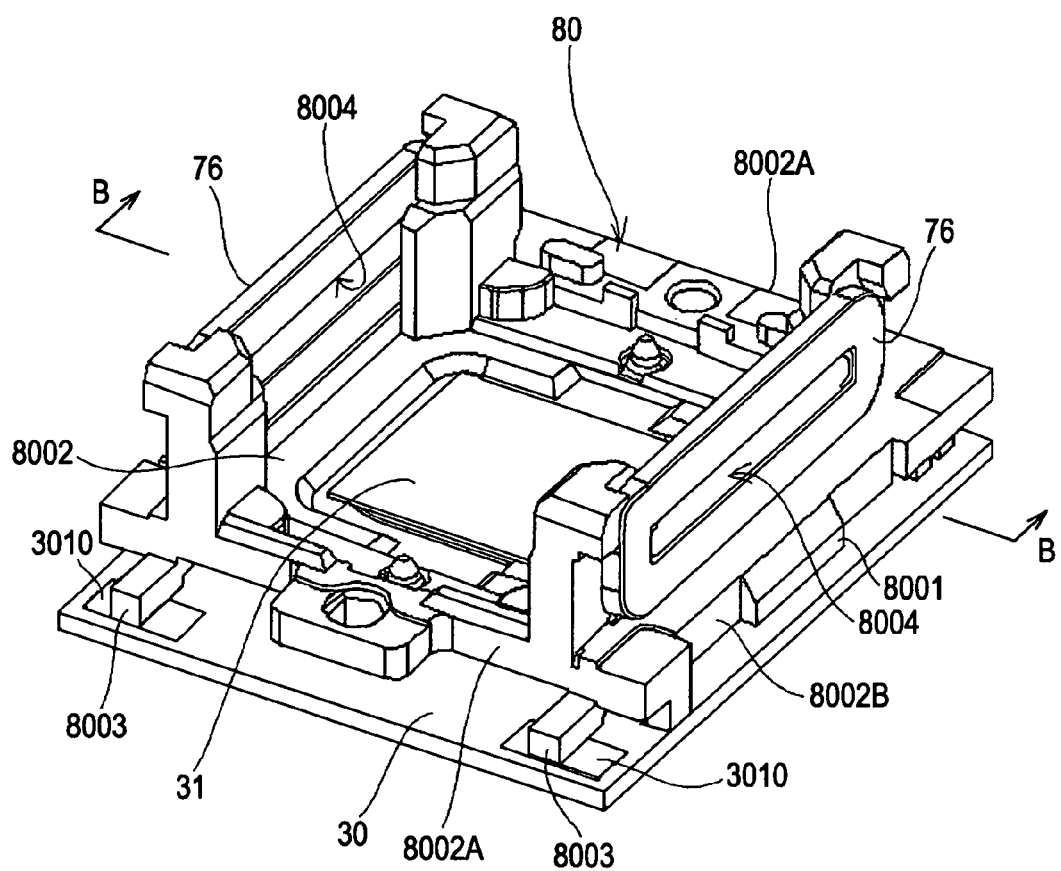
FIG. 20 is a perspective view of the rear barrel 80 to which the coils 76 and the substrate 30 are attached.
Figure 21:
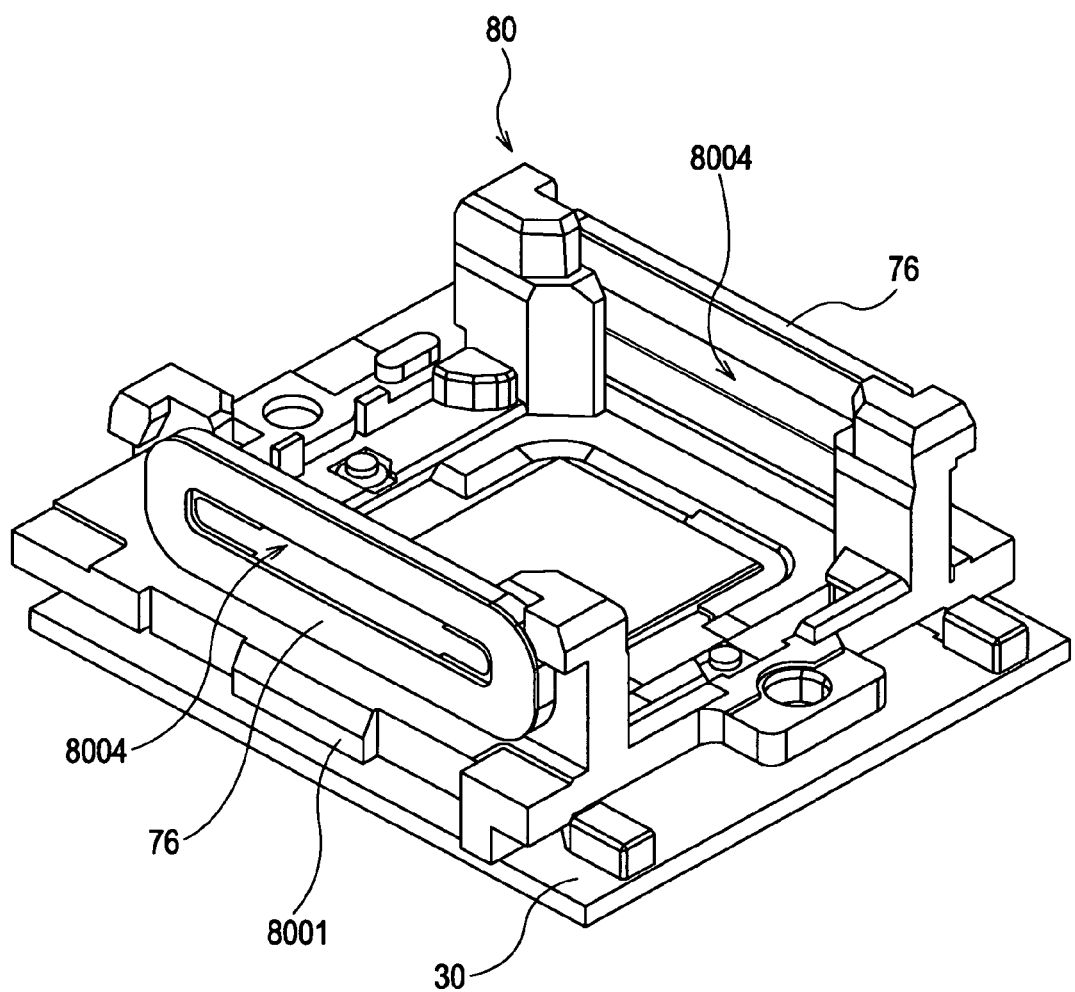
FIG. 21 is a perspective view of the rear barrel 80 to which the coils 76 and the substrate 30 are attached.
Figure 22:
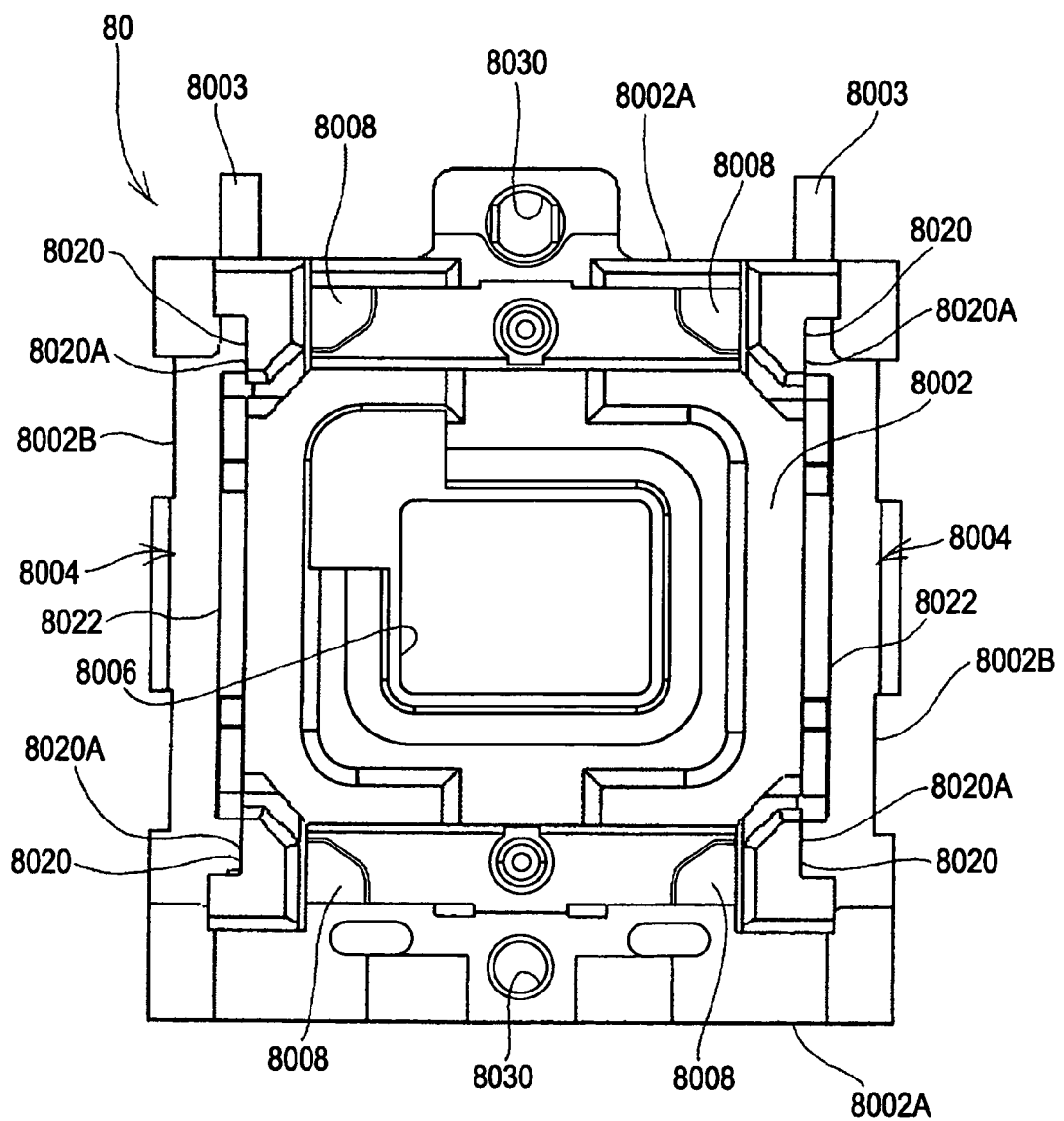
FIG. 22 is a plan view of the rear barrel 80.
Figure 23:
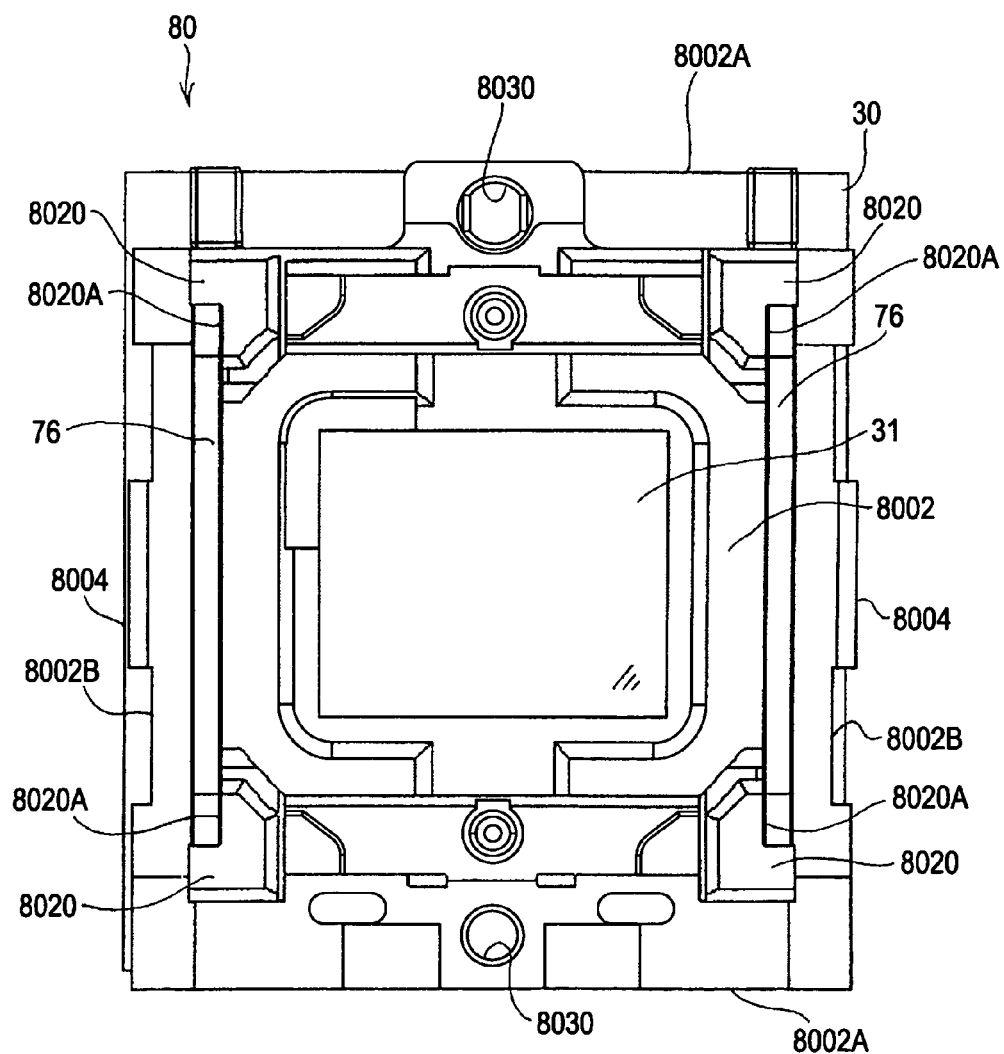
FIG. 23 is a plan view of the rear barrel 80 to which the substrate 30, an optical filter 31, and the coils 76 are attached.
Figure 24:
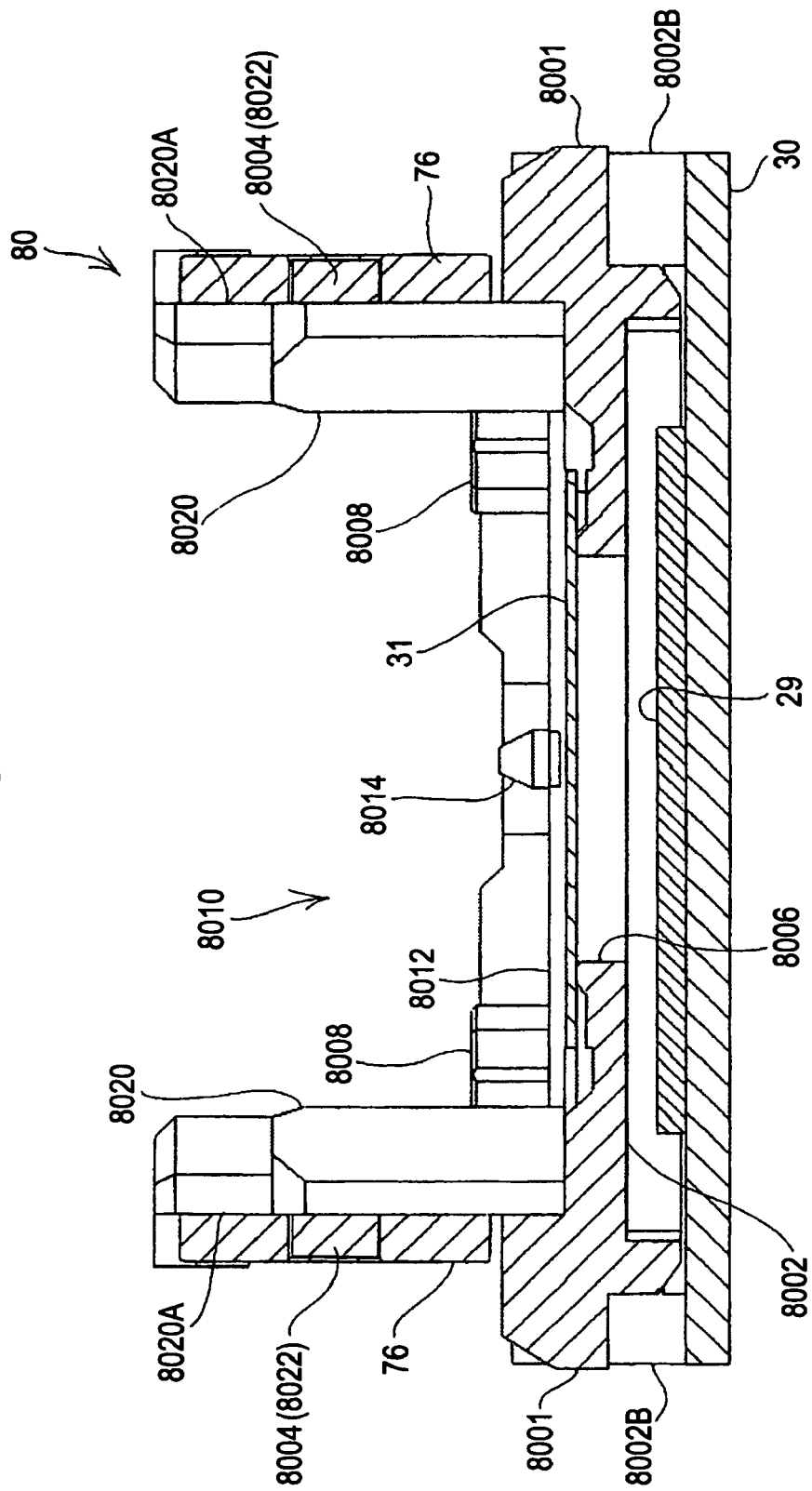
FIG. 24 is a sectional view of FIG. 20 taken along line B-B.

FIGS. 18 and 19 are perspective views of the rear barrel 80 to which coils 76 are attached, FIGS. 20 and 21 are perspective views of the rear barrel 80 to which the coils 76 and the substrate 30 are attached, FIG. 22 is a plan view of the rear barrel 80, FIG. 23 is a plan view of the rear barrel 80 to which the substrate 30, an optical filter 31, and the coils 76 are attached, and FIG. 24 is a sectional view of FIG. 20 taken along line B-B.

As shown in FIGS. 14, 16, and 22, the rear barrel 80 includes a rear end-face wall 8002, coil-attachment wall sections 8004, an opening 8006, and engagement projections 8001.

The rear end-face wall 8002 is formed in a rectangular shape such that the rear end-face wall 8002 extends along a plane perpendicular to the optical axis and closes the rear end of the housing space S in the optical axis direction.

As shown in FIGS. 18, 19, and 20, the rear end-face wall 8002 has two pairs of sides 8002A and 8002B which face each other. Engagement holes 8030 to which the engaging pins 7814 are engaged are formed at one pair of sides 8002A.

In addition, the coil-attachment wall sections 8004 are provided at the other pair of sides 8002B. In other words, the coil-attachment wall sections 8004 are provided on the rear end-face wall 8002 at two positions having the optical axis therebetween.

The coil-attachment wall sections 8004 are used for attaching the coils 76, and are formed so as to project from the rear end-face wall 8002 such that the coil-attachment wall sections 8004 are positioned inside the peripheral wall 7802 of the front barrel 78.

As shown in FIGS. 18 and 22, each coil-attachment wall section 8004 includes two pillar walls 8020 formed so as to project from the rear end-face wall 8002 at positions corresponding to the ends of the corresponding side 8002B and a connecting wall 8022 which connects intermediate sections of the two pillar walls 8020 in the height direction thereof.

In the first reference example, as shown in FIGS. 22 and 23, the outwardly facing surfaces of the two pillar walls 8020 are formed as coil abutting surfaces 8020A which extend along the same plane.

In addition, according to the first reference example, each connecting wall 8022 is formed so as to protrude outward from the coil abutting surfaces 8020A of the two pillar walls 8020, and extends in an elongate shape along the extending direction of the corresponding side 8002B.

The opening 8006 is rectangular and is formed in the rear end-face wall 8004 at a position corresponding to the optical axis. The image pickup element 29 is housed in the opening 8006.

The engagement projections 8001 are formed so as to project from the outer end faces of the rear end-face wall 8002 at which the coil-attachment wall sections 8004 are provided (at the other pair of sides 8002B).

As shown in FIGS. 19 and 24, attachment units 8010 to which the rear spring 70B is attached are provided on the front surface of the rear end-face wall 8002 at the sides 8002A thereof. The attachment units 8010 include two attachment surfaces 8012 and pins 8014 which project from the respective attachment surfaces 8012.

As shown in FIGS. 18 and 22, four abutting surfaces 8008 which extend along a single plane that is perpendicular to the optical axis are formed on the front surface of the rear end-face wall 8002 at positions inside the respective pillar walls 8020.

In the first reference example, as shown in FIG. 24, in the state in which the image pickup element 29 is positioned in the opening 8006, the substrate 30 which surrounds the periphery of the image pickup element 29 is attached to the rear surface of the rear end-face wall 8002. In addition, the optical filter 31 which covers the opening 8006 is attached to the front surface of the rear end-face wall 8002. Thus, the image pickup element 29 is sealed.

In the first reference example, the rear barrel 80 is formed by molding a synthetic resin material using a mold.

In the first reference example, as shown in FIGS. 12 and 15, engagement grooves 2830 formed in the two side-surface sections 2810B of the camera-body shielding plate 2810 engage with the two engagement projections 8001. Thus, the front barrel 78 is clamped between a top surface portion 2810A of the camera-body shielding plate 2810 and the rear end-face wall 8002 of the rear barrel 80, thereby combining the front barrel 78 and the rear barrel 80 together.

Figure 25:
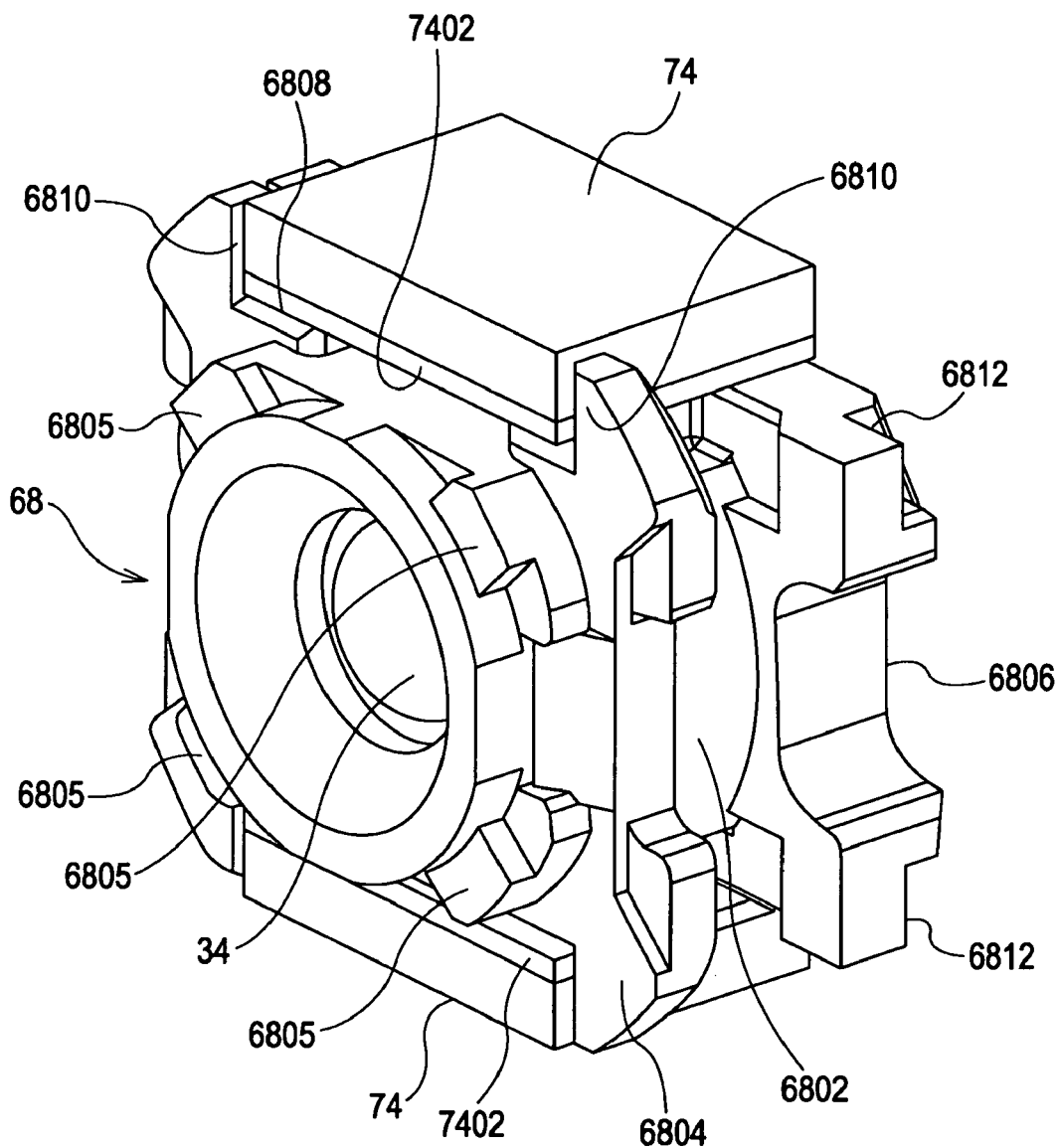
FIG. 25 is a perspective view of a lens holding unit 68 to which magnets 74 are attached.
Figure 26:
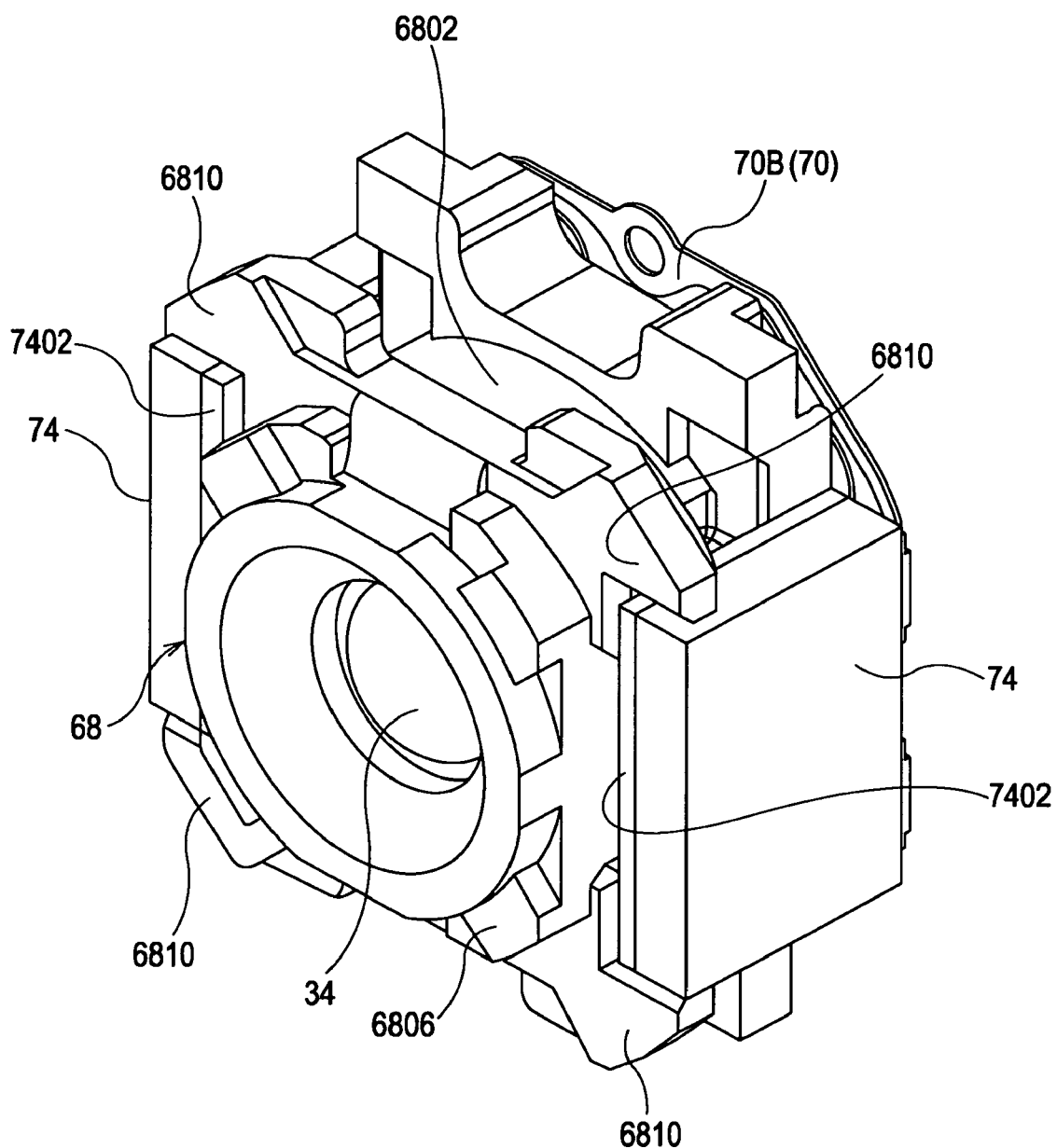
FIG. 26 is a perspective view of the lens holding unit 68 to which the magnets 74 and a rear spring 70B are attached.
Figure 27:
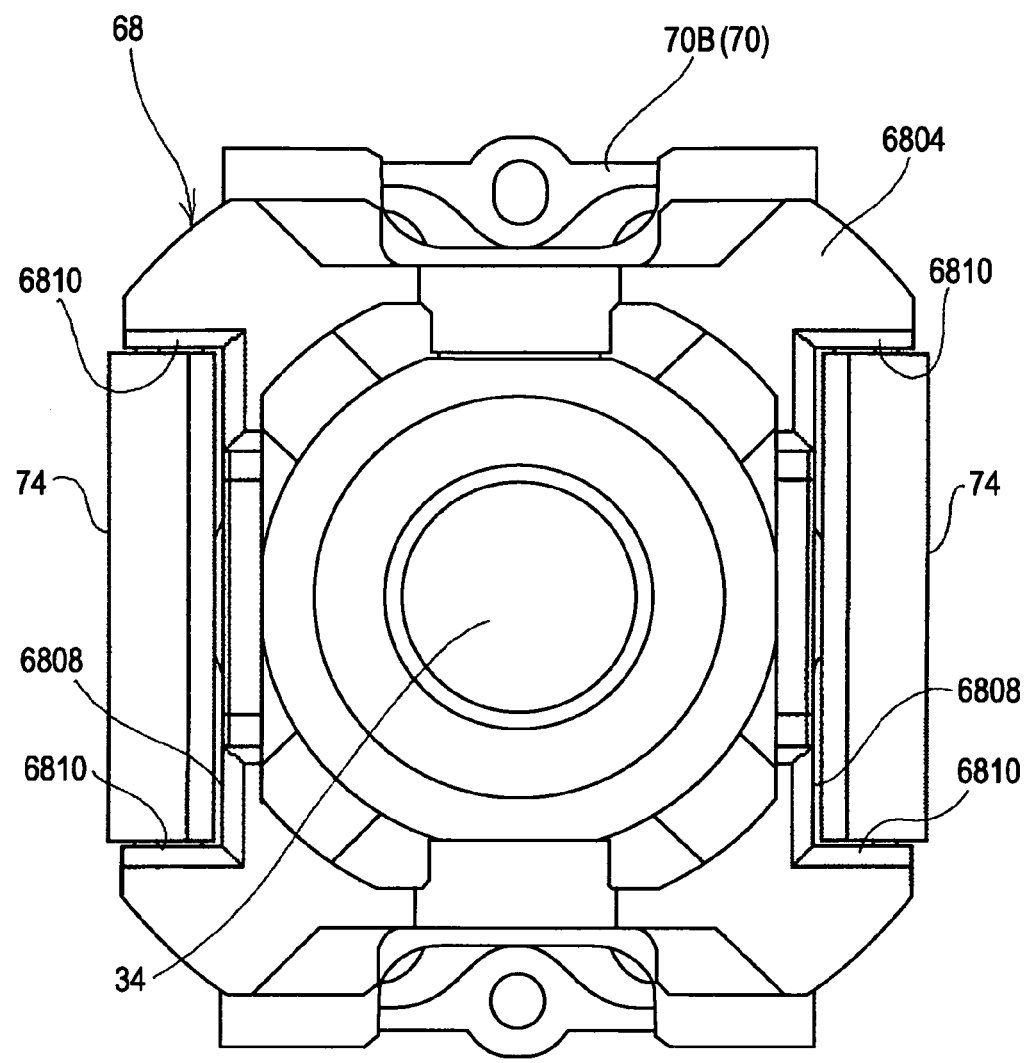
FIG. 27 is a plan view of the lens holding unit 68 to which the magnets 74 and the rear spring 70B are attached.
Figure 28:
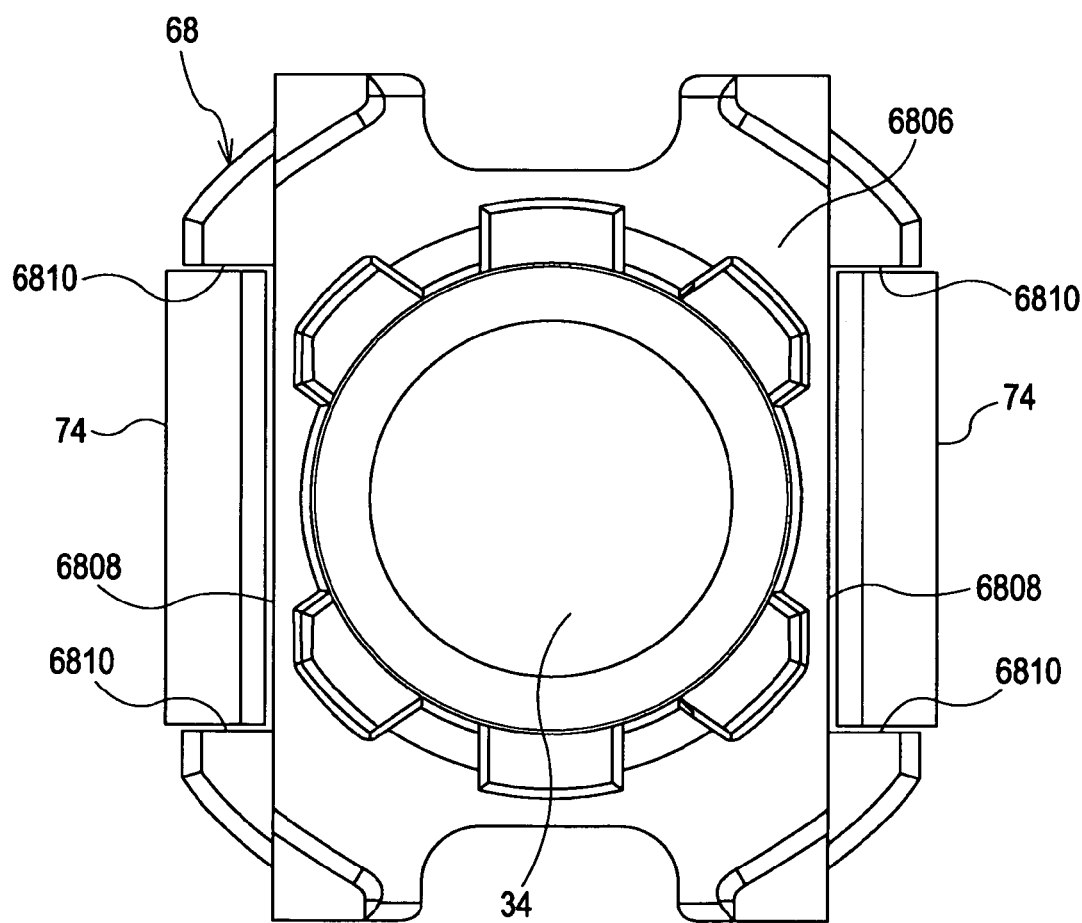
FIG. 28 is a rear view of the lens holding unit 68.
Figure 29:
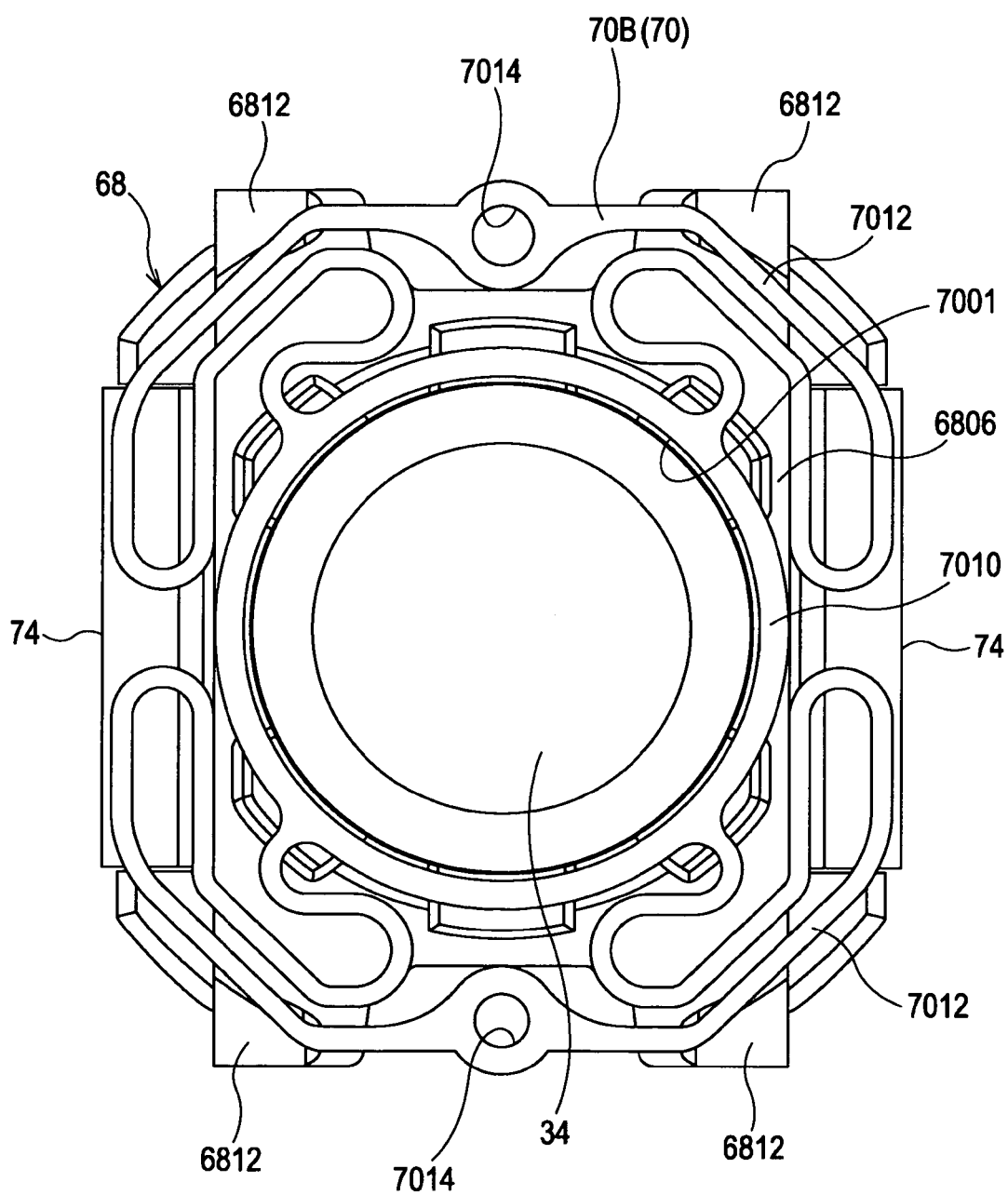
FIG. 29 is a rear view of the lens holding unit 68 to which the rear spring 70B is attached.

FIG. 25 is a perspective view of the lens holding unit 68 to which magnets 74 are attached, FIG. 26 is a perspective view of the lens holding unit 68 to which the magnets 74 and the rear spring 70B are attached, FIG. 27 is a plan view of the lens holding unit 68 to which the magnets 74 and the rear spring 70B are attached, FIG. 28 is a rear view of the lens holding unit 68, and FIG. 29 is a rear view of the lens holding unit 68 to which the rear spring 70B is attached.

As shown in FIGS. 14, 16, 25, and 29, the lens holding unit 68 is housed in the housing space S while the imaging optical system 34 is held by the lens holding unit 68.

In the first reference example, as shown in FIGS. 14 and 16, the imaging optical system 34 includes first to third group lenses 34A, 34B, and 34C, which are arranged in order from the front to the rear, an aperture 34D disposed between the first unit lens 34A and the second unit lens 34B, and a spacer 34E disposed between the second unit lens 34B and the third unit lens 34C.

As shown in FIGS. 25 and 26, the lens holding unit 68 includes a cylindrical portion 6802. The cylindrical portion 6802 has an inner surface on which the imaging optical system 34 is disposed and an outer surface which is positioned opposite to the inner surface.

A front flange 6804 and a rear flange 6806 are formed on the outer surface of the cylindrical portion 6802 at the front and rear ends, respectively.

In addition, as shown in FIG. 25, spring contact surfaces 6805 are formed outside the cylindrical portion 6802 at four positions which are evenly separated from each other along the peripheral direction such that the spring contact surfaces 6805 are positioned in front of the front flange 6804 and extend along a plane perpendicular to the optical axis.

In addition, as shown in FIGS. 25 and 27, attachment surfaces 6808 to which the magnets are to be attached are formed on the outer surface of the cylindrical portion 6802 at two positions that face each other. The attachment surfaces 6808 extend parallel to a single imaginary plane which passes through the optical axis.

In addition, a pair of clamping pieces 6810 for clamping the magnets are provided at the front edges of the attachment surfaces 6808 in the optical axis direction.

As shown in FIGS. 25 and 29, four abutting surfaces 6812 which extend along a single plane that is perpendicular to the optical axis are formed at four corners in the rear surface of the rear flange 6806.

The lens holding unit 68 is formed by molding a synthetic resin material using a mold.

As shown in FIGS. 14 and 16, the springs 70 are disposed in the housing space S so as to support the lens holding unit 68 such that the lens holding unit 68 is movable along the optical axis of the imaging optical system 34.

In the first reference example, the springs 70 are formed of two springs including the front spring 70A and the rear spring 70B. These springs 70A and 70B are disposed in the housing space S at respective positions between the barrel unit 66 and sections having the lens holding unit 68 disposed therebetween.

The front spring 70A is disposed between the front barrel 78 and the lens holding unit 68, and the rear spring 70B is disposed between the rear barrel 80 and the lens holding unit 68.

As shown in FIG. 29, the two springs 70A and 70B are formed of a thin plate body having a small width in an annular shape such that an opening 7001 for the optical path of the imaging optical system 34 is provided at the center.

To explain more specifically, as shown in FIG. 17, an annular plate portion 7002 in which the opening 7001 is formed at an inner section thereof and two supporting pieces 7004 which are connected to the outer periphery of the annular plate portion 7002 are provided such that they can be elastically deformed in the optical axis direction.

The front spring 70A is disposed between the front barrel 78 and the lens holding unit 68 such that the two supporting pieces 7004 at the outer periphery are attached to the projections 7810 of the front barrel 78, such that a front section of the cylindrical portion 6802 of the lens holding unit 68 is inserted through the opening 7001, and such that the annular plate portion 7002 is in contact with the four spring contact surfaces 6805 (see FIG. 25) of the lens holding unit 68.

In the first reference example, the two supporting pieces 7004 are attached to the projections 7810 (see FIG. 17) by being embedded therein in an insert-molding process for forming the front barrel 78.

As shown in FIG. 29, the rear spring 70B includes an annular plate portion 7010 in which the opening 7001 is formed at an inner section thereof and two supporting pieces 7012 which are connected to the outer periphery of the annular plate portion 7010.

The annular plate portion 7010 of the rear spring 70B is attached to the rear surface of the rear flange 6806 of the lens holding unit 68.

Here, the pins 8014 (see FIG. 19) on the rear barrel 80 are inserted into holes 7014 (see FIG. 29) formed in the two supporting pieces 7012 of the rear spring 70B. In addition, portions of the supporting pieces 7012 surrounding the holes 7014 are clamped between the spring-pressing pieces 7812 (see FIG. 17) of the front barrel 78 and the attachment surfaces 8012 (see FIG. 19) of the rear barrel 80. Thus, the rear spring 70B is disposed between the rear barrel 80 and the lens holding unit 68.

In addition, in the state in which electricity is not supplied to the coils 76 and no thrust is applied to the magnets 74 (lens holding unit 68), the front spring 70A and the rear spring 70B urge the lens holding unit 68 so that each abutting surface 6812 (see FIGS. 25 and 29) of the lens holding unit 68 is in contact with the corresponding abutting surface 8008 (see FIGS. 18 and 22) on the rear end-face wall 8002 of the rear barrel 80, in other words, so that the lens holding unit 68 is at the rearmost position in the optical axis direction.

In the first reference example, when each abutting surface 6812 of the lens holding unit 68 is in contact with the corresponding abutting surface 8008 on the rear end-face wall 8002 of the rear barrel 80, the state in which the optical axis of the imaging optical system 34 is perpendicular to an imaging plane of the image pickup element 29 is established. In addition, a focal length of the object image obtained by the imaging optical system 34 becomes infinity. Thus, an infinity position of the lens holding unit 68 (imaging optical system 34) is defined.

The driving unit 72 moves the lens holding unit 68 along the optical axis, and includes the magnets 74 and the coils 76, as shown in FIG. 14.

In the first reference example, as shown in FIGS. 25 and 26, two magnets 74 are provided. These magnets 74 are formed in an oblong square plate shape and have a height in the optical axis direction and a width greater than the height in a direction perpendicular to the height.

The two magnets 74 are disposed on the lens holding unit 68 at positions having the optical axis therebetween and extend parallel to a single imaginary plane which passes through the optical axis.

More specifically, the magnets 74 are disposed on the respective attachment surfaces 6808, and are adhered to the attachment surfaces 6808 such that the magnets 74 are clamped between the pair of clamping pieces 6810.

In the first reference example, the magnets 74 are polarized such that the N pole and the S pole are positioned at the ends thereof along the optical axis. Each magnet 74 is attached to the corresponding attachment surface 6808 with a plate-shaped yoke 7402, which is provided for efficiently guiding the magnetic flux to the corresponding coil 76, interposed therebetween.

As shown in FIGS. 18 to 24, the coils 76 are provided on the barrel unit 66 at two positions so as to face the magnets 74. Each of the two coils 76 includes a wire wound around an axial center that is perpendicular to the optical axis and is formed in an elongate shape having a height in the optical axis direction and a width greater than the height in a direction perpendicular to the height.

The two coils 76 are disposed on the barrel unit 66 at positions having the optical axis therebetween and extend parallel to a single imaginary plane which passes through the optical axis.

More specifically, the two coils 76 are formed by winding wires. As shown in FIG. 18, in the first reference example, the coils 76 have an elliptical shape having two linear portions which are parallel to each other and two curved portions which connect the linear portions at the ends thereof, and elongate central openings 7602 are formed at the center.

As shown in FIGS. 14 and 18, the coils 76 are attached with an adhesive such that the ends of the coils 76 in the longitudinal direction thereof are at the pillar walls 8020, the two curved portions are abutted against the coil abutting surfaces 8020A, and the connecting walls 8022 are fitted to the central openings 7602 in the coils 76.

As shown in FIG. 14, the two coils 76 are series-connected to each other with an intermediate wire portion 7604. As shown in FIG. 18, end portions 7605 of the wires of the respective coils 76 are wound around respective projecting portions 8003 which project from the rear end-face wall 8002. As shown in FIG. 20, the portions around which the wires are wound are solder-connected to soldering pads 3010 on the surface of the substrate 30 by soldering.

A driving signal is supplied to the wires from the substrate 30 through the respective soldering pads 3010, and accordingly magnetic fields are generated by the coils 76.

As a result, a force (thrust) is applied to the coils 76 in the optical axis direction due to interaction between the magnetic fields generated by the coils 76 and the magnetic fields generated by the magnetic poles of the magnets 74. Accordingly, the lens holding unit 68 and the imaging optical system 34 held by the springs 70 move in the optical axis direction. Thus, a focusing operation for focusing the object image formed on the imaging plane of the image pickup element 29 by the imaging optical system 34 is performed.

Figure 33:
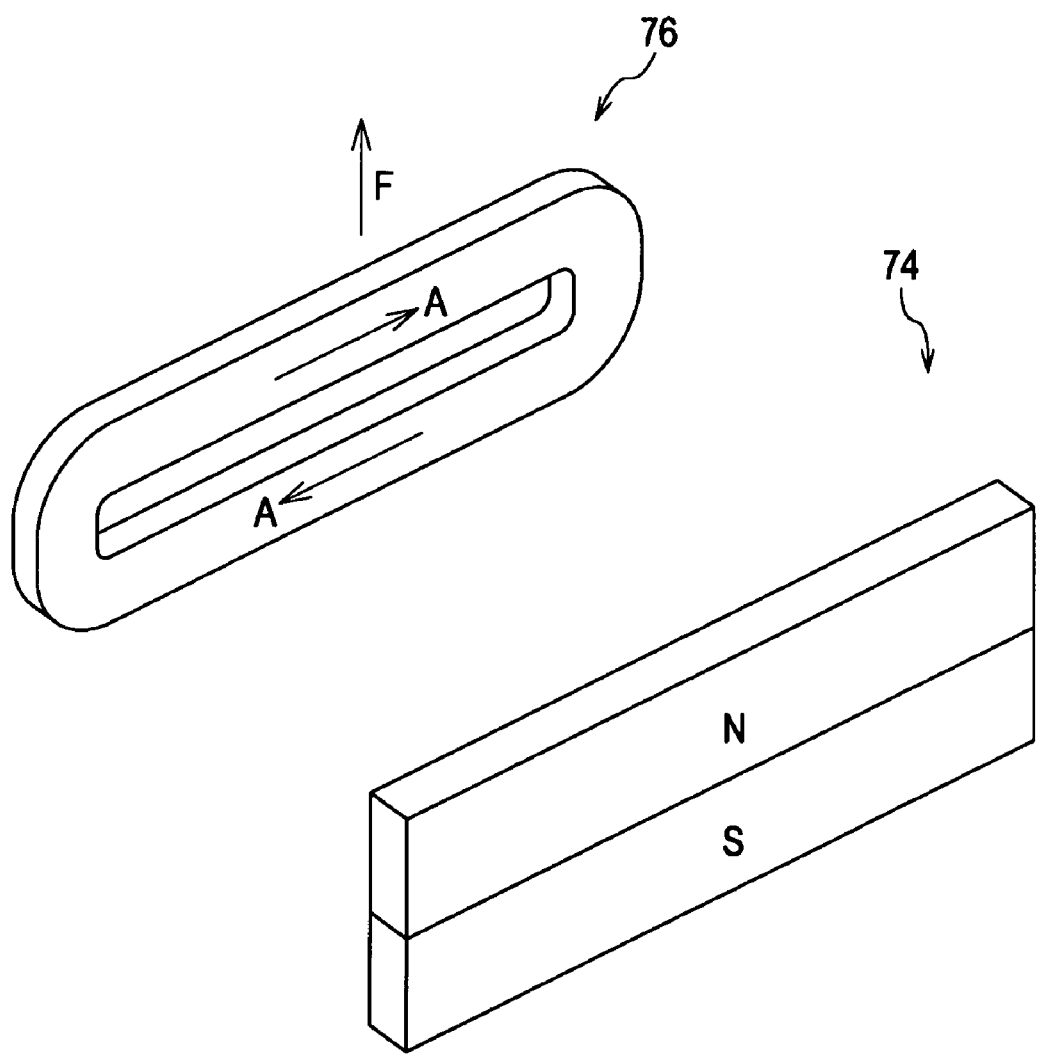
FIG. 33 is a diagram illustrating the operation of a magnet 74 and a coil 76.

FIG. 33 is a diagram illustrating the operation of a magnet 74 and the coil 76.

More specifically, referring to FIG. 33, an interaction occurs between a magnetic field generated by the magnet 74 and a magnetic field generated when a driving signal flows through the coil 76 in the direction shown by the arrows A. Due to this interaction, the lens holding unit 68 receives a force F along the optical axis in the direction shown by the arrow, and the lens holding unit 68 is moved accordingly.

When the driving signal flows through the coil 76 in a direction opposite to that in the above-described case, a magnetic field is generated by the coil 76 in a direction opposite to that in the above-described case. As a result, the lens holding unit 68 receives a force along the optical axis in a direction opposite to that in the above-described case, and the lens holding unit 68 is moved accordingly.

Here, in the first reference example, the imaging optical system 34 and the magnets 74 are provided on the lens holding unit 68, and two positions in the lens holding unit 68 having the center of gravity of the lens holding unit 68 therebetween serve as points of load at which the thrust is generated by the coils 76. In addition, points of application on the front spring 70A and the rear spring 70B are positioned between the above-mentioned center of gravity and the points of load. This is advantageous in accurately moving the lens holding unit 68 in the optical axis direction, and is therefore advantageous in suppressing distortion of the object image formed on the imaging plane of the image pickup element 29.

Next, a method for assembling the camera module 22 will be described.

As shown in FIG. 15, a first unit U1 in which the front spring 70A is assembled to the front barrel 78, a second unit U2 in which the imaging optical system 34, the magnets 74, and the rear spring 70B are assembled to the lens holding unit 68, and a third unit U3 in which the coils 76, the image pickup element 29, and the substrate 30 are assembled to the rear barrel 80 are assembled and prepared individually.

Then, the second unit U2 is assembled to the third unit U3. In other words, the pins 8014 (see FIG. 38) on the rear barrel 80 are inserted into the holes 7014 in the rear spring 70B, and the second unit U2 and the third unit U3 are combined together.

Next, the thus-obtained assembly is assembled to the first unit U1. In other words, the front section of the cylindrical portion 6802 of the lens holding unit 68 is inserted through the opening 7001 in the front spring 70A, and the annular plate portion 7002 is brought into contact with the four spring contact surfaces 6805 of the lens holding unit 68. Thus, the first unit U1 and the second unit U2 are combined together.

Lastly, the camera-body shielding plate 2810 is placed so as to cover the first unit U1, and the engagement grooves 2830 are caused to engage with the engagement projections 8001. In other words, the camera-body shielding plate 2810 is placed so as to cover the first unit U1 such that the front barrel 78 is clamped between the top surface portion 2810A of the camera-body shielding plate 2810 and the rear end-face wall 8002 of the rear barrel 80.

Thus, the first unit U1 and the third unit U3 are combined together and the camera module 22 is completed.

Here, in the first reference example, each abutting surface 6812 of the lens holding unit 68 comes into contact with the corresponding abutting surface 8008 of the rear end-face wall 8002 of the rear barrel 80, and accordingly the infinity position of the lens holding unit 68 (imaging optical system 34) is defined.

However, when each abutting surface 6812 of the lens holding unit 68 is brought into contact with the corresponding abutting surface 8008 of the rear end-face wall 8002 of the rear barrel 80, if the infinity position is defined while the lens holding unit 68 is tilted, the optical axis of the imaging optical system 34 will tilt with respect to the imaging plane of the image pickup element 29. Therefore, there is a risk that the object image formed by the imaging optical system 34 on the imaging plane will be distorted.

Such a phenomenon occurs for the reason that it is structurally impossible to make three kinds of positions including the center gravity of the lens holding unit 68 including the imaging optical system 34, the positions where the lens holding unit 68 is connected to each of the springs 70A and 70B, that is, the points of application (points of support), and the points of load, which are the positions where the thrust is generated by the two magnets 76, and that these three kinds of positions vary due to processing errors and assembly errors of the components.

Here, in this type of camera module 22, the distance between the camera module 22 and the object is generally about 1 m or more. Therefore, it is said that the percentage that the object is shot while the lens holding unit 68 (imaging optical system 34) is at the infinity position is 80% or more. Therefore, it is most important to prevent the distortion of the image picked up at the infinity position when the camera module 22 is used in practice.

The above-mentioned tilting of the lens holding unit 68 in the state in which the lens holding unit 68 (imaging optical system 34) is at the infinity position can be prevented by adopting the structure described below.

Figure 30:
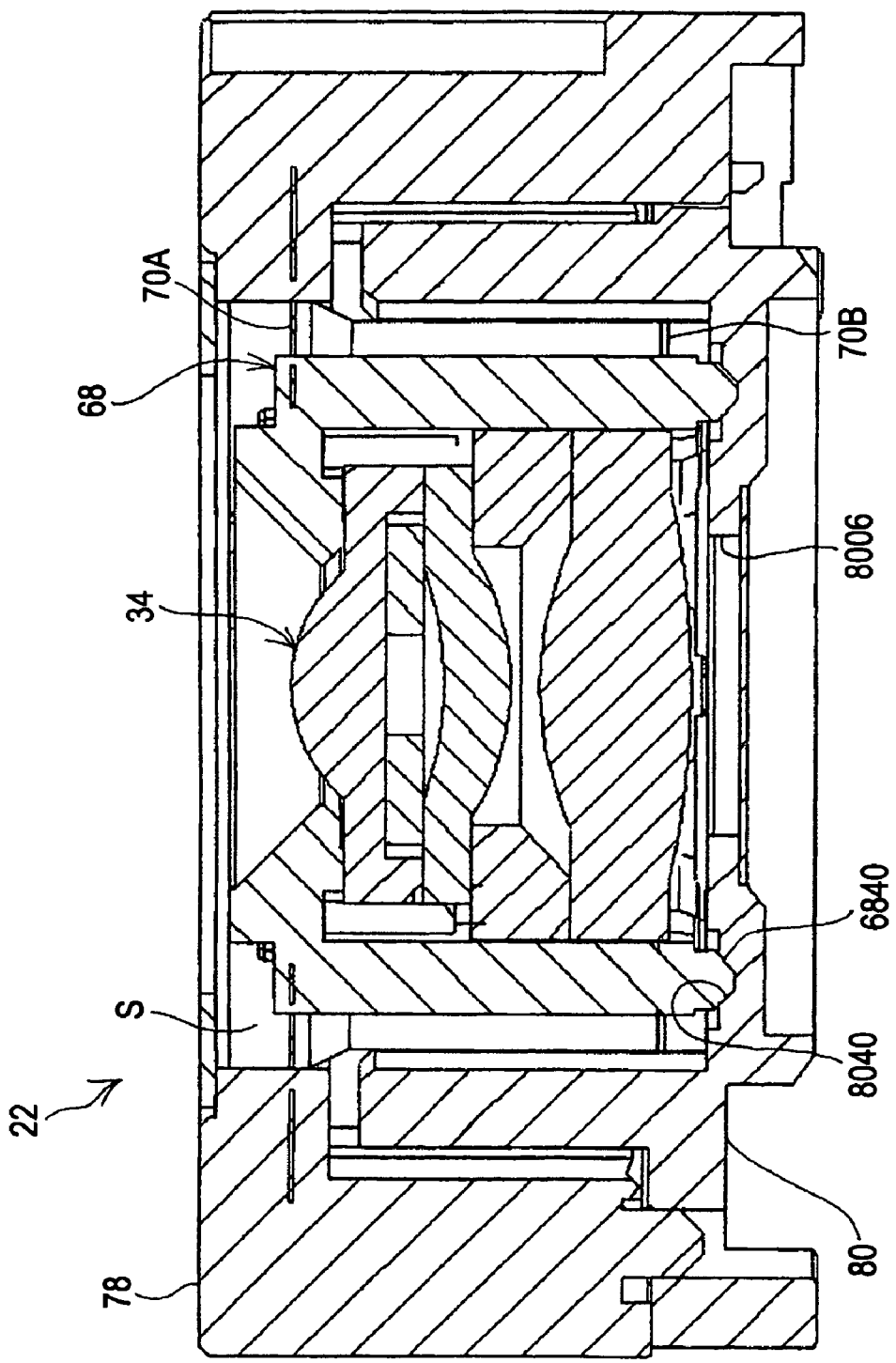
FIG. 30 is a sectional view of the camera module 22 in which the lens holding unit 68 is prevented from tilting.
Figure 31:
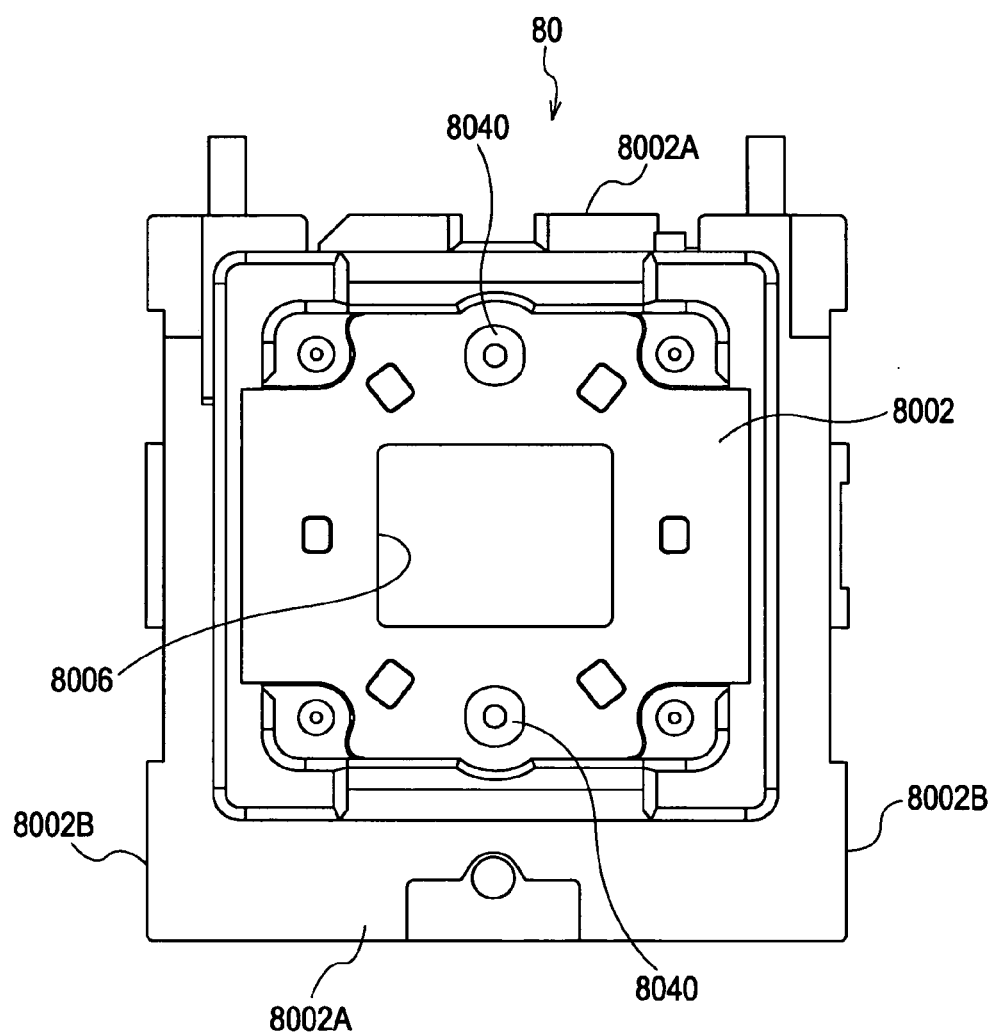
FIG. 31 is a plan view of the rear barrel 80 in the camera module 22.
Figure 32:
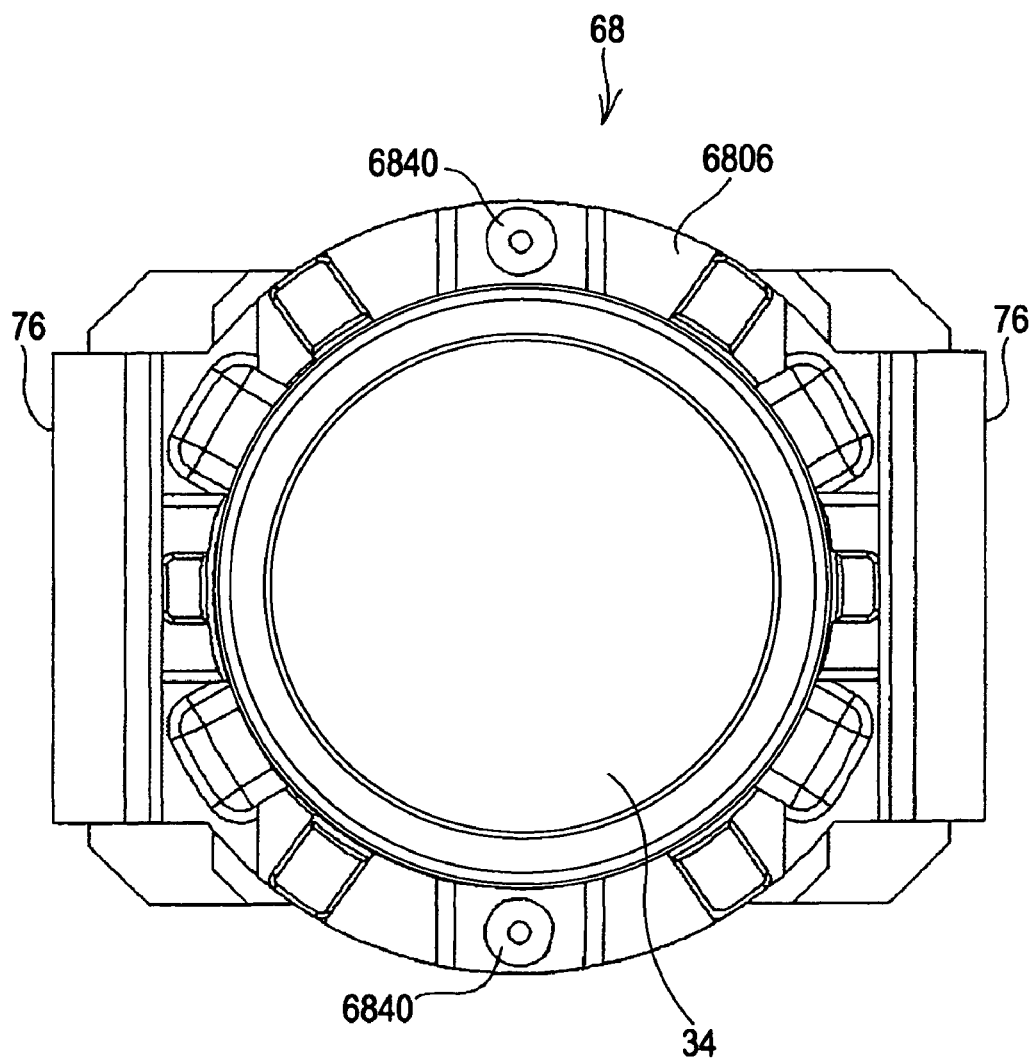
FIG. 32 is a rear view of the lens holding unit 68.

FIG. 30 is a sectional view of the camera module 22 in which the lens holding unit 68 is prevented from tilting, FIG. 31 is a plan view of the rear barrel 80 in the camera module 22, and FIG. 32 is a rear view of the lens holding unit 68.

As shown in FIGS. 30 and 31, the rear end-face wall 8002 of the rear barrel 80 has two engagement recesses 8040 having conical surfaces which are formed along axial lines perpendicular to the plane along which the rear end-face wall 8002 extends.

The two engagement recesses 8040 are formed at two positions having the optical axis therebetween and distanced from the optical axis by the same distance.

As shown in FIGS. 30 and 32, engagement projections 6840 are provided on the rear flange 6806 of the lens holding unit 68 at positions where the engagement projections 6840 face the two engagement recesses 8040. The engagement projections 6840 are formed along axial lines that are parallel to the optical axis and have conical surfaces shaped so as to match the conical surfaces of the two engagement recesses 8040.

Therefore, when the supply of electricity to the coils 76 is stopped, the lens holding unit 68 is moved rearward by the urging force applied by the springs 70A and 70B, and the two engagement projections 6840 on the lens holding unit 68 engage with the two engagement recesses 8040 in the rear barrel 80. Thus, the infinity position of the lens holding unit 68 (imaging optical system 34) is defined.

In this case, the conical surfaces of the engagement projections 6840 and the conical surfaces of the engagement recesses 8040 come into contact with each other so that the orientation of the lens holding unit 68 is defined so as to make the axial lines of the conical surfaces coincide with each other. As a result, the lens holding unit 68 is prevented from tilting at the infinity position of the lens holding unit 68 (imaging optical system 34).

Therefore, distortion of the object image formed on the imaging plane by the imaging optical system 34 can be prevented from occurring.

Here, also in the case where the lens holding unit 68 (imaging optical system 34) is at the front-end position which is opposite to the infinity position, that is, also in the case where the camera module 22 is closest to the object, distortion of the image can, of course, be prevented by adopting a structure similar to the above-described structure. In such a case, the engagement projections and the engagement recesses may be provided at the lens holding unit 68 and the front barrel 78, respectively.

Next, a second reference example will be described.

Figure 34:
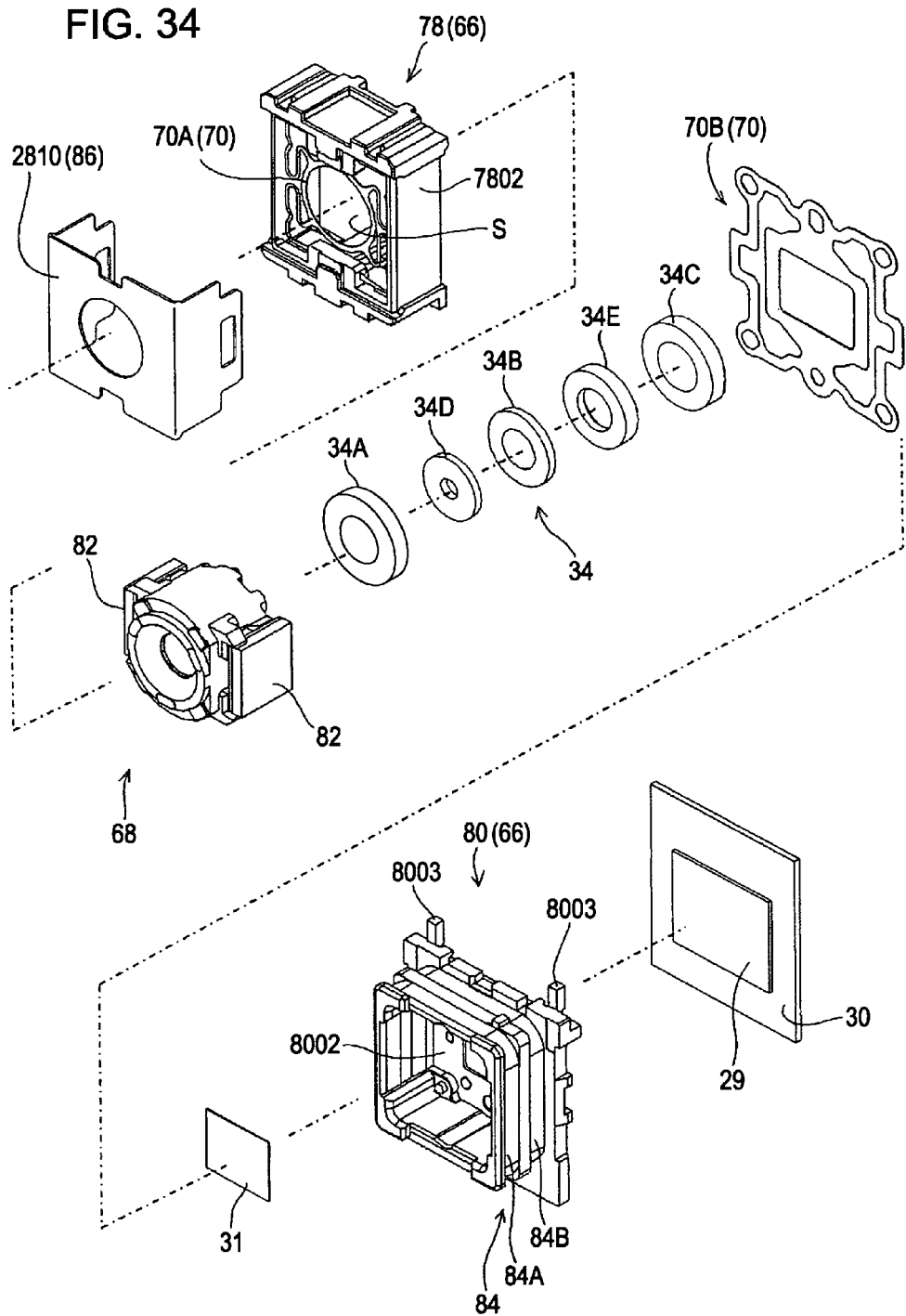
FIG. 34 is an exploded perspective view of a camera module 22.
Figure 35:
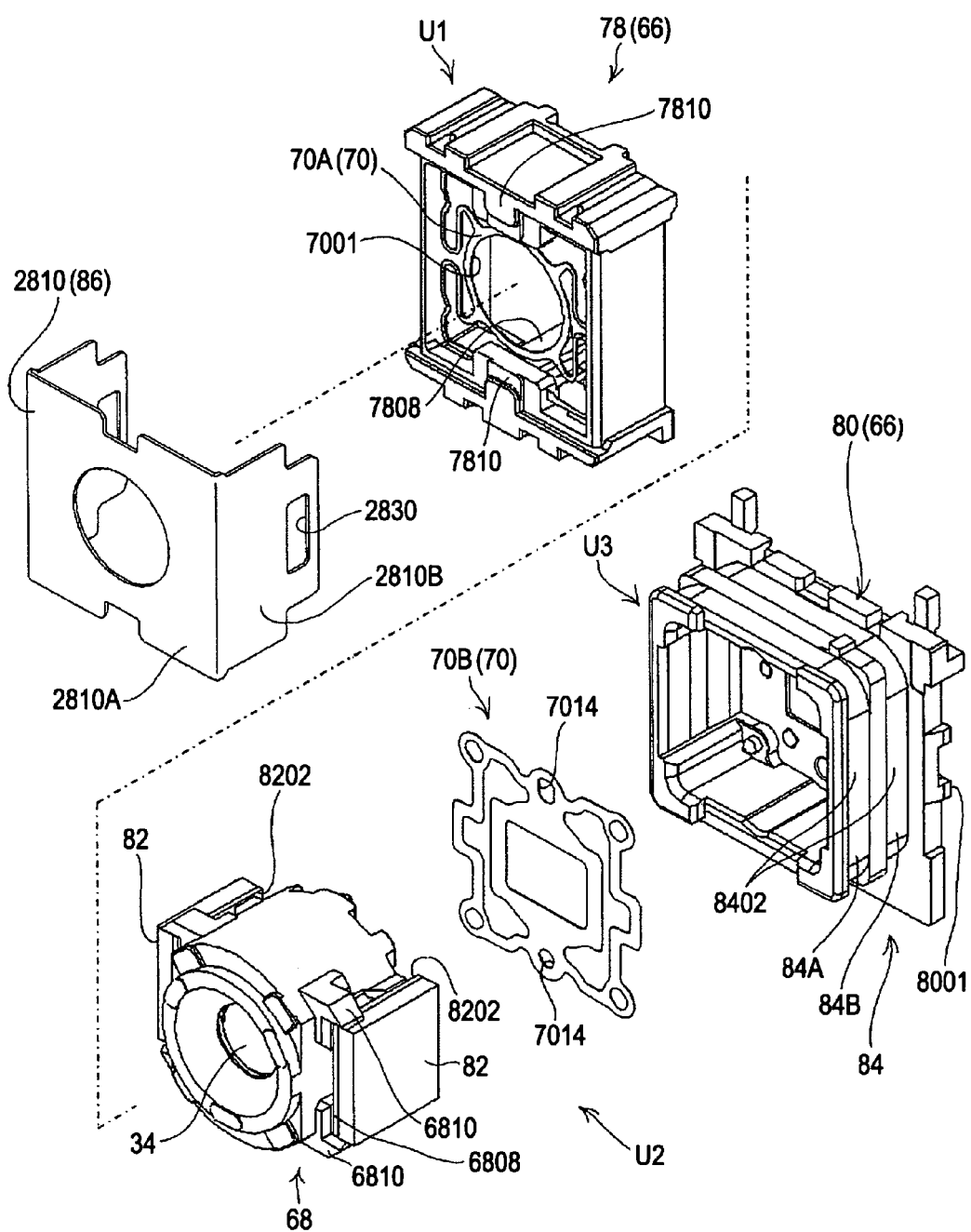
FIG. 35 is a diagram illustrating the assembly of the camera module 22.
Figure 36:
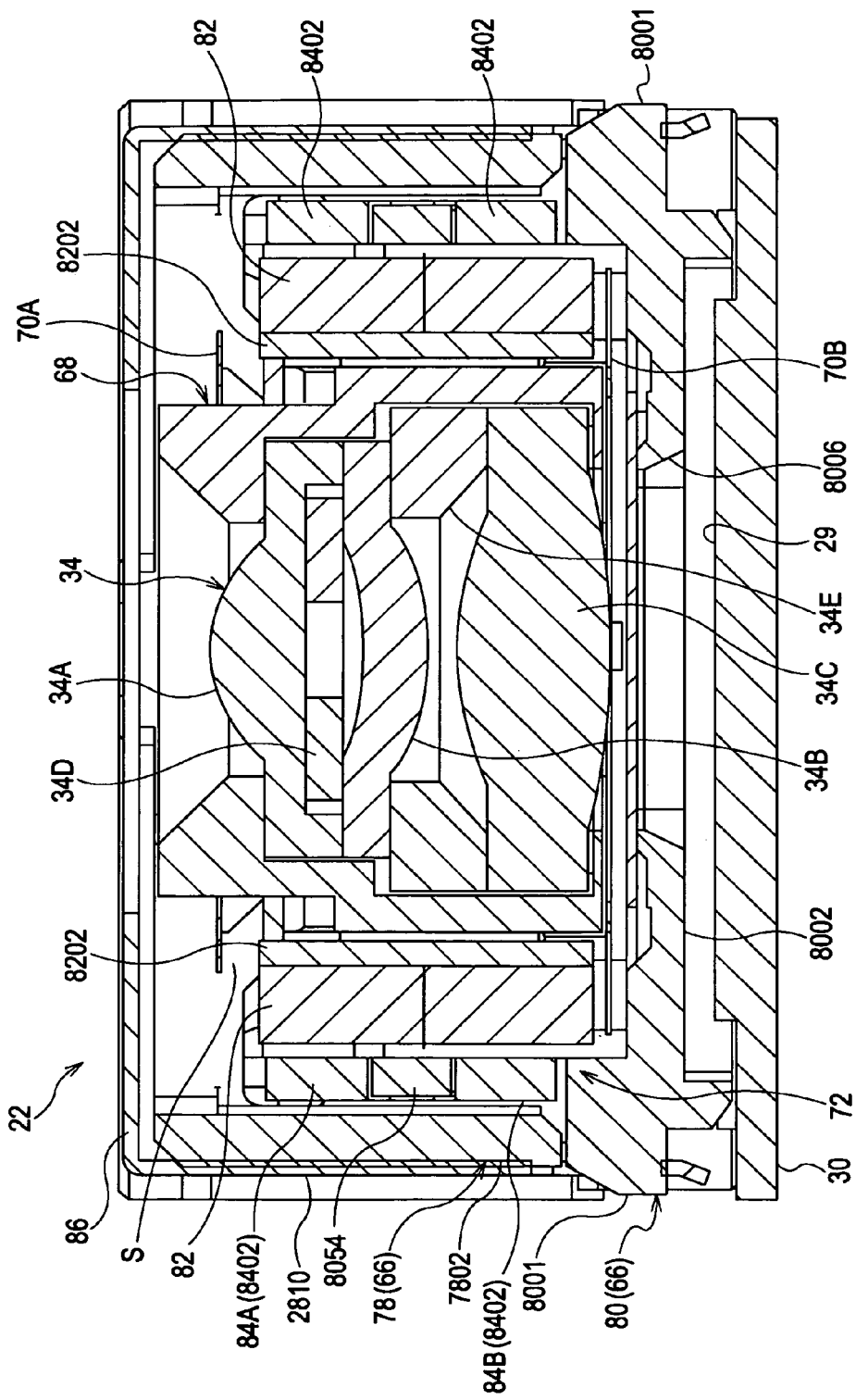
FIG. 36 is a sectional view of the camera module 22.
Figure 37:
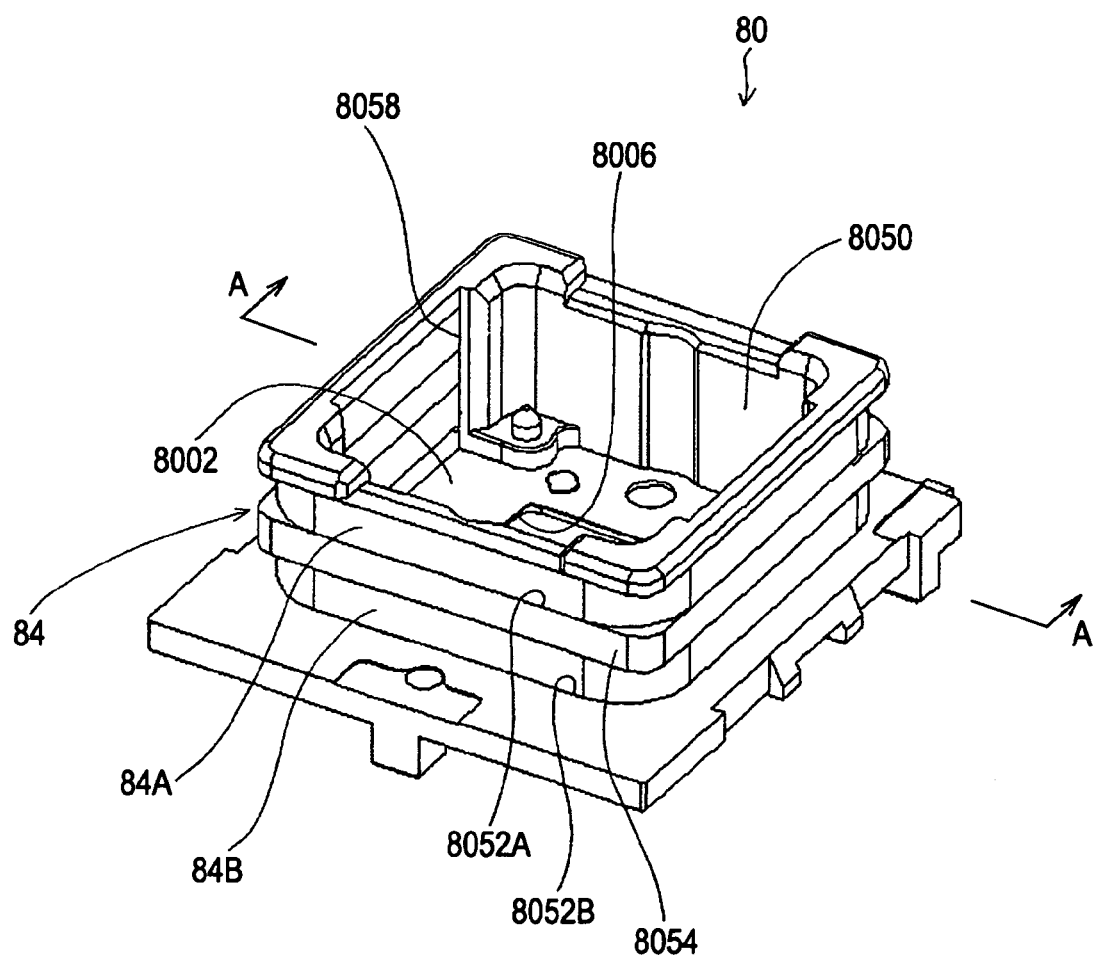
FIG. 37 is a perspective view of a rear barrel 80.
Figure 38:
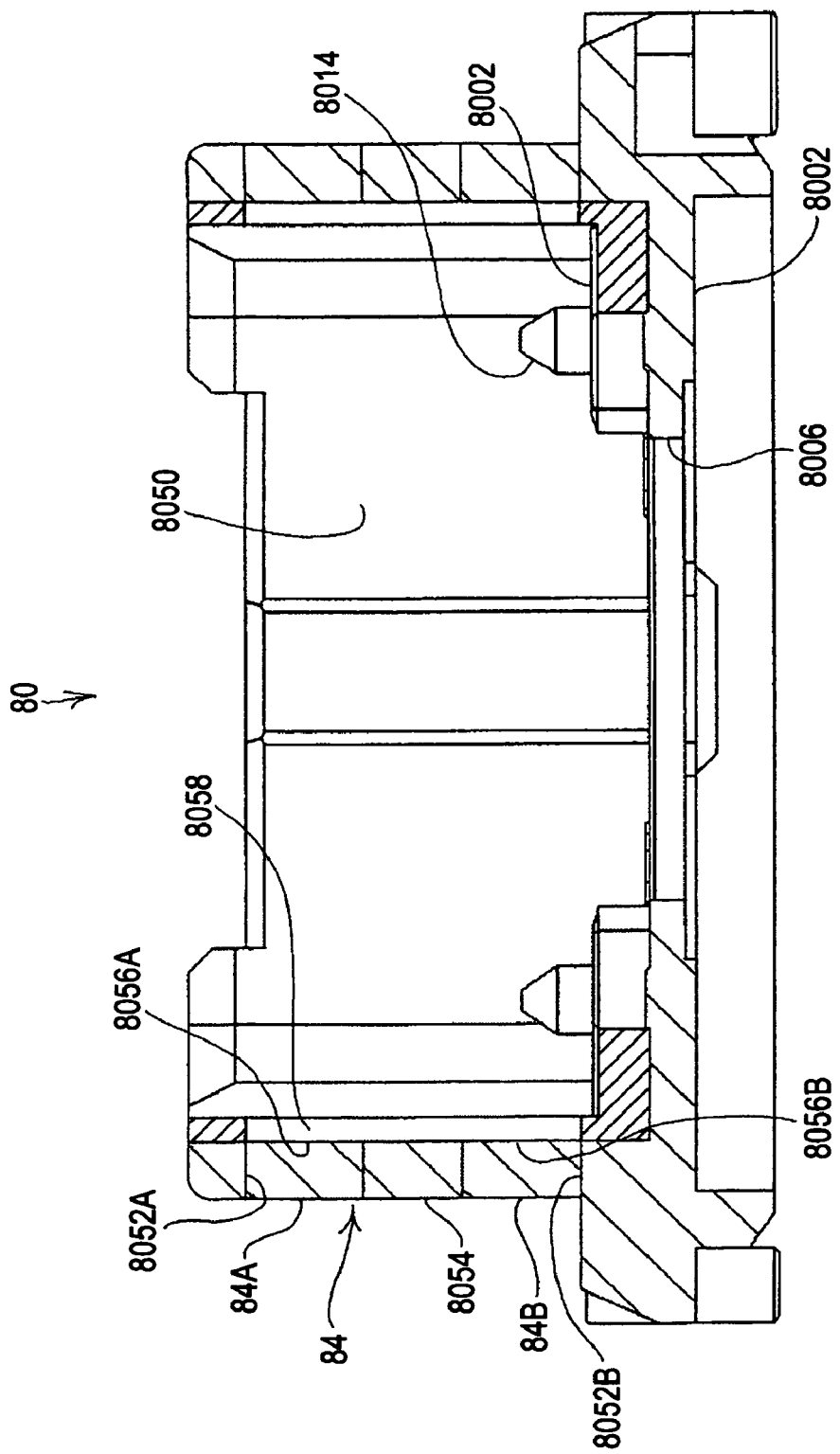
FIG. 38 is a sectional view of FIG. 37 taken along line A-A.
Figure 39:
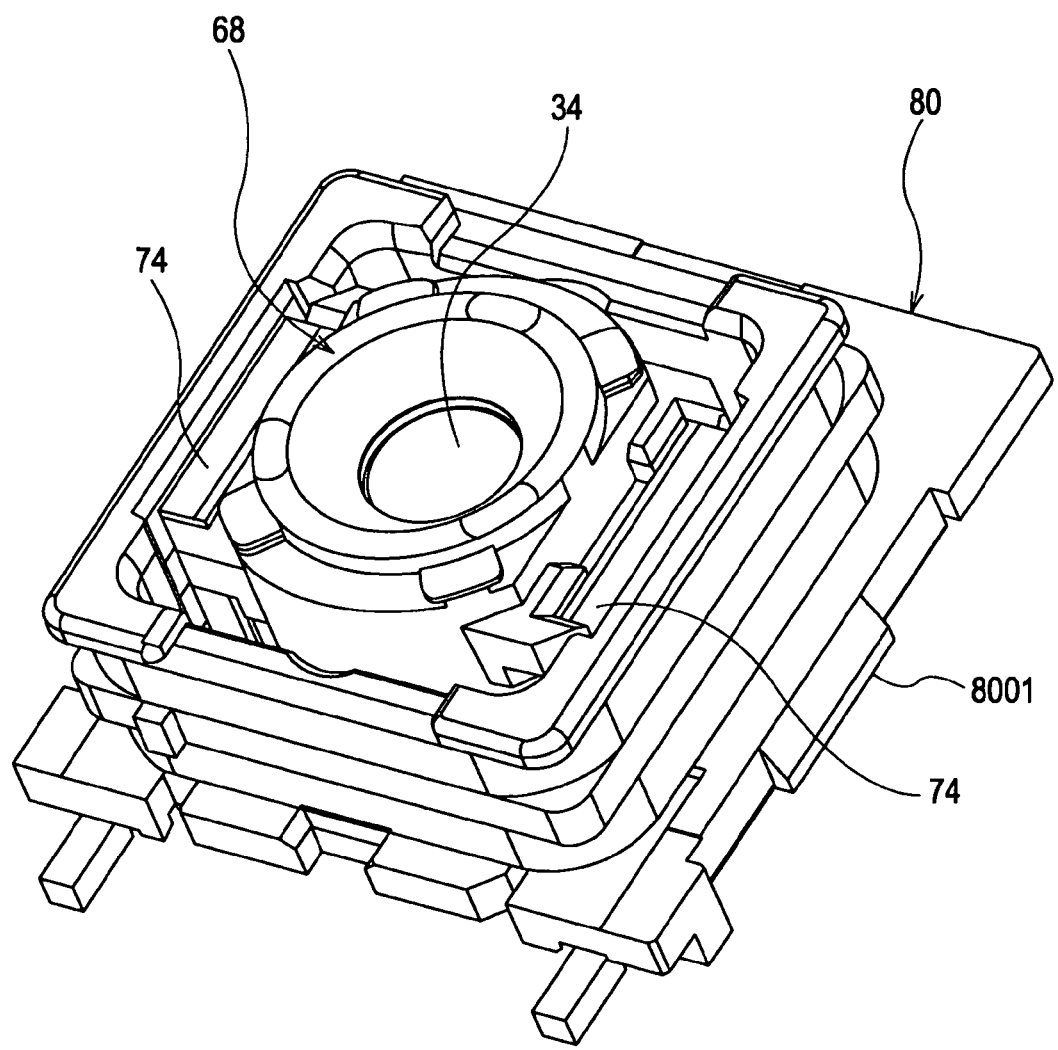
FIG. 39 is a perspective view illustrating the state in which a lens holding unit 68 is housed in the rear barrel 80.

FIG. 34 is an exploded perspective view of a camera module 22 according to the second reference example, FIG. 35 is a diagram illustrating the assembly of the camera module 22, FIG. 36 is a sectional view of the camera module 22, FIG. 37 is a perspective view of a rear barrel 80, FIG. 38 is a sectional view of FIG. 37 taken along line A-A, and FIG. 39 is a perspective view illustrating the state in which a lens holding unit 68 is housed in the rear barrel 80.

The structure of a coil according to the second reference example differs from that of the above-described first reference example. Other structures of the second reference example are similar to those of the first reference example. Therefore, sections similar to those of the first reference example are denoted by the same reference numerals, and explanations thereof are thus omitted.

As shown in FIGS. 34 to 36, the camera module 22 includes a barrel unit 66, the lens holding unit 68, springs 70, an image pickup element 29, and a driving unit 72. The driving unit 72 includes magnets 82 and coils 84.

The structures of the lens holding unit 68, the springs 70, and the image pickup element 29 are similar to those of the first reference example.

Similar to the first reference example, the two magnets 82 are disposed on the lens holding unit 68 at positions having the optical axis therebetween and extend parallel to a single imaginary plane which passes through the optical axis.

Similar to the first reference example, the two magnets 82 are formed in an oblong square plate shape and have a height in the optical axis direction and a width greater than the height in a direction perpendicular to the height.

The arrangement of the magnets 82 is similar to that in the first reference example. As shown in FIGS. 34 to 36, the magnets 82 are attached to attachment surfaces 6808 of the lens holding unit 68 with yokes 8202 interposed therebetween in a manner such that the magnets 82 are clamped between a pair of clamping pieces 6810.

Here, the manner in which the magnets 82 are polarized will be described below.

The coils 84 include wires wound around the optical axis and have a frame shape with the optical axis at the center when viewed in the optical axis direction. In the second reference example, the coils 84 have a rectangular frame shape.

The coils 84 include two coils which are a first coil 84A which faces front sections of the magnets 82 in the optical axis direction and a second coil 84B which faces rear sections of the magnets 82 in the optical axis direction.

As shown in FIGS. 35 and 36, each of the first coil 84A and the second coil 84B includes two coil sections 8402 which extend parallel to a single imaginary plane and which face the two magnets 82.

Each coil section 8402 has an oblong square plate shape, and has a height in the optical axis direction, a width greater than the height in a direction perpendicular to the height, and a thickness smaller than the height and the width.

As shown in FIG. 34, the barrel unit 66 includes a front barrel 78 and a rear barrel 80.

As shown in FIG. 34, the front barrel 78 includes a peripheral wall 7802 positioned around the optical axis.

As shown in FIGS. 37 and 38, the rear barrel 80 includes a rear end-face wall 8002 which extends along a plane perpendicular to the optical axis and closes the rear end of the peripheral wall 7802 in the optical axis direction; a cylindrical wall portion 8050 which projects from the rear end-face wall 8002, which is housed inside the peripheral wall 7802 to partition a side surface of a housing space S, and around which the coils 84 are wound; and an opening 8006 which is provided in the rear end-face wall 8002 at a position corresponding to the optical axis and in which the image pickup element 29 is housed.

A first coil attachment groove 8052A and a second coil attachment groove 8052B are formed in the outer periphery of the cylindrical wall portion 8050 with an interval therebetween in the optical axis direction, and a flange 8054 is disposed so as to project between the coil attachment grooves 8052A and 8052B.

As shown in FIG. 38, each of the bottom surface of the first coil attachment groove 8052A and the bottom surface of the second coil attachment groove 8052B includes two bottom-surface portions 8056A and 8056B which face each other and extend parallel to a single imaginary plane.

The first coil 84A is arranged by being attached to the first coil attachment groove 8052A.

The second coil 84B is arranged by being attached to the second coil attachment groove 8052B.

As shown in FIGS. 37 and 38, openings 8058 through which the first coil 84A and the second coil 84B face the magnets 82 are formed in the bottom-surface portion 8056A of the first coil attachment groove 8052A and the bottom-surface portion 8056B of the second coil attachment groove 8052B.

Next, a method for assembling the camera module 22 will be described.

As shown in FIG. 35, a first unit U1 in which the front spring 70A is assembled to the front barrel 78, a second unit U2 in which the imaging optical system 34, the magnets 82, and the rear spring 70B are assembled to the lens holding unit 68, and a third unit U3 in which the coils 84, the image pickup element 29, and the substrate 30 are assembled to the rear barrel 80 are assembled and prepared individually.

Then, the second unit U2 is assembled to the third unit U3. In other words, the pins 8014 (see FIG. 38) on the rear barrel 80 are inserted into the holes 7014 in the rear spring 70B, and the second unit U2 and the third unit U3 are combined together.

Next, the thus-obtained assembly is assembled to the first unit U1. In other words, the front section of the cylindrical portion 6802 of the lens holding unit 68 is inserted through the opening 7001 in the front spring 70A, and the annular plate portion 7002 is brought into contact with the four spring contact surfaces 6805 of the lens holding unit 68. Thus, the first unit U1 and the second unit U2 are combined together.

Lastly, the camera-body shielding plate 2810 is placed so as to cover the first unit U1, and the engagement grooves 2830 are caused to engage with the engagement projections 8001. In other words, the camera-body shielding plate 2810 is placed so as to cover the first unit U1 such that the front barrel 78 is clamped between the top surface portion 2810A of the camera-body shielding plate 2810 and the rear end-face wall 8002 of the rear barrel 80.

Thus, the first unit U1 and the third unit U3 are combined together and the camera module 22 is completed.

The first coil 84A and the second coil 84B are series-connected to each other with an intermediate wire portion (not shown). As shown in FIG. 34, similar to the first reference example, end portions of the wires of the respective coils 84A and 84B are wound around respective projecting portions 8003 which project from the rear end-face wall 8002 of the rear barrel 80. The portions around which the wires are wound are solder-connected to soldering pads on the surface of the substrate 30 by soldering.

A driving signal is supplied to the wires from the substrate 30 through the respective soldering pads, and accordingly magnetic fields are generated by the first coil 84A and the second coil 84B.

As a result, a force (thrust) is applied to the first coil 84A and the second coil 84B in the optical axis direction due to interaction between the magnetic fields generated by the first coil 84A and the second coil 84B and the magnetic fields generated by the magnetic poles of the magnets 82. Accordingly, the lens holding unit 68 and the imaging optical system 34 held by the springs 70 move in the optical axis direction. Thus, a focusing operation for focusing the object image formed on the imaging plane of the image pickup element 29 by the imaging optical system 34 is performed.

Next, the winding directions of the first coil 84A and the second coil 84B and the manner in which the magnets 82 are polarized will be described in detail.

Figure 40:
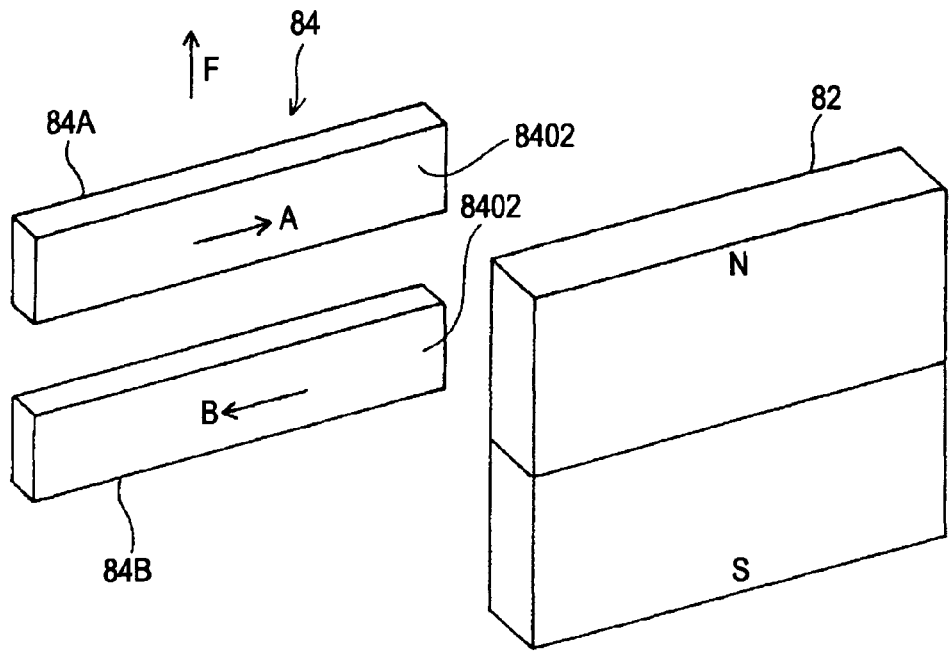
FIG. 40 is a diagram illustrating the operation of a magnet 82 and coils 84.
Figure 41:
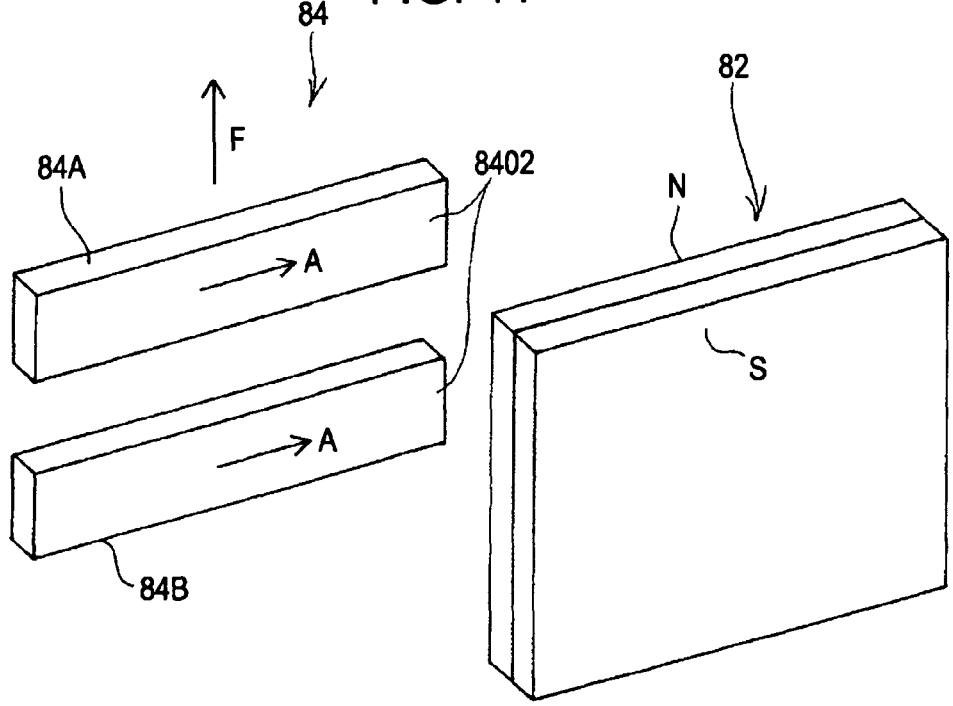
FIG. 41 is a diagram illustrating the operation of a magnet 82 and coils 84.

FIGS. 40 and 41 are diagrams illustrating the operation of a magnet 82 and coils 84.

First, referring to FIG. 40, the case in which the winding direction of the wire of the first coil 84A and the winding direction of the wire of the second coil 84B are opposite to each other will be described.

In this case, a magnet polarized such that the N pole and the S pole are positioned at the ends thereof along the optical axis is used as the magnet 82.

An interaction occurs between a magnetic field generated by the magnet 82 and a magnetic field generated when a driving signal flows through the first coil 84A (coil section 8402) in the direction shown by the arrow A and through the second coil 84B (coil section 8402) in the direction shown by the arrow B. Due to this interaction, the lens holding unit 68 receives a force F in a direction along the optical axis, and the lens holding unit 68 is moved accordingly.

In addition, when the driving signal flows through the first and second coils 84A and 84B (coil sections 8402) in directions opposite to those in the above-described case, a magnetic field is generated by the first and second coils 84A and 84B in a direction opposite to that in the above-described case. As a result, the lens holding unit 68 receives a force in a direction opposite to that in the above-described case, and the lens holding unit 68 is moved accordingly.

Next, referring to FIG. 41, the case in which the winding direction of the wire of the first coil 84A and the winding direction of the wire of the second coil 84B are the same will be described.

A magnet polarized such that the N pole and the S pole are positioned at the ends thereof in the thickness direction thereof is used as the magnet 82.

An interaction occurs between a magnetic field generated by the magnet 82 and a magnetic field generated when a driving signal flows through the first and second coils 84A and 84B (coil sections 8402) in the direction shown by the arrow A. Due to this interaction, the lens holding unit 68 receives a force F in a direction along the optical axis, and the lens holding unit 68 is moved accordingly.

When the driving signal flows through the first and second coils 84A and 84B (coil sections 8402) in a direction opposite to that in the above-described case, a magnetic field is generated by the first and second coils 84A and 84B in a direction opposite to that in the above-described case. As a result, the lens holding unit 68 receives a force F in a direction opposite to that in the above-described case, and the lens holding unit 68 is moved accordingly.

As described above, according to the camera module 22 of the second reference example, the magnets 82 are provided on the lens holding unit 68 which holds the imaging optical system 34, and the coils 84 are provided on the barrel unit 66. Therefore, unlike a camera module according to the related art in which coils are provided on a lens holding unit and magnets are provided on a barrel unit, the following effects can be obtained.

According to the related art, since the coils are provided on the lens holding unit, stress is applied to wires forming the coils when the lens holding unit moves. Therefore, when an impact is applied to the camera module and the lens holding unit is moved, a large force is applied to the wires of the coils and there is a risk that breakage or the like will occur. In contrast, according to the second reference example, since the coils are not provided on the lens holding unit, such a problem can be prevented from occurring. This is advantageous in increasing the endurance and impact resistance.

In addition, according to the related art, since the magnets are provided on the barrel unit and the coils are provided on the lens holding unit, springs for holding the lens holding unit are formed of conductive members and the springs are soldered to the coils so that a driving signal can be supplied to the coils through the springs.

Therefore, to improve the work efficiency in the soldering process, dedicated components for attaching the coils may be prepared and the soldering process may be performed while the coils are attached to the dedicated components. Then, the dedicated components may be attached to the lens holding unit. However, this method is cumbersome. In contrast, according to the second reference example, since the coils are not provided on the lens holding unit, the dedicated components for attaching the coils are not necessary. Thus, the coils can be easily attached and the number of components can be reduced. This is advantageous in reducing the size and manufacturing costs.

In addition, according to the related art, if the coils provided on the lens holding unit generate heat in response to the supply of electricity, the heat is transferred to the imaging optical system through the lens holding unit and the lens will be affected by the heat (for example, deformation or the like due to thermal expansion will occur). Therefore, there is a risk that the optical characteristics will be degraded. In contrast, according to the second reference example, since the coils are not provided on the lens holding unit, such a problem can be prevented from occurring. This is advantageous in improving the optical characteristics of the imaging optical system.

In addition, according to the related art, in the process of soldering the coils onto the lens holding unit, there is a risk that the lens will be affected by heat generated in the soldering process and transferred to the imaging optical system through the lens holding unit. Therefore, there is a risk that the optical characteristics will be degraded. In contrast, according to the second reference example, since the coils are not provided on the lens holding unit, such a problem can be prevented from occurring. This is advantageous in improving the optical characteristics of the imaging optical system.

In addition, according to the related art, the driving signal is supplied to the coils through the springs. Therefore, the material of the springs is limited to conductive materials. In contrast, according to the second reference example, the driving signal can be directly supplied to the coils 84 and it is not necessary to supply the driving signal using the springs. Therefore, non-conductive materials may also be used as the material of the springs. This is advantageous in ensuring the design freedom.

In addition, according to the related art, since the coils around which the wires are wound are provided on the lens holding unit, there is a problem that the balance of the center of gravity of the lens holding unit is affected by variations in the centers of gravity of the coils. In contrast, according to the second reference example, the magnets, whose shape and dimensions can be more easily set with high accuracy than the coils, are provided on the lens holding unit. Therefore, the balance of the center of gravity of the lens holding unit can be easily adjusted. This is advantageous in suppressing tilting of the optical axis of the imaging optical system.

In addition, according to the related art, since the coils are provided on the lens holding unit, cumbersome steps of arranging and soldering the wires of the coils are necessary in the process of installing the lens holding unit into the barrel unit. In contrast, according to the second reference example, the magnets are provided on the lens holding unit and the coils are provided on the barrel unit. Therefore, as described above, the camera module can be easily obtained by individually assembling the first to third units U1, U2, and U3 in advance, and the cumbersome steps of arranging and soldering the wires of the coils are not necessary. This is advantageous in improving the work efficiency in the assembly process.

In addition, according to the second reference example, the coils 84 include wires wound around the optical axis and have a frame shape with the optical axis at the center when viewed in the optical axis direction. Therefore, by winding the wires around the barrel unit 66, the process of forming the coils 84 and the process of attaching the coils 84 to the barrel unit can be performed at the same time.

Therefore, compared to the case in which, for example, the wires are wound so as to form an annular shape in advance and then the thus-formed coils 84 are attached to the barrel unit by adhesion as in the first reference example, it is advantageous in simplifying the assembly process and reducing costs.

Next, a third reference example will be described.

The structure of a coil according to third reference example differs from that of the second reference example. Other structures of the third reference example are similar to those of the second reference example. Therefore, sections similar to those of the second reference example are denoted by the same reference numerals, and explanations thereof are thus omitted.

Figure 42:
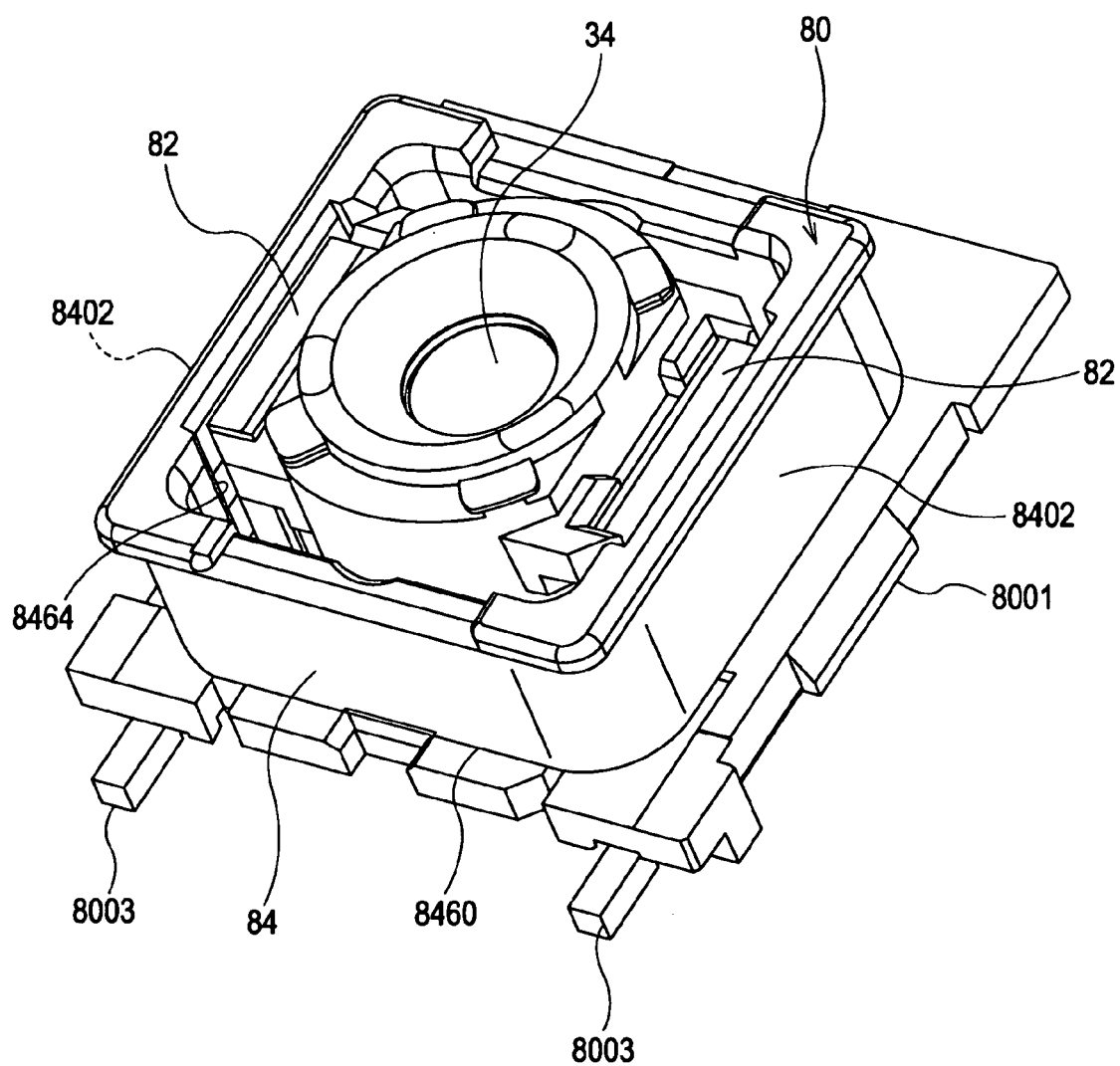
FIG. 42 is a perspective view illustrating the state in which a lens holding unit 68 of a camera module 22 is housed in a rear barrel 80.
Figure 43:
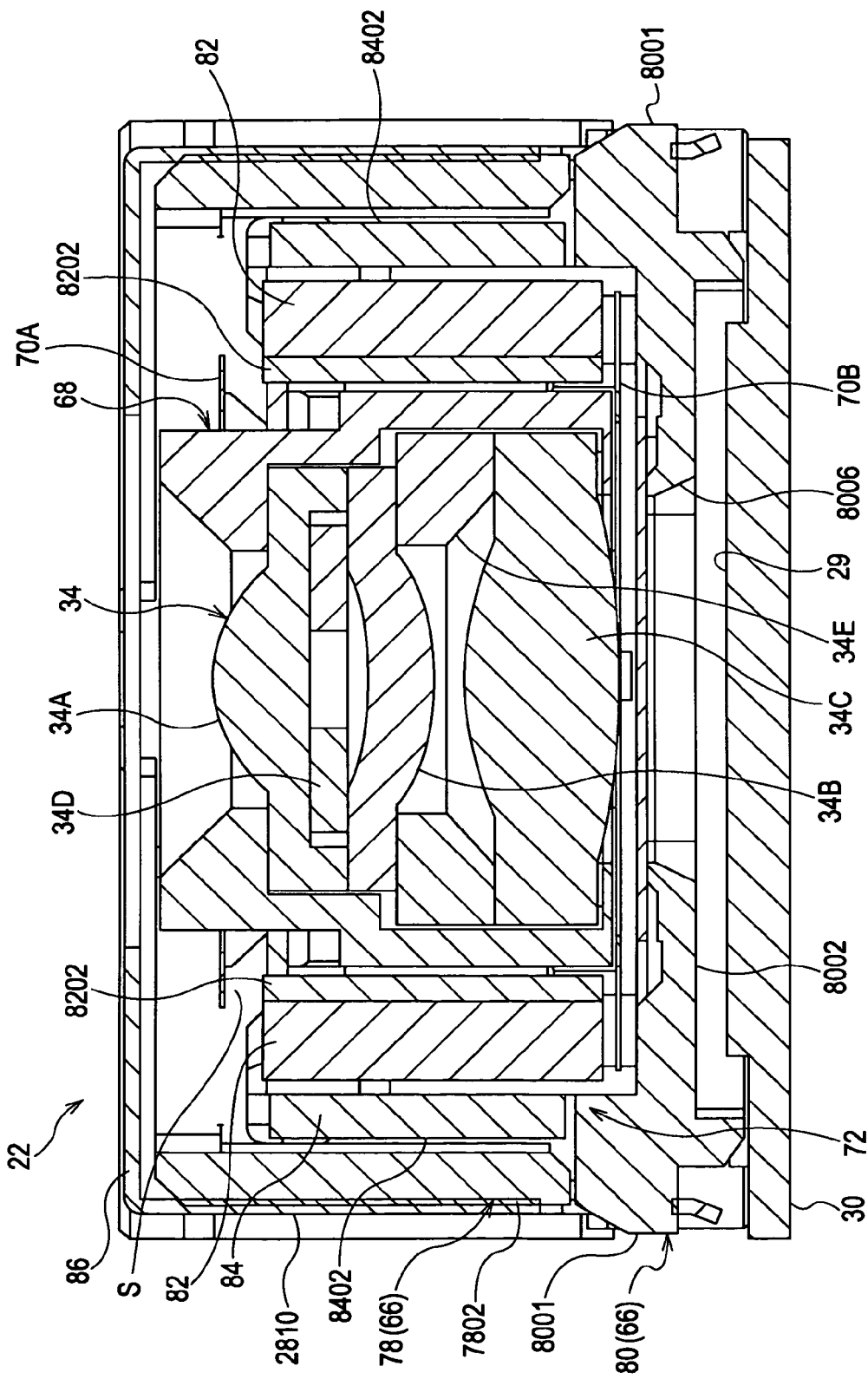
FIG. 43 is a sectional view of the camera module 22.
Figure 44:
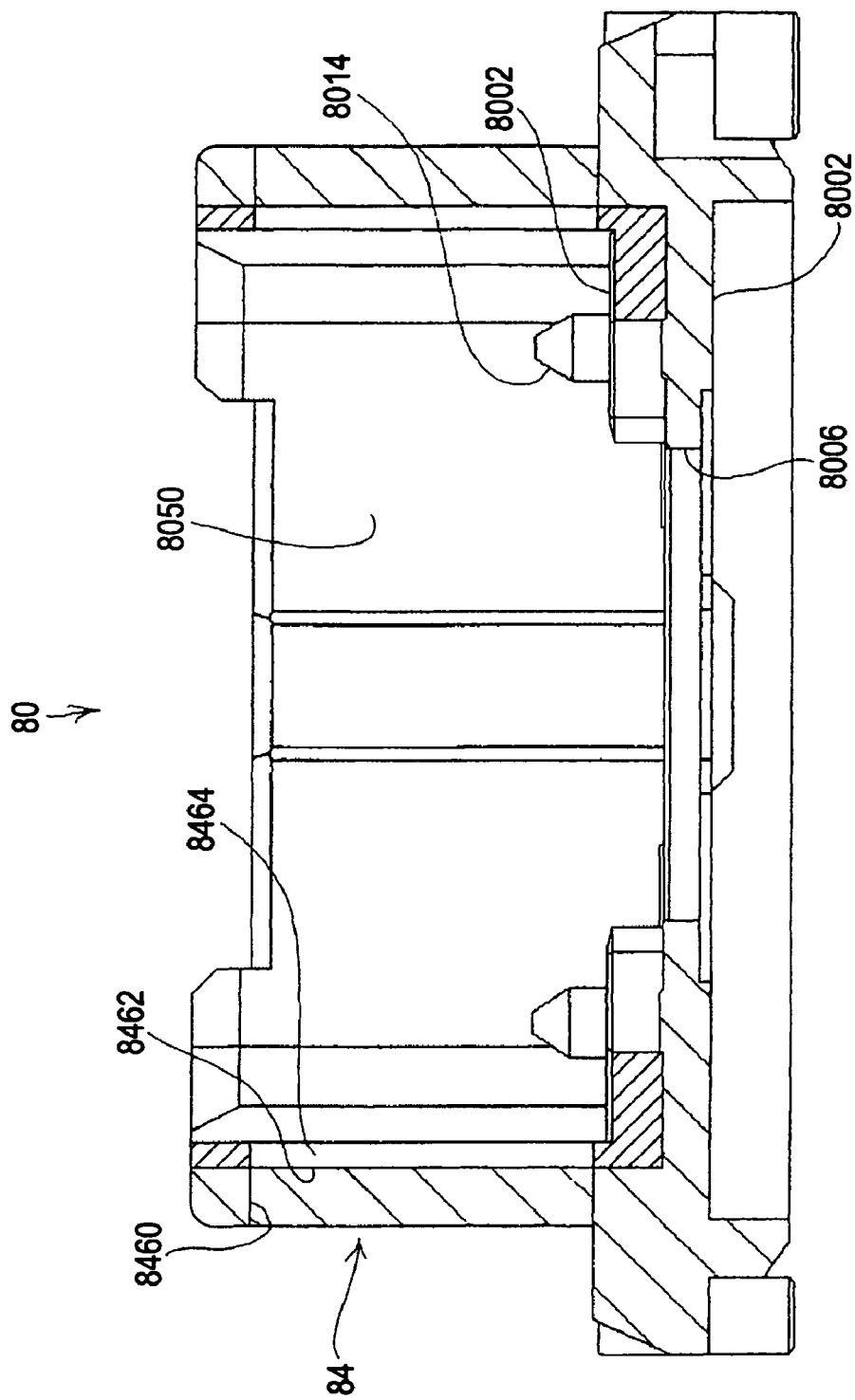
FIG. 44 is a sectional view of the rear barrel 80.

FIG. 42 is a perspective view illustrating the state in which a lens holding unit 68 of a camera module 22 according to the third reference example is housed in a rear barrel 80, FIG. 43 is a sectional view of the camera module 22, and FIG. 44 is a sectional view of the rear barrel 80.

In the second reference example, the case in which two coils 84A and 84B are provided is described. However, in the third reference example, only one coil 84 is provided.

As shown in FIGS. 42 and 43, the coil 84 includes two coil sections 8402 which face two magnets 82 and which extend parallel to a single imaginary plane which passes through the optical axis.

Each coil section 8402 has an oblong square plate shape in correspondence with the shape of the magnets 82, and has a height in the optical axis direction, a width greater than the height in a direction perpendicular to the height, and a thickness smaller than the height and the width.

Similar to the second reference example, the barrel unit 66 includes a front barrel 78 and a rear barrel 80, and a coil attachment groove 8050 is formed in the outer periphery of a cylindrical wall portion 8050 of the rear barrel 80, as shown in FIGS. 42 and 44.

Bottom surfaces of the coil attachment groove 8460 respectively include two bottom-surface portions 8462 which face each other and extend parallel to the above-mentioned single imaginary plane.

The coil 84 is arranged by being attached to the coil attachment groove 8460, and openings 8464 through which the coil 84 faces the magnets 82 are formed in the bottom-surface portions 8462 of the coil attachment groove 8460.

End portions of the wire of the coil 84 are wound around respective projecting portions 8003 which project from the rear end-face wall 8002 of the rear barrel 80. The portions around which the wire is around are solder-connected to soldering pads on the surface of the substrate 30 by soldering.

A driving signal is supplied to the wire from the substrate 30 through each of the soldering pads, and accordingly a magnetic field is generated by the coil 84.

As a result, a force (thrust) is applied to the coil 84 in the optical axis direction due to interaction between the magnetic fields generated by the coil 84 and the magnetic fields generated by the magnetic poles of the magnets 82. Accordingly, the lens holding unit 68 and the imaging optical system 34 held by the springs 70 move in the optical axis direction.

Thus, a focusing operation for focusing the object image formed on the imaging plane of the image pickup element 29 by the imaging optical system 34 is performed.

Next, the winding direction of the coil 84 and the manner in which the magnets 82 are polarized will be described in detail.

Figure 45:
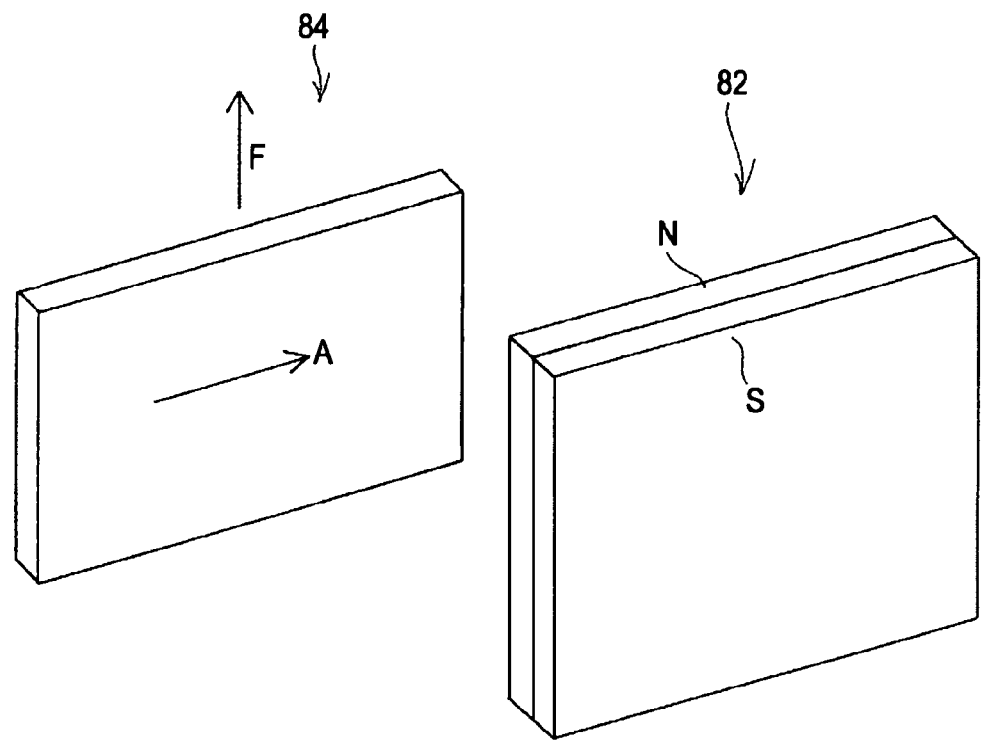
FIG. 45 is a diagram illustrating the operation of a magnet 82 and a coil 84.

FIG. 45 is a diagram illustrating the operation of a magnet 82 and the coil 84.

A magnet polarized such that the N pole and the S pole are positioned at the ends thereof in the thickness direction thereof is used as the magnet 82.

An interaction occurs between a magnetic field generated by the magnet 82 and a magnetic field generated when a driving signal flows through the coil 84 (coil section 8402) in the direction shown by the arrow A. Due to this interaction, the lens holding unit 68 receives a force F in a direction along the optical axis, and the lens holding unit 68 is moved accordingly.

When the driving signal flows through the coil 84 (coil section 8402) in a direction opposite to that in the above-described case, a magnetic field is generated by the coil 84 in a direction opposite to that in the above-described case. As a result, the lens holding unit 68 receives a force F in a direction opposite to that in the above-described case, and the lens holding unit 68 is moved accordingly.

Also in the third reference example, effects similar to those obtained by the second reference example can, of course, be obtained. In addition, although two coils, that is, the first and second coils 84A and 84B, are used in the second reference example, only one coil 84 is used in the third reference example. Accordingly, it is more advantageous in simplifying the assembly process and reducing costs.

Next, the structure of the camera module 22 according to an embodiment of the present invention will be described.

The main part of the present embodiment is a retaining plate 86 which clamps inner and outer barrels.

Note that, in the present embodiment, the front barrel 78 described in the first reference example serves as an outer barrel 78 and the rear barrel 80 serves as an inner barrel 80.

As described above, the camera module 22 includes a barrel unit 66 having a housing space S; a lens holding unit 68 which holds an imaging optical system 34, which is housed in the housing space S, and which is supported such that the lens holding unit 68 is movable along an optical axis of the imaging optical system 34; an image pickup element 29 which is disposed in the barrel unit 66 and which picks up an object image guided by the imaging optical system 34; and a driving unit 72 which moves the lens holding unit 68 along the optical axis of the imaging optical system 34.

In addition, the barrel unit 66 includes the inner barrel 80 in which the housing space S is formed and the outer barrel 78 disposed outside the inner barrel 80.

The inner barrel 80 includes a rear end-face wall 8002 which extends along a plane perpendicular to the optical axis and closes the rear end of the outer barrel 78 in the optical axis direction and in which an opening 8006 for housing the image pickup element 29 is formed.

In the state in which the outer barrel 78 is placed outside the inner barrel 80, the barrels 78 and 80 are combined together without rattling in a direction perpendicular to the optical axis.

In the present embodiment, four pillar walls 8020 shown in FIG. 18 are engaged with four corner portions 7820 provided inside a peripheral wall 7802 of the outer barrel 78 shown in FIG. 17, so that the barrels 78 and 80 are combined together without rattling in a direction perpendicular to the optical axis.

In addition, as shown in FIG. 15, first abutting surfaces 8061 which extend along an imaginary plane that is perpendicular to the optical axis are formed at positions where the rear end-face wall 8002 faces forward in the optical axis direction. In addition, second abutting surfaces 7822 which extend along an imaginary plane that is perpendicular to the optical axis are formed at the rear end of the outer barrel 78 in the optical axis direction. The first abutting surfaces 8061 and the second abutting surfaces 7822 are in contact with each other in the state in which the outer barrel 78 is placed outside the inner barrel 80.

More specifically, in the state in which the first abutting surfaces 8061 and the second abutting surfaces 7822 are in contact with each other, the inner barrel 80 and the outer barrel 78 are clamped by the retaining plate 86 in the optical axis direction.

As shown in FIGS. 12 and 15, the retaining plate 86 includes a front plate portion 86A and two side plate portions 86B.

The retaining plate 86 clamps the inner barrel 80 and the outer barrel 78 in the optical axis direction in the state in which the front plate portion 86A retains the front end of the outer barrel 78 and distal ends of the two side plate portions 86B retain the rear end-face wall 8002.

The retaining plate 86 corresponds to the camera-body shielding plate 2810 described in the first reference example.

In the present embodiment, the retaining plate 86 is made of a material having magnetic shielding characteristics, electromagnetic shielding characteristics, and conductivity.

Various known materials such as high permeability metal, permalloy, and iron oxide, may be used as the above-mentioned material.

In addition, an outer surface 8602 of the front plate portion 86A of the retaining plate 86 at a side opposite to an inner surface thereof which faces the front end of the outer barrel 78 is subjected to surface treatment for preventing the reflection of light and providing conductivity.

Such a surface treatment may be, for example, a painting process of applying paint for preventing the reflection of light or a plating process for preventing the reflection of light. The above-mentioned paint is not particularly limited as long as the reflection of light can be prevented, and black paint, for example, may be used.

As shown in FIGS. 12 and 15, the front plate portion 86A is formed in a rectangular shape and has a size such that the front plate portion 86A can retain the front end of the outer barrel 78 in the optical axis direction and cover the front end.

An opening 8604 for providing an optical path of the imaging optical system 34 is formed at the center of the front plate portion 86A.

In the state in which the outer barrel 78 is placed outside the inner barrel 80, the contour of the barrel unit 66 has a rectangular plate shape having a thickness in the optical axis direction and longitudinal and lateral dimensions which are greater than the thickness. The front plate portion 86A has a rectangular shape.

As shown in FIG. 15, a third abutting surface 7824 which extends along an imaginary plane that is perpendicular to the optical axis is formed at the front end of the outer barrel 78 in the optical axis direction. The front plate portion 86A is abutted against the third abutting surface 7824 so that the front plate portion 86A retain the front end of the outer barrel 78.

In the present embodiment, as shown in FIG. 15, the third abutting surface 7824 extends in a rectangular frame shape when viewed in the optical axis direction.

In addition, as shown in FIGS. 12 and 15, projecting portions 7826 are formed on the third abutting surface 7824, and cut sections 8606 that can be engaged with the projecting portions 7826 are formed in the front plate portion 86A. The projecting portions 7826 and the cut sections 8606 are engaged with each other so that the front plate portion 86A is positioned with respect to the front end of the outer barrel 78 in the optical axis direction along the imaginary plane that is perpendicular to the optical axis.

As shown in FIG. 15, the side plate portions 86B are bent along a pair of sides of the front plate portion 86A which face each other.

Retaining engagement grooves 2830 are formed at the distal ends of the side plate portions 86B.

Retaining projections 8001 are provided on the outer periphery of the rear end-face wall 8002 at two respective positions having the optical axis therebetween. The distal ends of the two side plate portions 86B can easily and reliably retain the rear end-face wall 8002 by causing the projections 8001 and the engagement grooves 2830 to engage with each other.

As shown in FIG. 15, flat portions 7830 which are parallel to a single imaginary plane which passes through the optical axis are formed on the outer periphery of the outer barrel 78 at positions having the optical axis therebetween. The two side plate portions 86B are in contact with the respective flat portions 7830 in the state in which the front plate portion 86A retain the front end of the outer barrel 78 and the distal ends of the two side plate portions 86B retain the rear end-face wall 8002.

According to the present embodiment, the inner barrel 80 and the outer barrel 78 can be easily clamped in the optical axis direction by using the retaining plate 86. In addition, unlike the case in which the inner barrel 80 and the outer barrel 78 are adhered to each other with an adhesive, it is not necessary to adjust and manage the amount of adhesive and curing conditions. In addition, the curing time for the adhesive is not necessary. Therefore, the assembly process can be considerably simplified and it is advantageous in reducing costs.

In addition, the retaining plate 86 can be easily removed by releasing the engagement grooves 2830 from the projections 8001, and the inner barrel 80 and the outer barrel 78 can be easily separated from each other by removing the retaining plate 86 from the inner barrel 80 and the outer barrel 78. This is advantageous in that adjustment and repair of the lens holding unit 68 and the driving unit 72 installed in the inner barrel 80 and the outer barrel 78 can be quickly and easily performed.

In addition, in the case where the driving unit 72 includes the magnets provided on the lens holding unit 68 and the coils provided on the inner barrel 80 as in the present embodiment, there is a risk that the magnets will be moved due to interaction with a magnetic field applied from the outside of the camera module 22 and be displaced from the intended positions. In such a case, problems such as displacement of the focal point of the object image formed on the image pickup element 29 by the imaging optical system 34 will occur.

In the present embodiment, the retaining plate 86 has magnetic shielding characteristics. Therefore, the magnetic field applied from the outside is blocked by the retaining plate 86 and does not affect the driving unit. Thus, the above-described problems can be prevented and it is advantageous in improving the quality of the picked up image.

In addition, since the magnetic field generated by the coils in the driving unit is blocked by the retaining plate 86, it is advantageous in preventing the generated magnetic field from radiating toward electronic components and electronic circuits around the camera module and adversely influencing the electronic components and electronic circuits.

In particular, in the case where the camera module 22 is installed in a portable phone, components including coils and magnets that generate magnetic fields, such as a motor for generating vibration for informing that a call is received and a receiver (speaker), are generally arranged near the camera module 22.

In addition, recently, the size and thickness of portable phones have been reduced, and distances between the above-mentioned components and the camera module have been reduced accordingly. Therefore, the driving unit of the camera module has become more easily affected by the magnetic field generated in the portable phone.

However, in the present embodiment, the retaining plate 86 is made of a material having magnetic shielding characteristics. Therefore, it is advantageous in preventing the influence of the magnetic fields generated by the above-mentioned components and improving the quality of the image picked up by the image pickup element 29 while reducing the size and thickness of the portable phone.

In addition, according to the present embodiment, the retaining plate 86 has electromagnetic shielding characteristics in addition to the magnetic shielding characteristics. Therefore, the electromagnetic waves emitted from the driving unit 72 are blocked by the retaining plate 86 and the electromagnetic waves can be prevented from radiating to the outside of the camera module 22. Thus, it is advantageous in preventing the influence of the electromagnetic waves on the electronic components and electronic circuits arranged near the camera module 22.

In addition, in the present embodiment, since the retaining plate 86 is conductive, it is advantageous in effectively blocking the electromagnetic waves by grounding the retaining plate 86 through the socket 24.

Here, in the case where the driving unit includes coils provided on the lens holding unit and magnets provided on the barrel unit unlike the driving unit 72 of the present embodiment, since the magnets are provided on and fixed to the barrel unit, the camera module is not easily affected by the magnetic field from the outside. However, there is a risk that the magnetic fields generated by the coils in the driving unit will affect the electronic components and electronic circuits arranged near the camera module.

Therefore, in this case, a material having electromagnetic shielding characteristics can be used for forming the retaining plate 86 so that the above-described problems can be prevented.

Various known materials having electromagnetic shielding characteristics, such as plate members formed of metal material, metal gauze, perforated metal, and plate members coated with metal film (metallic foil, vapor deposition, plating), may be used as the above-described material having the electromagnetic shielding characteristics.

Figure 46:
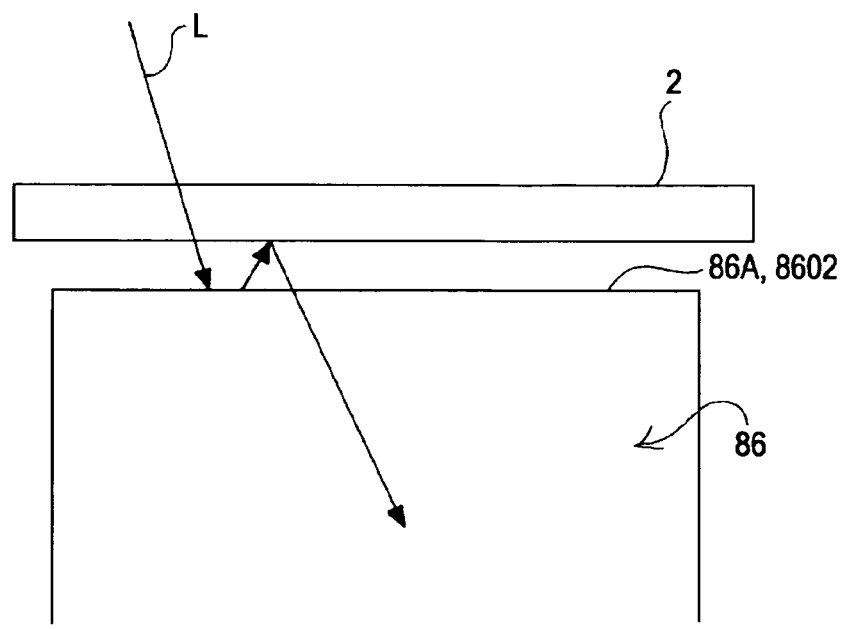
FIG. 46 is a diagram illustrating the generation of a ghost image.

In addition, as shown in FIG. 46, in the case where the camera module 22 is installed in a housing of an electronic apparatus, such as a portable phone, the camera module 22 is disposed such that the opening in the front plate portion 86A of the retaining plate 86 faces a housing opening formed in the housing.

In many cases, a cover glass 2 shown in FIG. 46 (which corresponds to the lens cover 58 shown in FIG. 1) is attached to the housing opening, and a gap is provided between the outer surface 8602 of the front plate portion 86A of the retaining plate 86 of the camera module and an inner surface of the cover glass 2 which faces the outer surface.

In this case, if a portion of light L which passes through the cover glass 2 from the outside is repeatedly reflected by the outer surface 8602 of the front plate portion 86A and the inner surface of the cover glass 2 before entering the imaging optical system 34, problems occurs in which, for example, a blurred image called a ghost image is picked up by the image pickup element 29.

In the present embodiment, the outer surface 8602 of the front plate portion 86A of the retaining plate 86 is subjected to surface treatment for preventing the reflection of light. Therefore, the above-described reflection of light L can be suppressed so that the problems such as the generation of a ghost image can be prevented. Thus, it is advantageous in improving the quality of the image picked up by the image pickup element 29.

Here, the above-described surface treatment may, of course, be performed for the entire region of the outer surfaces of the front plate portion 86A and the side plate portions 86B of the retaining plate 86. In such a case, if a conductive material is painted or plated in the above-described surface treatment process, the conductivity of the retaining plate 86 can be ensured and the retaining plate 86 can be easily grounded through the socket 24. Therefore, it is advantageous in ensuring the electromagnetic shielding characteristics of the retaining plate 86.

In addition, in the present embodiment, the case is described in which the retaining plate 86 includes the front plate portion 86A which covers the front end of the outer barrel 78 and the two side plate portions 86B which cover the two side surfaces of the peripheral wall 7802 of the outer barrel 78 which face each other. However, side plate portions may also be formed so as to be bent along three sides or four sides of the front plate portion 86A, so that three or four side surfaces of the peripheral wall 7802 of the outer barrel 78 are covered with the three or four side plate portions. In addition, rear surface portions for covering the rear surface of the substrate 30 may also be formed by bending the rear surface portions at positions corresponding to the distal ends of the side plate portions 86B.

Thus, as the number of surfaces of the barrel unit 66 covered by the retaining plate 86 increases, it becomes more advantageous in improving the magnetic shielding characteristics and the electromagnetic shielding characteristics.

Next, a fourth reference example will be described.

Figure 47:
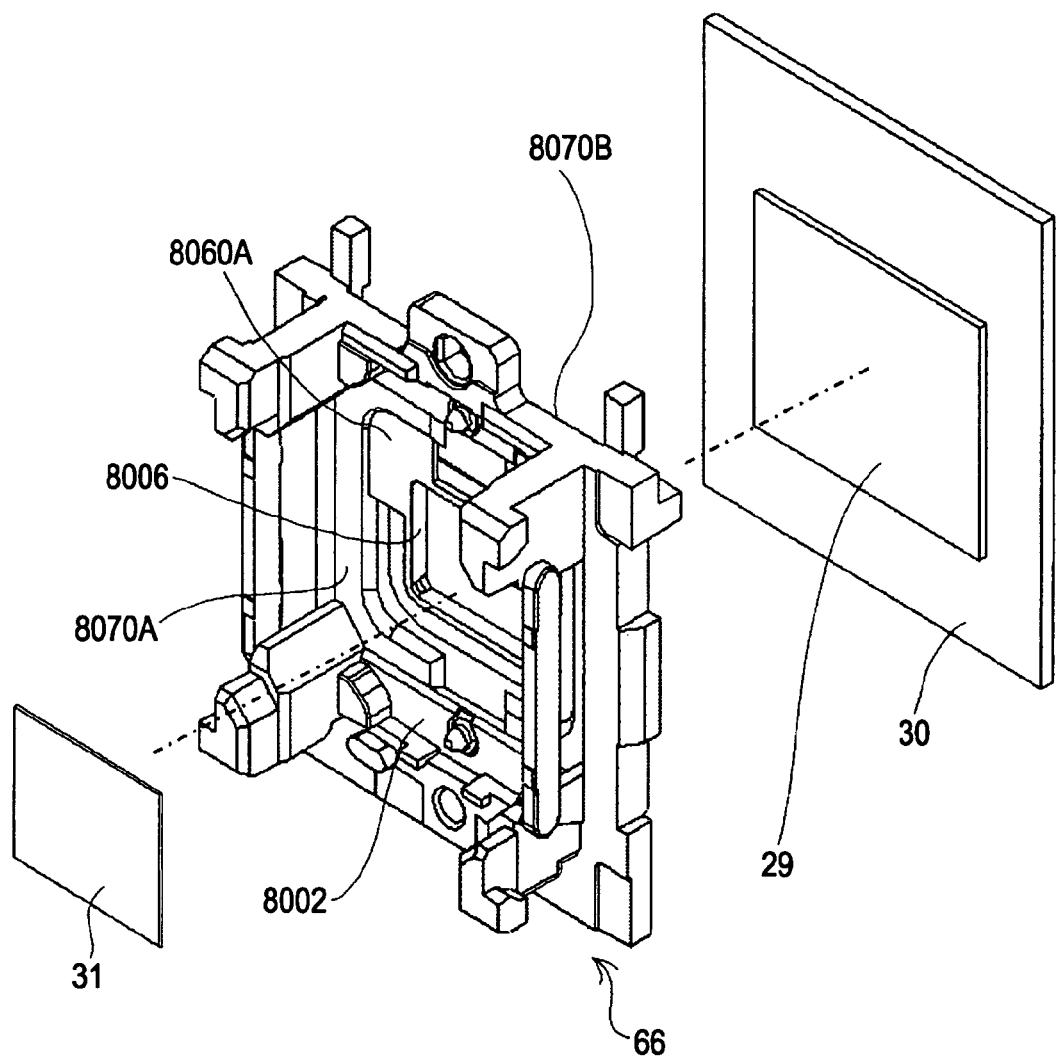
FIG. 47 is a diagram illustrating the assembly of a dustproof cover 31, a barrel unit 66, an image pickup element 29, and a substrate 30.
Figure 48:
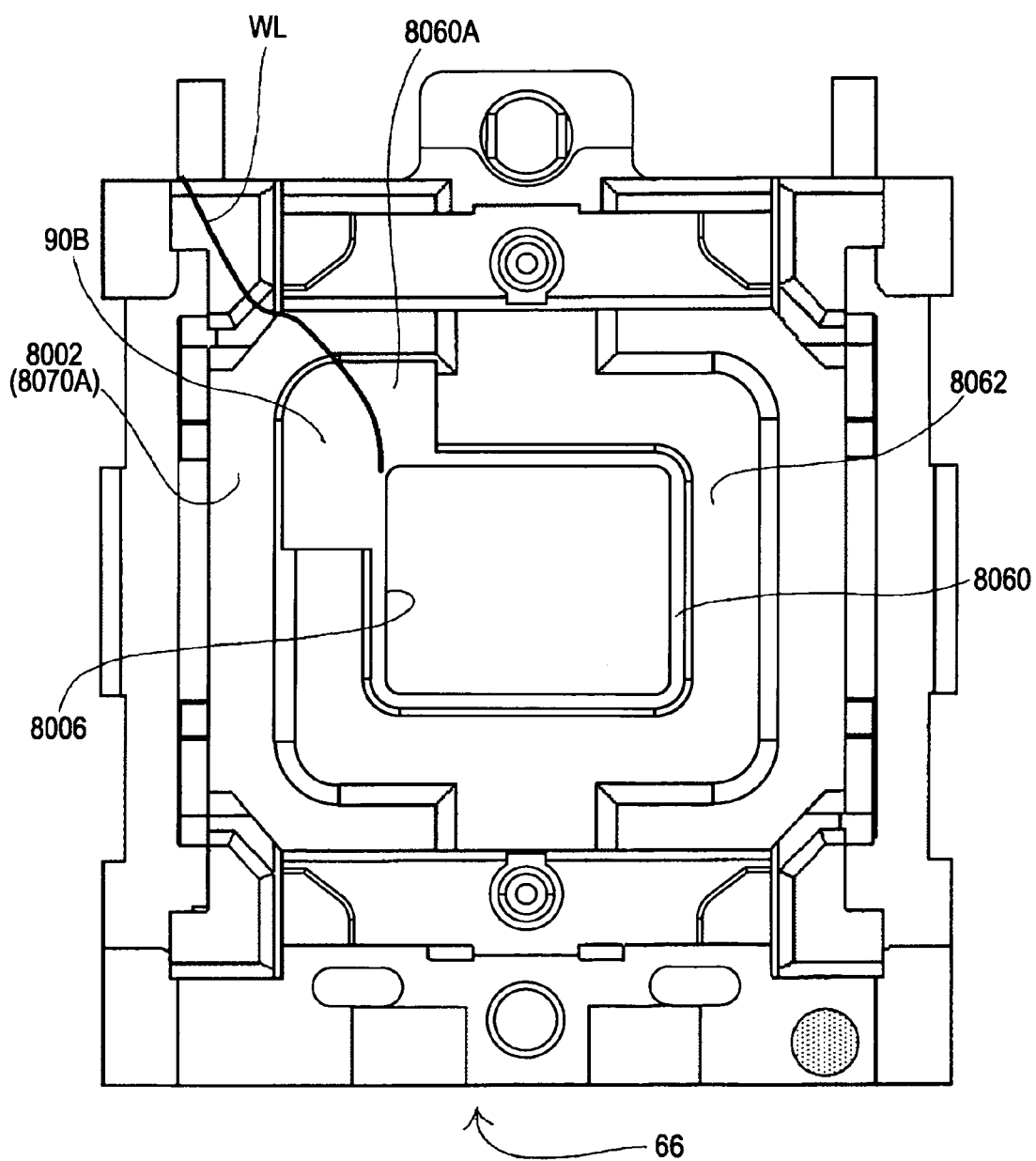
FIG. 48 is a plan view of a rear end-face wall 8002.
Figure 49:
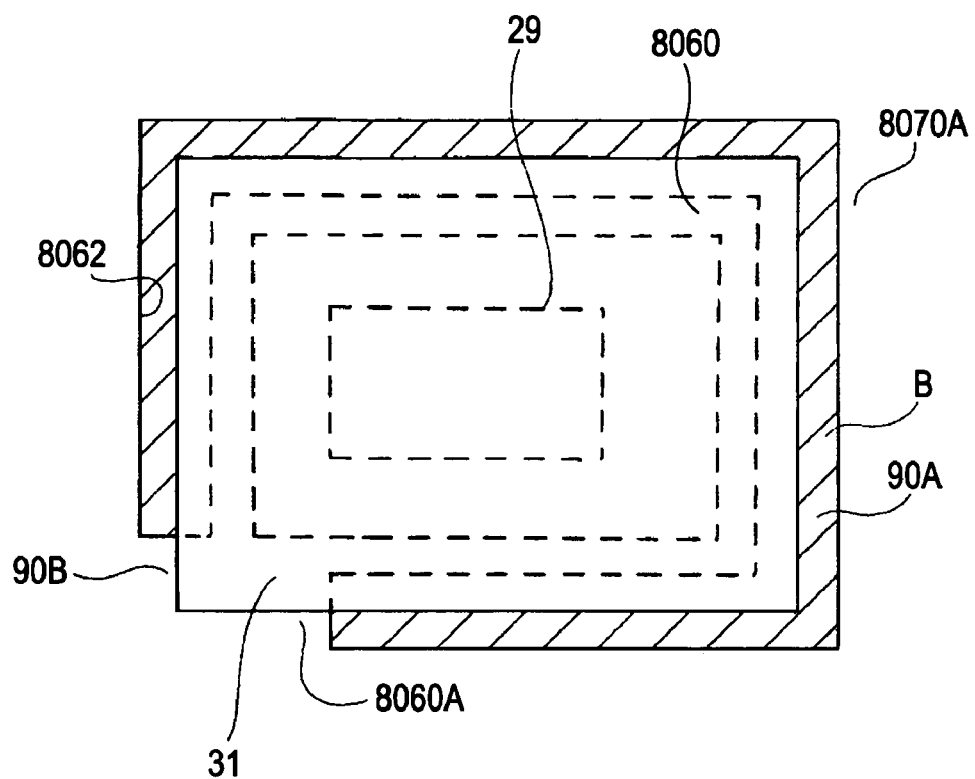
FIG. 49 is a diagram illustrating the manner in which the dustproof cover 31 is attached.
Figure 50:
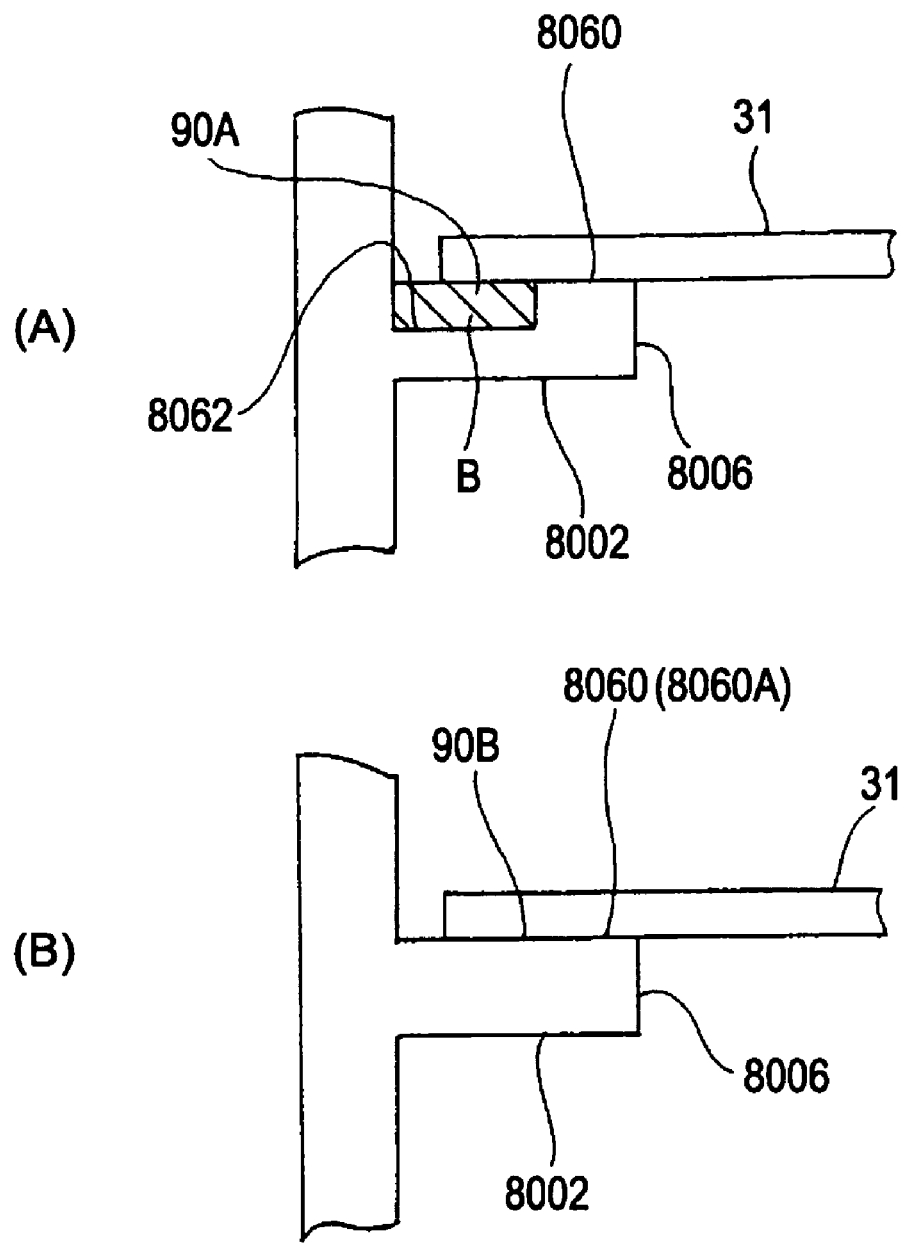
In FIG. 50, (A) and (B) are sectional views illustrating the manners in which the dustproof cover 31 is attached.

FIG. 47 is a diagram illustrating the assembly of a dustproof cover 31, a barrel unit 66, an image pickup element 29, and a substrate 30, FIG. 48 is a plan view of a rear end-face wall 8002, FIG. 49 is a diagram illustrating the manner in which the dustproof cover 31 is attached, and (A) and (B) of FIG. 50 are sectional views illustrating the manners in which the dustproof cover 31 is attached.

It is to be noted that, in the fourth reference example, the optical filter 31 described in the first reference example serves as a dustproof cover 31.

As described above, a camera module 22 includes the barrel unit 66; a lens holding unit 68 which holds an imaging optical system 34, which is housed in the barrel unit 66, and which is supported such that the lens holding unit 68 is movable along an optical axis of the imaging optical system 34; the image pickup element 29 which is disposed in the barrel unit 66 and which picks up an object image guided by the imaging optical system 34; the substrate 30 on which the image pickup element 29 is mounted; and a driving unit 72 which moves the lens holding unit 68 along the optical axis of the imaging optical system 34.

Here, the barrel unit 66 includes the rear end-face wall 8002 which extends along a plane that is perpendicular to the optical axis and closes the rear end of the barrel unit 66 in the optical axis direction and in which an opening 8006 for housing the image pickup element 29 is formed.

As shown in FIGS. 47 and 48, the rear end-face wall 8002 includes a front surface 8070A which faces forward in the optical axis direction and a rear surface 8070B which faces rearward in the optical axis direction.

The substrate 30 is attached to the rear surface 8070B of the rear end-face wall 8002 with an adhesive in the state in which the image pickup element 29 is housed in the opening 8006. The substrate 30 and the adhesive serve to close and seal the rear surface 8070B of the rear end-face wall 8002 in an area surrounding the opening 8006.

The dustproof cover 31, which is transparent, is attached to the front surface 8070A of the rear end-face wall 8002 with an adhesive B so as to close the opening 8006.

Here, the dustproof cover 31 is not limited as long as dust can be prevented from entering through the opening 8006. For example, an infrared cut filter can be used. Alternatively, glass or synthetic resin that does not have an optical filter function can also be used.

As shown in FIGS. 48 and 49, a flat abutting surface 8060 which continuously extends in the peripheral direction of the opening 8006 along an imaginary plane that is perpendicular to the optical axis of the imaging optical system 34 is formed on the front surface 8070A of the rear end-face wall 8002 in an area surrounding the opening 8006.

In addition, an adhesive receiving groove 8062 for receiving the adhesive B is formed in the abutting surface 8060 in an area surrounding the opening 8006.

The adhesive receiving groove 8062 is formed so as to continuously extend in the peripheral direction of the opening 8006.

In addition, the abutting surface 8060 has a region 8060A which is provided between the ends of the adhesive receiving groove 8062 in the extending direction thereof and in which the adhesive receiving groove 8062 is not formed.

The transparent dustproof cover 31 is abutted against the abutting surface 8060, and the dustproof cover 31 is attached to the front surface 8070A (abutting surface 8060) of the rear end-face wall 8002 by the adhesive B which fills the adhesive receiving groove 8062.

More specifically, a boundary between an annular section of the front surface 8070A of the rear end-face wall 8002 which surrounds the opening 8006 and a peripheral section of the dustproof cover 31 which is positioned around the opening 8006 includes an adhered area 90A (see FIG. 50(A)) in which the adhesive B which fills the adhesive receiving groove 8062 is positioned and an unadhered area 90B (see FIG. 50(B)) in which the adhesive B is not provided. The unadhered area 90B includes the region 8060A of the abutting surface 8060 in which the adhesive receiving groove 8062 is not formed.

Thus, in the adhered area 90A, the dustproof cover 31 is abutted against the abutting surface 8060 and the adhesive B is interposed between the dustproof cover 31 and the abutting surface 8060. Therefore, the opening 8006 is sealed airtight in the adhered area 90A.

In addition, in the unadhered area 90B, the dustproof cover 31 is abutted against the abutting surface 8060. Therefore, in the unadhered area 90B, the opening 8006 is closed even though it cannot be said that the opening 8006 is strictly airtight.

Therefore, in the fourth reference example, the adhered area 90A continuously extends around the opening 8006, and the unadhered area 90B is positioned between the ends of the adhered area 90A in the extending direction thereof.

In addition, the barrel unit 66 is made of synthetic resin. As shown in FIG. 48, a weld line WL formed in the molding process is provided on the front surface 8070A of the rear end-face wall 8002, and the weld line WL is positioned on the front surface 8070A of the rear end-face wall 8002 in an annular region around the opening 8006 in which the unadhered area 90B is provided.

According to the fourth reference example, the image pickup element 29 is housed in the opening 8006 formed in the rear end-face wall 8002 positioned at the rear end of the barrel unit 66. A front section of the opening 8006 is covered with the dustproof cover 31 and the rear section of the opening 8006 is covered by the substrate 30 on which the image pickup element 29 is mounted. Thus, no package is necessary and the barrel unit 66 can be made smaller and thinner.

In addition, in this case, the volume of the space provided in the opening 8006 is larger than the volume of the housing recess provided in a package according to the related art. Although the air in the space expands as the temperature increases, according to the fourth reference example, the unadhered area 90B is provided in which the dustproof cover 31 is in contact with the abutting surface 8060. Therefore, a small gap which prevents dust from entering but allows the air to flow therethrough is provided between the dustproof cover 31 and the abutting surface 8060. Accordingly, dust can be prevented from entering the opening 8006 but air is allowed to flow in and out through the unadhered area 90B, so that deformation of the dustproof cover 31 can be prevented. Thus, it is advantageous in improving the quality of the image picked up by the image pickup element 29.

In addition, the weld line WL formed when the barrel unit 66 is molded generally has a thin groove shape, and therefore it is advantageous in allowing the air to flow in and out through the weld line WL.

In addition, unlike the case in which the weld line WL is positioned in a region of the abutting surface 8060 in which the adhesive receiving groove 8062 is formed, the weld line WL is positioned in the region 8060A of the abutting surface 8060 in which the adhesive receiving groove 8062 is not formed. Therefore, it is advantageous in ensuring the thickness at the abutting surface 8060 surrounding the opening 8006 to ensure the strength of the abutting surface 8060.

Next, a fifth reference example in which a structure similar to the structure of the fourth reference example is applied to a solid-state image pickup device will be described.

Figure 51:
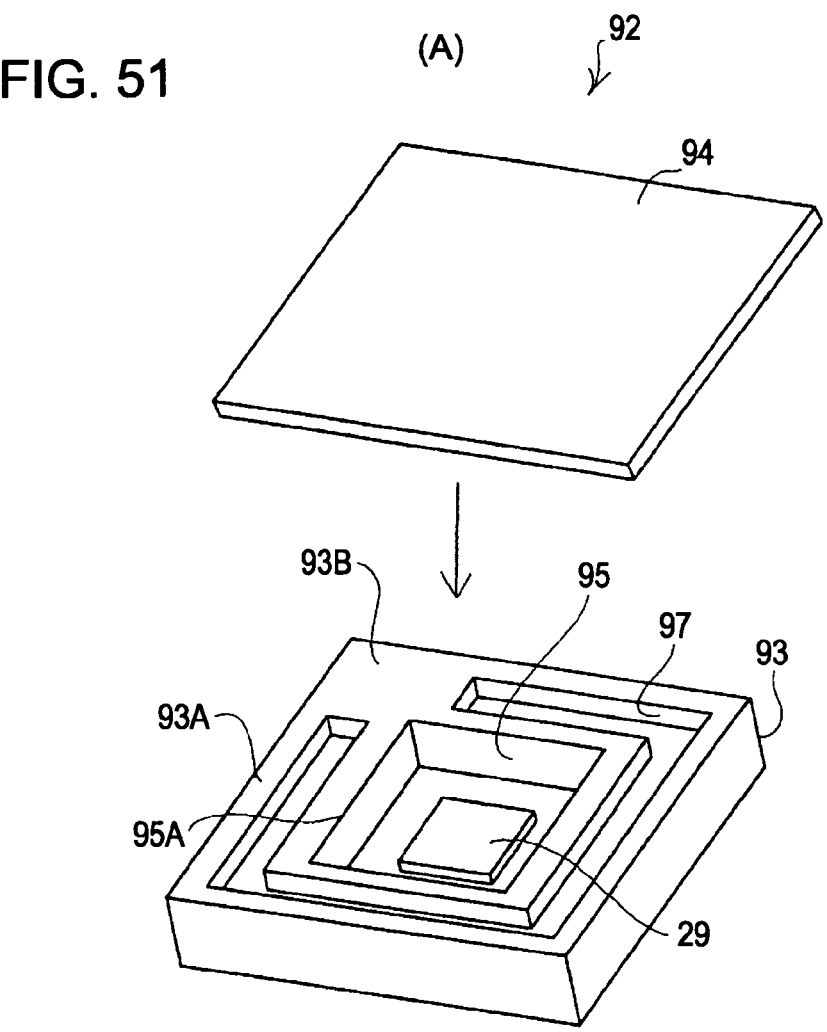
In FIG. 51, (A) is an exploded perspective view of a solid-state image pickup device and (B) is a plan view of the solid-state image pickup device.

In FIG. 51, (A) is an exploded perspective view of a solid-state image pickup device and (B) is a plan view of the solid-state image pickup device.

A solid-state image pickup device 92 includes a package 93, an image pickup element 29, and a dustproof cover 94.

A housing recess 95 is formed in the package 93.

The housing recess 95 opens in a flat top surface 93A of the package 93.

The image pickup element 29 is housed in the housing recess 95.

The dustproof cover 94 is abutted against the top surface 93A, and the dustproof cover 94 is attached to the top surface 93A with an adhesive B so as to close an opening 95A of the housing recess 95.

An adhered area 96A in which the adhesive B is applied and an unadhered area 96B in which the adhesive B is not applied are provided between an annular section of the top surface 93A which surrounds the opening 95A and a peripheral section of the dustproof cover 94 which is positioned around the opening 95A.

An adhesive receiving groove 97 filled with the adhesive B which forms the adhered area 96A is formed in the top surface 93A.

The adhesive receiving groove 97 continuously extends around the opening 95A, and a top-surface region 93B in which the adhesive receiving groove 97 is not formed is provided between the ends of the adhesive receiving groove 97 in the extending direction thereof.

The dustproof cover 94 is attached to the top surface 93A of the package 93 by the adhesive B which fills the adhesive receiving groove 97.

Therefore, the adhered area 96A in which the adhesive B is applied and the unadhered area 96B in which the adhesive B is not applied are provided between the annular section of the top surface 93A which surrounds the opening 95A and the peripheral section of the dustproof cover 94 which is positioned around the opening 95A. In other words, the adhered area 96A and the unadhered area 96B are provided between the top surface 93A and the dustproof cover 94 in an area surrounding the opening 95A. The unadhered area 96B includes the top-surface region 93B in which the adhesive receiving groove 97 is not formed, and the dustproof cover 94 is abutted against the top surface 93A in the unadhered area 96B.

In the adhered area 96A, the dustproof cover 94 is abutted against the top surface 93A with the adhesive B interposed therebetween. Therefore, the opening 95A is sealed airtight in the adhered area 96A.

In addition, in the unadhered area 96B, the dustproof cover 94 is abutted against the top surface 93A. Therefore, in the unadhered area 96B, the opening 95A is closed even though it cannot be said that the opening 95A is strictly airtight.

Therefore, in the fifth reference example, the adhered area 96A continuously extends around the opening 95A, and the unadhered area 96B is positioned between the ends of the adhered area 96A in the extending direction thereof.

Figure 52:
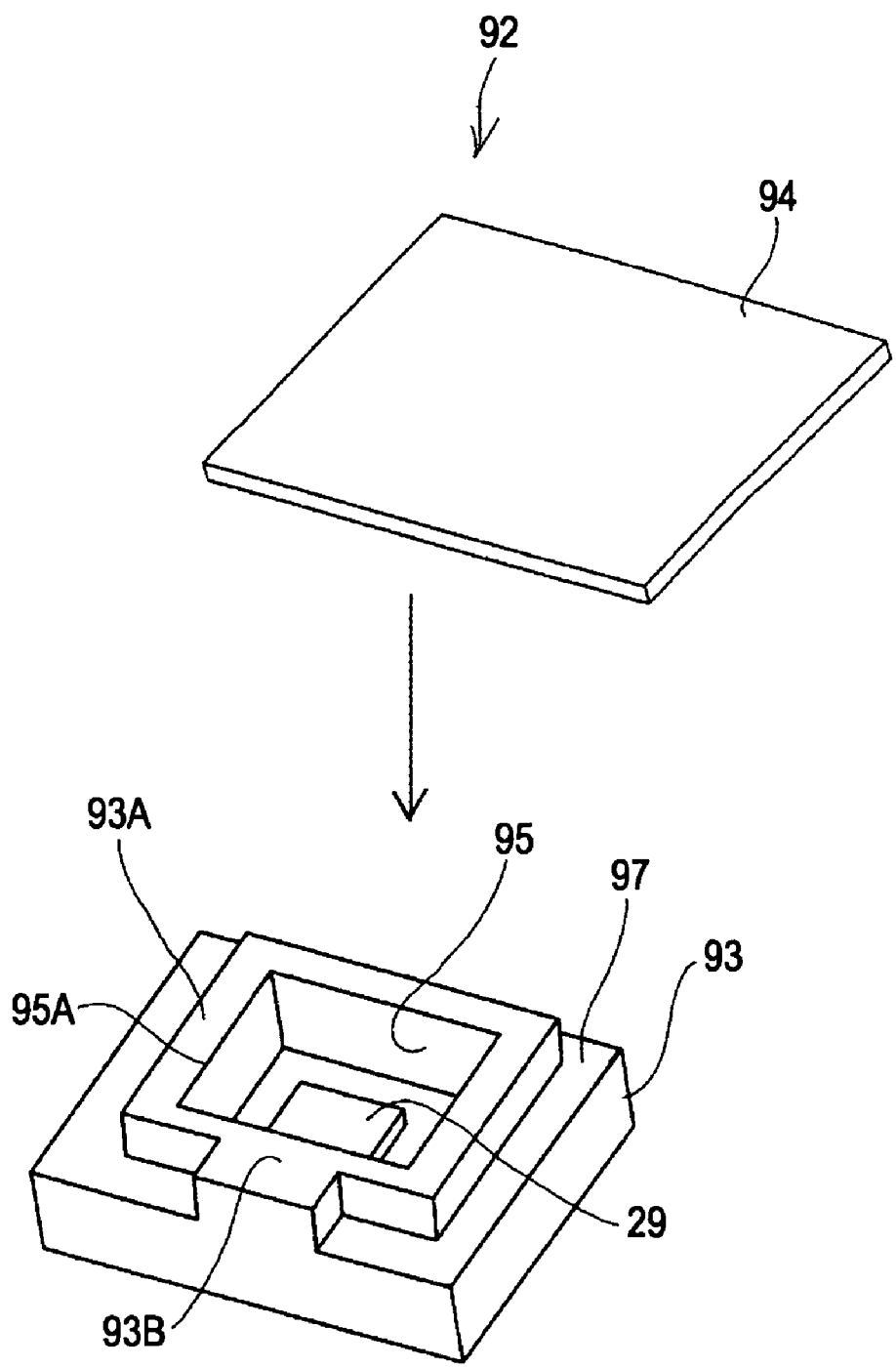
FIG. 52 is an exploded perspective view of another solid-state image pickup device.

Here, as shown in FIG. 52, the adhesive receiving groove 97 may also be formed so as to open in side surfaces of the package 93 which intersect the top surface 93A.

According to the fifth reference embodiment, even when the air in the space inside the housing recess 95 expands as the temperature increases, since the unadhered area 96B is provided in which the dustproof cover 94 is in contact with the top surface 93A, a small gap which prevents dust from entering but allows the air to flow therethrough is provided between the dustproof cover 94 and the top surface 93A. Accordingly, dust can be prevented from entering the housing recess 95 but air is allowed to flow in and out through the unadhered area 96B, so that deformation of the dustproof cover 94 can be prevented. Thus, it is advantageous in improving the quality of the image picked up by the image pickup element 29.

It is to be noted that, although the case in which the electronic apparatus 10 in which the image pickup device 20 is installed is a portable phone has been described in the embodiment, the image pickup device according to the present invention can also be applied to various types of electronic apparatuses including portable information terminals, such as PDA and notebook personal computers, digital still cameras, and video cameras.

The invention claimed is:

1. A camera module, comprising:
a barrel unit having a housing space;
a lens holding unit holding an imaging optical system, the lens holding unit being housed in the housing space and supported such that the lens holding unit is movable along an optical axis of the imaging optical system;
an image pickup element disposed in the barrel unit, the image pickup element picking up an object image guided by the imaging optical system;
a driving unit which moves the lens holding unit along the optical axis of the imaging optical system;
the barrel unit including an inner barrel in which the housing space is formed and an outer barrel disposed outside the inner barrel,
a region of the inner barrel forming a rear end-face wall which extends along a plane perpendicular to the optical axis, which closes a rear end of the outer barrel in the optical axis direction, and in which an opening for housing the image pickup element is formed; and
a retaining plate including a front plate portion which retains a front end of the outer barrel in the optical axis direction and closes the front end, two side plate portions bent along both sides of the front plate portion and having distal ends which retain the rear end-face wall, and an opening formed in the front plate portion for providing an optical path of the imaging optical system,
wherein in a state in which the front plate portion retains the front end of the outer barrel and the distal ends of the two side plate portions retain the rear end-face wall, the outer barrel is clamped in the optical axis direction by the retaining plate and the inner barrel is clamped in the optical axis direction by the outer barrel and the retaining plate,
wherein retaining projections are provided on an outer periphery of the rear end-face wall at two respective positions having the optical axis therebetween, retaining cut sections are formed at the distal ends of the side plate portions, and the distal ends of the two side plate portions retain the rear end-face wall by causing the projections and the cut sections to engage with each other,
wherein a third abutting surface extends along an imaginary plane that is perpendicular to the optical axis and is formed at the front end of the outer barrel in the optical axis direction, the front plate portion is abutted against the third abutting surface so that the front plate portion retains the front end of the outer barrel, a projecting portion is provided on the third abutting surface, a cut section engageable with, and adapted to received therein, the projecting portion is formed in the front plate portion, and the projecting portion and the cut section engage with each other with the projecting portion received in the cut section so that the front plate portion is positioned with respect to the front end of the outer barrel in the optical axis direction along an imaginary plane that is perpendicular to the optical axis.

2. The camera module according to claim 1, wherein in a state in which the outer barrel is placed outside the inner barrel, the barrels are combined together without rattling in a direction perpendicular to the optical axis.

3. The camera module according to claim 1, wherein flat portions which are parallel to a single imaginary plane that passes through the optical axis are formed on an outer periphery of the outer barrel at positions having the optical axis therebetween, and in a state in which the front plate portion retains the front end of the outer barrel and the distal ends of the two side plate portions retain the rear end-face wall, the two side plate portions are in contact with the respective flat portions.

4. The camera module according to claim 1, wherein a first abutting surface extends along an imaginary plane that is perpendicular to the optical axis and is formed at a position where the rear end-face wall faces forward in the optical axis direction, a second abutting surface extends along an imaginary plane that is perpendicular to the optical axis and is formed at the rear end of the outer barrel in the optical axis direction, and in a state in which the outer barrel is placed outside the inner barrel, the first abutting surface and the second abutting surface are in contact with each other.

5. The camera module according to claim 1, wherein in a state in which the outer barrel is placed outside the inner barrel, a contour of the barrel unit has a rectangular plate shape having a thickness in the optical axis direction and longitudinal and lateral dimensions which are greater than the thickness, the front plate portion has a rectangular shape, and the side plate portions are bent along a pair of sides of the front plate portion which face each other.

6. The camera module according to claim 1, wherein the driving unit includes a magnet and a coil, one of the magnet or the coil being provided on the lens holding unit and another of the magnet or the coil being provided on the barrel unit.

7. The camera module according to claim 1, wherein the retaining plate is of a material having magnetic shielding characteristics.

8. The camera module according to claim 1, wherein the retaining plate is of a material having electromagnetic shielding characteristics.

9. The camera module according to claim 1, wherein the retaining plate is of a conductive material.

10. The camera module according to claim 1, wherein a treated outer surface of the front plate portion positioned at a side opposite to an inner surface which faces the front end of the outer barrel prevents reflection of light.

11. The camera module according to claim 10, wherein the treated outer surface is treated by being painted or plated.

* * * * *